(12) United States Patent
Sakamoto et al.

(10) Patent No.: US 6,900,555 B2
(45) Date of Patent: May 31, 2005

(54) ELECTRIC POWER SUPPLY SYSTEM FOR A VEHICLE

(75) Inventors: Shinichi Sakamoto, Mito (JP); Tatsuya Yoshida, Naka-gun (JP); Mitsuru Koni, Hitachinaka (JP); Hiroyuki Saito, Hitachinaka (JP); Kiyoshi Horibe, Hitachi (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/118,245

(22) Filed: Apr. 9, 2002

(65) Prior Publication Data

US 2002/0113492 A1 Aug. 22, 2002

Related U.S. Application Data

(63) Continuation of application No. 09/403,424, filed as application No. PCT/JP98/01775 on Apr. 17, 1998, now Pat. No. 6,420,799.

(30) Foreign Application Priority Data

Apr. 21, 1997 (JP) .............................. 9-102975

(51) Int. Cl.[7] ................................. H60L 1/00
(52) U.S. Cl. ...................... 307/10.1; 307/9.1; 307/10.8; 307/38; 307/40; 340/825
(58) Field of Search ................................ 307/10.1, 9.1, 307/10.8, 38, 40; 340/825

(56) References Cited

U.S. PATENT DOCUMENTS

| | | | |
|---|---|---|---|
| 3,564,280 A | * | 2/1971 | Songnfest et al. ............ 307/10 |
| 4,652,853 A | | 3/1987 | Tagami et al. |
| 4,705,997 A | * | 11/1987 | Juzswik ....................... 318/341 |
| 4,739,183 A | | 4/1988 | Tokura et al. |
| 5,710,465 A | * | 1/1998 | Saito et al. ................. 307/10.1 |
| 5,729,722 A | * | 3/1998 | Matsumoto ................. 395/560 |
| 5,859,845 A | * | 1/1999 | Oniishi et al. .............. 370/386 |
| 6,023,107 A | * | 2/2000 | Grass ......................... 307/10.1 |
| 6,127,741 A | * | 10/2000 | Matsuda et al. .............. 307/36 |
| 6,182,807 B1 | | 2/2001 | Saito et al. |

FOREIGN PATENT DOCUMENTS

| | | |
|---|---|---|
| JP | 49-97241 | 9/1974 |
| JP | 53-52885 | 5/1978 |
| JP | 57-115963 | 7/1982 |
| JP | 58-3542 | 1/1983 |
| JP | 59-29038 | 2/1984 |
| JP | 63-40135 | 2/1988 |
| JP | 2-22581 | 1/1990 |
| JP | 5-211727 | 8/1993 |
| JP | 6-247234 | 9/1994 |
| JP | 9-275632 | 10/1997 |
| JP | 10-4632 | 1/1998 |
| JP | 10-20970 | 1/1998 |
| WO | WO 98/48499 | 10/1998 |

* cited by examiner

*Primary Examiner*—Robert De Beradinis
(74) *Attorney, Agent, or Firm*—Crowell & Moring LLP

(57) ABSTRACT

An electrical power supply system for a vehicle is provided, which can eliminate proliferation of adverse effect on other control modules caused within one of a plurality of control modules. This is accomplished by provision of the power supply system comprising: battery 10 for supplying power; power line PL in a loop lay-out; a plurality of control modules BCM 100, VCM 110, FIM 120, DDM 130, RIM 140, CCM 150 and PDM 160 for a plurality of accessory systems, which are connected via said power line PL in loop lay-out, wherein a power control module (PCM) 20 for controlling the engine is connected to the power supply source via another power line 22 different from the power line PL.

10 Claims, 69 Drawing Sheets

10···BATTERY   20···NAVIGATION   22, PL···POWER LINE   SL···SIGNAL LINE

FIG.4

BCM1 (ADDRESS:0)

| NO. | VARIABLES | NAMES |
|---|---|---|
| 31 | iIGNswkey | Key insert sw |
| 30 | iIGNswST | Start sw |
| 29 | iHiBeamSw | Hi-beam sw(Dimmer |
| 28 | option | - |
| 27 | iHornSw | Horn sw |
| 26 | iCcmOnOff | Cruise On/Off sw(for CCM2) |
| 25 | iCcmS_C | Cruise set/coast sw(for CCM2) |
| 24 | iCcmR_A | Cruise Resume/accel sw(for CCM2) |
| 23 | iNC27 | - |
| 22 | iNC26 | - |
| 21 | iNC25 | - |
| 20 | iPDimOn | Panel Dimmer on sw(Illumi-all on) |
| 19 | iLftOpn | Lift gete open sw |
| 18 | iDefog | Rear window Defogger sw |
| 17 | iRrWip | Rear Wiper on sw |
| 16 | iRrWipWash | Rear Wiper Wash sw |
| 15 | iSftyBelt | Safty belt on sw |
| 14 | iDorJamRH | RH door jamb sw |
| 13 | iDorJamLH | LH door jamb sw |
| 12 | iStopSw | TTC/Stop lamp sw |
| 11 | iBrkSw | Brake lamp/Cruise release sw(for CCM2) |
| 10 | iCrsRlsSw | TTC/Cruise release sw(for CCM2 & VCM2) |
| 9 | iLiteOn | Head lamp on sw |
| 8 | iPkBrkWarm | Park brake warming sw(side brake) |
| 7 | iNC47 | - |
| 6 | iIGNswOn_1 | Key sw IGN(RUN)1 sw |
| 5 | iIGNswOn_2 | Key sw IGN(RUN)2 sw |
| 4 | iIGNswAcc | Key sw Acc sw |
| 3 | iPosOn | Park lamp sw(Position lamp) |
| 2 | iTrnSwLH | LH Turn sw |
| 1 | iTrnSwRH | RH Turn sw |
| 0 | iHazardSw | Hazard sw |

FIG.5

BCM2 (ADDRESS:1)

| NO. | VARIABLES | NAMES |
|---|---|---|
| 31 | iNC57 | - |
| 30 | iNC56 | - |
| 29 | iNC55 | - |
| 28 | iNC54 | - |
| 27 | iRcDrUnlk | R/C DR Door unlock sw |
| 26 | iRcLock | R/C Door lock sw |
| 25 | iRcUnlock | R/C Door unlock sw |
| 24 | iRcLftOpn | R/C Lift-gate open sw |
| 23 | | - |
| 22 | | - |
| 21 | | - |
| 20 | | - |
| 19 | | - |
| 18 | | - |
| 17 | | - |
| 16 | | - |
| 15 | | - |
| 14 | | - |
| 13 | | - |
| 12 | | - |
| 11 | | - |
| 10 | | - |
| 9 | | - |
| 8 | | - |
| 7 | | - |
| 6 | | - |
| 5 | | - |
| 4 | | - |
| 3 | | - |
| 2 | | - |
| 1 | | - |
| 0 | | - |

FIG.6

BCMOUT

| NO. | VARIABLES | NAMES |
|---|---|---|
| 1-7 | oDefogInd | Defogger Indicator |
| 1-6 | oTrnRHInd | RH turn indicator |
| 1-5 | oTrnLHInd | LH turn indicator |
| 1-4 | oHiBmInd | Hi-Beam indicator |
| 1-3 | oSftyBitWan | Safty belt warning |
| 1-2 | oFIMssInd | FIM short-sensor Fail detect indicator |
| 1-1 | oDDMssInd | DDM short-senser Fail detect indicator |
| 1-0 | oPDMssInd | PDM short-sensor Fail detect indicator |
| 2-7 | oPRNDL1 | PDNDL signal 1 |
| 2-6 | oPRNDL2 | PDNDL signal 2 |
| 2-5 | oPRNDL3 | PDNDL signal 3 |
| 2-4 | oPRNDL4 | PDNDL signal 4 |
| 2-3 | oNC19 | - |
| 2-2 | oCertsy | Courtesy lamp output |
| 2-1 | oRiMssInd | RIM short-sensor Fail detect indicator |
| 2-0 | oStopOpen | Stop lamp load open detect indicator |
| 3-7 | oNC15 | - |
| 3-6 | oNC14 | - |
| 3-5 | oNC13 | - |
| 3-4 | oMalFunInd | Malfunction indicator (check engine soon) |
| 3-3 | oDRLInd | DRL indicator |
| 3-2 | oABSInd | ABS indicator |
| 3-1 | oBrkWarn | Brake warning indicator |
| 3-0 | oCHGInd | Charge indicator |
| 4-7 | oVbBAT3 | BAT3 voltage supply |
| 4-6 | oVbBAT2 | BAT2 voltage supply |
| 4-5 | oVBACC | ACC voltage supply |
| 4-4 | oVbBAT | BAT voltage supply |
| 4-3 | oVBiGN2 | IGN2 voltage supply |
| 4-2 | oVbiGN1 | IGN1 voltage supply |
| 4-1 | oVbIGN3 | IGN3 voltage supply |
| 4-0 | oSftitlock | Shift inter-lock solenoid |

FIG.8

VCM (ADDRESS: 2)

| NO. | VARIABLES | NAMES |
|---|---|---|
| 31 | VCM31 | Not use (0 fixed) |
| 30 | VCM30 | Not use (0 fixed) |
| 29 | iVcmMIL | MIL indication signal from VCM |
| 28 | VCM28 | Not use (0 fixed) |
| 27 | iVcmABS | ABS indication signal from VCM |
| 26 | iVcmBrk | Brake indication signal from VCM |
| 25 | VCM25 | Not use (0 fixed) |
| 24 | VCM24 | Not use (0 fixed) |
| 23 | VCM23 | Vehicle Speed data (8bit) |
| 22 | VCM22 | |
| 21 | VCM21 | |
| 20 | VCM20 | |
| 19 | VCM19 | |
| 18 | VCM18 | |
| 17 | VCM17 | |
| 16 | VCM16 | |
| 15 | VCM15 | Engine revolution data (8bit) |
| 14 | VCM14 | |
| 13 | VCM13 | |
| 12 | VCM12 | |
| 11 | VCM11 | |
| 10 | VCM10 | |
| 9 | VCM09 | |
| 8 | VCM08 | Not use (0 fixed) |
| 7 | VCM07 | Not use (0 fixed) |
| 6 | VCM06 | Not use (0 fixed) |
| 5 | VCM05 | Not use (0 fixed) |
| 4 | VCM04 | Not use (0 fixed) |
| 3 | VCM03 | Not use (0 fixed) |
| 2 | VCM02 | Not use (0 fixed) |
| 1 | VCM01 | Not use (0 fixed) |
| 0 | VCM00 | Not use (0 fixed) |

FIG.10

FIM1 (ADDRESS:3)

| NO. | VARIABLES | NAMES |
|---|---|---|
| 31 | iPnp_Rvs | Reverse SW |
| 30 | FIM30 | Not use (0 fixed) |
| 29 | iPNP_LR | P/NP (LR) SW (Liftgate release) |
| 28 | iPNP_SI | P/NP (SI) SW (shift interlock) |
| 27 | iPNP_1 | P/NP (1) SW |
| 26 | iPNP_2 | P/NP (2) SW |
| 25 | iPNP_3 | P/NP (3) SW |
| 24 | iPNP_4 | P/NP (4) SW |
| 23 | iPTurnFIMdiag | P.T Lamp LHF Output Diagnosis Signal |
| 22 | iPosFIMdiag | PLF Output Diagnosis Signal |
| 21 | iACG_L | ACGL Signal |
| 20 | oPTurnLHF | P/T Lamp LHF Output Signal |
| 19 | oPTurnRHF | P/T Lamp RHF Output Signal |
| 18 | oPosFIM | PLF Output Signal |
| 17 | oLoBeam | Low Beam Output Signal |
| 16 | oRrWash | RWWP Output Signal (rear washer) |
| 15 | FIM15 | Not use (0 fixed) |
| 14 | oVBoutFIM | VBAT Output Signal |
| 13 | oIgn1outFIM | IGN#1 Output Signal |
| 12 | oHorn | Horn Operation Signal |
| 11 | oIgn3outFIM | IGN#3 Output Signal |
| 10 | oIgn2outFIM | IGN#2 Output Signal |
| 9 | oHiBeam | Hi Beam Output Signal |
| 8 | xFimSsNG | Short sensor NG flag |
| 7 | VCM07 | Not use (0 fixed) |
| 6 | VCM06 | Not use (0 fixed) |
| 5 | VCM05 | Not use (0 fixed) |
| 4 | VCM04 | Not use (0 fixed) |
| 3 | VCM03 | Not use (0 fixed) |
| 2 | VCM02 | Not use (0 fixed) |
| 1 | VCM01 | Not use (0 fixed) |
| 0 | VCM00 | Not use (0 fixed) |

FIG.12

DDM (ADDRESS: 4)

| NO. | VARIABLES | NAMES |
|---|---|---|
| 31 | iDrDRDlk | Door Lock Detect SW ('L' for Locked) |
| 30 | iDrDRHdi | Door Handle SW ('H' at Pulled) |
| 29 | iDrDRCUlk | Door Unlock SW (Centralized) |
| 28 | iDrDRCLk | Door Lock SW (Centralized) |
| 27 | iPwLkSw | P/W Lock SW ('L' for Locked) |
| 26 | iPwMtLK | P/W Auto Lock Detect SW ('H' for Locked) |
| 25 | iDRPwRRDn | P/W RR DOWN SW |
| 24 | iDRPwRRUp | P/W RR UP SW |
| 23 | iDRPwRLDn | P/W RL DOWN SW |
| 22 | iDRPwRlUp | P/W RL UP SW |
| 21 | iDRPwFRDn | P/W FR DOWN SW |
| 20 | iDRPwFRUp | P/W FR UP SW |
| 19 | iDRPwFLDn | P/W FL DOWN SW |
| 18 | iDRPwFLUp | P/W FL UP SW |
| 17 | iDmRHSel | Door mirror select RH sw |
| 16 | iDmLHSel | Door mirror select LH sw |
| 15 | iDmUP | Door mirror up sw |
| 14 | iDmDN | Door mirror down sw |
| 13 | iDmLH | Door mirror left sw |
| 12 | iDmRH | Door mirror right sw |
| 11 | oDRSwILm | SW Illumination Output |
| 10 | xDdmSsNG | Short sensor NG flag |
| 9 | DDM09 | Not use (0 fixed) |
| 8 | DDM08 | Not use (0 fixed) |
| 7 | oDrDRLK_1 | Door Lock Output (1) |
| 6 | oDrDRLK_2 | Door Lock Output (2) |
| 5 | oPwDR_1 | P/W Output (1) |
| 4 | oPwDR_2 | P/W Output (2) |
| 3 | oLHMirRLH_1 | D/W Left & Right Motor Output (1) |
| 2 | oLHMirRLH_2 | D/W Left & Right Motor Output (2) |
| 1 | oLHMirUD_1 | D/M Up & Down Motor Output (1) |
| 0 | oLHMirUD_2 | D/M Up & Down Motor Output (2) |

FIG.14

DDM (ADDRESS:5)

| NO. | VARIABLES | NAMES |
|---|---|---|
| 31 | iGateJambSw | End Gate Door SW |
| 30 | iGateReLease | End Gate Release SW |
| 29 | iGateLkSw | End Gate Lock SW |
| 28 | iGateULKSw | End Gate Unlock SW |
| 27 | iPwRLUp | P/W RL UP SW |
| 26 | iPwRLDn | P/W RL DOWN SW |
| 25 | iPwRRUp | P/W RR UP SW |
| 24 | iPwRRDn | P/W RR DOWN SW |
| 23 | iRLTurnSTPdiag | RL Turn/STOP Lamp Diagnosis Signal |
| 22 | iRRTurnSTPdiag | RR Turn/STOP Lamp Diagnosis Signal |
| 21 | iRearJamp | Rear Door SW('L' for Open) |
| 20 | RIM20 | Not use (0 fixed) |
| 19 | oRrWipPwr | Rear Wiper Power Supply Output |
| 18 | oRrWipCtL | Rear Wiper Drive Signal |
| 17 | oRrWipWash | Rear Wiper WASH Signal Output |
| 16 | oGateOpen | End Gate Release Output |
| 15 | oTurnStpLHR | R/L Trun/STOP Lamp Output |
| 14 | oTurnStpRHR | R/R Turn/STOP Lamp Output |
| 13 | HiMountSTP | Center Stop Lamp Output |
| 12 | oPosRIM | Tail Lamp Output |
| 11 | oPwRR_1 | RR-P/W Motor Output (1) |
| 10 | oPwRR_2 | RR-P/W Motor Output (2) |
| 9 | oPwRL_1 | R/L-P/W Motor Output (1) |
| 8 | oPwRL_2 | R/L-P/W Motor Output (2) |
| 7 | oRrDrLkMt_1 | Rear Door Lock Motor Output (1) |
| 6 | oRrDrLkMt_2 | Rear Door Lock Motor Output (2) |
| 5 | oDefog | Rear Defogger Output |
| 4 | oBackLamp | Backup Lamb Output |
| 3 | RIM03 | Not use |
| 2 | oRrDome | Rear Dome Lamp Output |
| 1 | xRimSsNG | Short sensor NG flag |
| 0 | RIM00 | Not use |

FIG.16

CCM (ADDRESS:6)

| NO. | VARIABLES | NAMES |
|---|---|---|
| 31 | CCM31 | Not use (0 fixed) |
| 30 | oCcmCrsRA | Cruise Resume/accel signal for CCM |
| 29 | oCcmCrsSC | Cruise Set/coast signal for CCM |
| 28 | oCcmCrsOF | Cruise On/off signal for CCM |
| 27 | oCcmBrkLmp | Cruise Brake Lamp sw signal |
| 26 | oCcmBrkPdl | Cruise Brake Pedal sw signal |
| 25 | CCM25 | Not use (0 fixed) |
| 24 | CCM24 | Not use (0 fixed) |
| 23 | CCM23 | Not use (0 fixed) |
| 22 | CCM22 | Not use (0 fixed) |
| 21 | CCM21 | Not use (0 fixed) |
| 20 | CCM20 | Not use (0 fixed) |
| 19 | CCM19 | Not use (0 fixed) |
| 18 | CCM18 | Not use (0 fixed) |
| 17 | CCM17 | Not use (0 fixed) |
| 16 | CCM16 | Not use (0 fixed) |
| 15 | CCM15 | Not use (0 fixed) |
| 14 | CCM14 | Not use (0 fixed) |
| 13 | CCM13 | Not use (0 fixed) |
| 12 | CCM12 | Not use (0 fixed) |
| 11 | CCM11 | Not use (0 fixed) |
| 10 | CCM10 | Not use (0 fixed) |
| 9 | CCM09 | Not use (0 fixed) |
| 8 | CCM08 | Not use (0 fixed) |
| 7 | CCM07 | Not use (0 fixed) |
| 6 | CCM06 | Not use (0 fixed) |
| 5 | CCM05 | Not use (0 fixed) |
| 4 | CCM04 | Not use (0 fixed) |
| 3 | CCM03 | Not use (0 fixed) |
| 2 | CCM02 | Not use (0 fixed) |
| 1 | CCM01 | Not use (0 fixed) |
| 0 | CCM00 | Not use (0 fixed) |

FIG.18

PDM (ADDRESS:7)

| NO. | VARIABLES | NAMES |
|---|---|---|
| 31 | PDM31 | Not use (0 fixed) |
| 30 | iDrASHdl | Door Handle SW |
| 29 | iDrASCUlk | Door Unlock SW (centralized) |
| 28 | iDrASCLk | Door Lock SW (centralized) |
| 27 | iPwFRDn | P/W FR DOWN SW |
| 26 | iPwFRUp | P/W FR UP SW |
| 25 | xPdmSsNG | Short sensor NG flag |
| 24 | PDM24 | Not use (0 fixed) |
| 23 | oDrASLK_1 | Door Lock Output (1) |
| 22 | oDrASLK_2 | Door Lock Output (2) |
| 21 | oPwAS_1 | P/W Output (1) |
| 20 | oPwAS_2 | P/W Output (2) |
| 19 | oRHMirRLH_1 | D/M Right & Left Motor Output (1) |
| 18 | oRHMirRLH_2 | D/M Right & Left Motor Output (2) |
| 17 | oRHMirUD_1 | D/M Up & Down Motor Output (1) |
| 16 | oRHMirUD_2 | D/M Up & Down Motor Output (2) |
| 15 | oASSwILm | SW Illumination Output |
| 14 | PDM14 | Not use (0 fixed) |
| 13 | PDM13 | Not use (0 fixed) |
| 12 | PDM12 | Not use (0 fixed) |
| 11 | PDM11 | Not use (0 fixed) |
| 10 | PDM10 | Not use (0 fixed) |
| 9 | PDM09 | Not use (0 fixed) |
| 8 | PDM08 | Not use (0 fixed) |
| 7 | PDM07 | Not use (0 fixed) |
| 6 | PDM06 | Not use (0 fixed) |
| 5 | PDM05 | Not use (0 fixed) |
| 4 | PDM04 | Not use (0 fixed) |
| 3 | PDM03 | Not use (0 fixed) |
| 2 | PDM02 | Not use (0 fixed) |
| 1 | PDM01 | Not use (0 fixed) |
| 0 | PDM00 | Not use (0 fixed) |

FIG.19

| No. | Control Names | Function Names | Input Signal No. | Output Signal No. |
|---|---|---|---|---|
| 1 | Front Turn Signal Control | front_rh_turn_signal | 5 | 4 |
| 2 | Rear Turn Signal Control | rear_lh_turn_signal | 7 | 2 |
| 3 | Back Up Lamp Control | back_up_lamp | 3 | 1 |
| 4 | Front Rear Light 1st Light Control | front_rear_lamp | 2 | 4 |
| 5 | Head Lamp Light-on Control | head_lamp | 6 | 3 |
| 6 | Rear Wiper Intermittent Control | rear_wiper | 2 | 1 |
| 7 | Rear Wiper Washer Control | rear_wash | 2 | 1 |
| 8 | Rear Defogger Control | rear_defog | 3 | 1 |
| 9 | AS Door Lock Control | as_door_lock | 9 | 6 |
| 10 | Satety Belt Alarm Control | safty_belt_alarm | 4 | 1 |
| 11 | Key Alarm Control | key_alarm | 2 | 1 |
| 12 | Light Alarm Control | light_alarm | 4 | 1 |
| 13 | Room Lamp Control | room_lamp | 11 | 2 |
| 14 | Door Mirror Control | door_mirror | 6 | 8 |
| 15 | Accessory Volt Control | accessory_volt | 4 | 5 |
| 16 | IGN Power Supply Control | ignition_volt | 3 | 9 |
| 17 | Rear Gate Release Control | rear_gate_open | 5 | 1 |
| 18 | Shift Interlock Control | shift_interlock | 4 | 2 |
| 19 | Vehicle Speed Control | vsp_out | 1 | 1 |
| 20 | High Mount Stop Lamp Control | high_mount_stoplamp | 1 | 1 |
| 21 | Horn Control | horn | 1 | 1 |
| 22 | Rear Dome Lamp Control | rear_doomlamp | 5 | 2 |
| 23 | Battery Lamp Indicator | battery_lamp | 4 | 1 |
| 24 | Brake Warning Lamp Control | brakewarning | 5 | 1 |
| 25 | DRL Indicator | drl_indicator | 4 | 1 |
| 26 | ABS Warning Signal | abs_indicator | 4 | 1 |
| 27 | MIL Indicator Lamp Control | mil_indicator | 7 | 6 |
| 28 | CCM Data Transfer Control | ccm_data_trans | 7 | 5 |
| 29 | PRNDL Decode Control | prndl_decode | 7 | 4 |
| 30 | Door Power Window Control | door_power_wind | 18 | 8 |
| 31 | Stop Lamp Diagnosis | stop_lamp_diuag | 7 | 2 |

FIG.21

```
2100  /*
2101   Function Name  :  front_rh_turn_signal
2102   Function       :  Front(RH) Turn Signal Control
2103   Argument       :  None
2104   Return Value   :  None
2105  /*

2106  void front_rh_turn_signal (void)
2107  {
2108    static byte q1 = 0x00;
2109    byte flug, before, after, time1, time2;
2110    byte or1, or2, or3 or4, and1, and2, and3, and4, and5;

2111    flug = P5.OR.BIT.B1;         /*Read Option Flag*/
2112    before = oPTurnRHF << 1 | oPturnLHF;  /*Read Output Signal Before Control*/
2113    or1 = (iIGNswOn_1 | iIGNswOn_2)
2114    and1 = or1 & iTrnSwRH;       /*Right Turn Signal*/
2115    and1 = or1 & iTrnSwLH;       /*Left Turn Signal*/

2116    and3 = iTrnSwRH & iTrnSwLH;  /*Detect Hazard State*/
2117    or2 = and3 | and1;           /*Right Turn Signal Display Condition*/
2118    or3 = and3 | and1;           /*Left Turn Signal Display Condition*/
2119    or4 = or2 | or3;             /*Oscillator Operate Condition*/
2120    time1 = T430MS;              /*Timer Set-up Value*/

2121    if(or4 = 0x01) {
2122      if(++Temp_timer[1]>=time1) {  /*Update Timer Count Value and Check*/
2123        q1 = (q1 = 0x01)?0x00 : 0x01;  /*Reverse Timer Output*/
2124        Temp_timer[1] = 0;       /*Reset Timer*/
2125      }

2126    }
2127    else {
2128      Temp_timer[1] = 0;         /*Reset Timer*/
2129      q1 = 0x00;
2130    }

2131    if(((flug = 0x01) && (and3 = 0x01)) and4 = !(q1 & or2); else and4 = q1 & or2;
2132    and5 = q1 & or3;
2133    if(and4 = 0x01) oPTurnRHF_On; else oPTurnRHF_Off;/*Output Right Turn Signal*/
2134    if(and5 = 0x01) oPTurnLHF_On; else oPTurnRHF_off;/*Output Left Turn Signal*/
2135    if(and4 = 0x01) TrnRHInd_On ; else TrnRHInd_OFF; /*Right Turn Signal Lamp*/

2136    if(and5 = 0x01) TrnLHInd_On ; else TrnRHInd_OFF; /*Left Turn Signal Lamp*/
2137    after = oPTurnRHF << 1 oPTurnLHF;  /*Read Output Signal After Control**/
2138    if(before ! = after)         /*Check Update Data*/
2139      Send_flug.OR.BIT.Fim = 1;  /*ON Of FIM Data Transfer Flag*/
2140    if(or2 = 0x00 && or3 = 0x00) {

2141      front_rh_turn_signal_Task_Off;   /*Control Task Release*/
2142    }
2143  }
```

FIG.23

```
2300  /*
2301   Function Name  :  rear_lh_turn_signal
2302   Function       :  Front(LH) Turn Signal Control
2303   Argument       :  None
2304   Return Value   :  None
2305  /*

2306  voide rear_lh_turn_signal (void)
2307  {
2308      static byte q1 = 0x00;       /*Timer Output*/
2309      byte flug, or1, or2, or3, or4, or5, and1, and2, and3, sw1, sw2;
                                       /*Internal Gate Circuit*/
2310      byte right_out, lift_out;

2311      byte before, after;
2312      before=(oTurnStpRHR << 1 | oTurnStpLHR);/*Read Output Signal Before control*/
2313      flug = P5.DR.BIT.B0       /*Read Option Flag*/
2314      or1 = (iIGNswOn_1 | iIGNswOn_2);
2315      and1 = iTrnSwRH & or1;       /*Right Turn Signal*/

2316      and2 = iTrnSwLH & or1;       /*Left Turn Signal*/
2317      and3 = iTrnSwRH & iTrnSwLH;  /*Detect Hazard*/
2318      or2 = and1 | and3;    /*Operate at Right Turn Signal or Hazard Signal*/
2319      or3 = and2 | and3;    /*Operate at Left Trun Signal or Hazard Signal*/
2320      or4 = or2 | or3;      /*Oscillator Operate Condition*/

2321      or5 = iStopSw | !(IBrkSw);   /*When Brake to Pressed*/
2322      if(or4 = 0x01) {
2323          if(Temp_timer[6]<T430MS)
2324              ++Temp_timer[6];     /*Count up Until 430 Sec*/
2325          else {

2326              Temp_timer[6] = 0x00;    /*Reset Count if Greater*/
2327              q1 = q1 ? 0x00 : 0x01   /*Reverse Timer Output*/
2328          }
2329      }
2330      else {

2331          q1 = 0x00;
2332          Temp_timer[6] = 0x00;
2333      }                            /*Turn sw Prierity*/
2334      sw1 = (or2 = 0x01) ? q1 : or5;
2335      if((flug = 0x01) && (and3 = 0x01)) right_out = !sw1;else right_out = sw1;

2336      sw2 = (or3 = 0x01) ? q1 : or5;   /* Turn sw Prierity*/
2337      left_out = sw2;
2338      if (right_out = 0x01) oTurnStpRHR_On; else oTurnStpRHR_OFF;
                                       /*Right Turn Signal Lamp*/
2339      if (left_out = 0x01) oTurnStpRHR_On; else oTurnStpLHR_OFF;
                                       /*left Turn Signal Lamp*/
2340      after=(oTurnStpRHR << 1 | oTurnStpLHR);/*Read Output Signal after control*/

2341      if(before ?= after)     /*Check Wpdate data*/
2342          Send_flug.DR.BIT.Rim = 1;    /*ON of RIM Data Transfer Flag*/
2343      if(or4 = 0x00     /*STOP Timer*/
2344          rear_lh_turn_signal Task_Off;    /*Control Task Release*/
2345  }
```

FIG.25

```
2500  /*
2501    Function Name  :  back_up_lamp
2502    Function       :  Backup Lamp Control
2503    Argument       :  None
2504    Return Value   :  None
2505  /*

2506  void back_up_lamp(void)
2507  {
2508    static byte timer_out = 0;
2509    byte or1, and1, and2;
2510    byte before, after;

2511    before = (oBackLamp);        /*Read Output Signal Before Control*/
2512    or1 = (iIGNswOn_1 | iIGNswOn_2);
2513    and1 = or1 & iPNP_Rvs;
2514    if(timer_out = 0x00 && and1 = 0x00 {   /*Counters Count up Condition*/
2515      if(++Temp_timer[7])>=T100MS) timer_out = 0x00;  /*Count stop Condition*/

2516    }
2517    and2 = timer_out & and1;
2518    if(and2 = 0x01) oBackLamp_On; else oBackLamp_Off;  /*Set Output*/
2519    after = (oBackLamp);       /*Read Output Signal After Control*/
2520    if(before!= after)         /*Check Update data*/

2521      Send_flug.DR.BIT.Rim = 1;    /*On of RIM Data Transfer Flag*/
2522    if(and1 = 0x00) {
2523      timer_out = 0x00;
2524      Temp_timer[7] = 0x00;       /*Reset Counter*/
2525      back_up_lamp_Task_Off;      /*Countrol Task Release*/

```
2700  /*
2701    Function Name  :  front_rear_light
2702    Function       :  Front Rear Light 1st Hight-on Control
2703    Argument       :  None
2704    Return Value   :  None
2705  /*

2706  void front_rear_light(void)
2707  {
2708    byte before, after;
2709    byte inv1, and1;
2710    before = iPosOn & iIGNswST;     /*Read Output Signal Before Control*/

2711    and1 = iPos & iIGNswST;         /*                      */
2712    if (and1 = 0x00) {
2713      oPosFIM_On;       /*Comb. Marker Lamp Output*/
2714      oPosRIM_On;       /*Rear Comb. Lamp Output*/
2715      oDRSwILm_On;      /*DR Door Illumi. Output*/

2716      oASSwILm_On;      /*AS Door Illumi. Output*/
2717    }
2718    else {
2719      oPosFIM_Off;      /*Off*/
2720      oPosRIM_Off;      /*Off*/

2721      oDRSwILm_Off;     /*Off*/
2722      oASSwILm_Off;     /*Off*/
2723    }
2724    after = (oPosFIM);              /*Read Output Signal After Control*/
2725    if (before! = after)            /*Check Updata Data*/

2726      Send_flug.DR.BIT.Fim = 1;     /*On Of FIM Data Tranfer Flag*/
2727      Send_flug.DR.BIT.Ddm = 1;     /*On Of DDM Data Tranfer Flag*/
2728      Send_flug.DR.BIT.Pdm = 1;     /*On Of PDM Data Tranfer Flag*/
2729      Send_flug.DR.BIT.Rim = 1;     /*On Of RIM Data Tranfer Flag*/
2730      front_rear_light_Task_Off;    /*Control Task Release*/

```
2900  /*
2901    Function Name  :  head_lamp
2902    Function       :  Head Lamp(Low & Hi Beam) Light On Control
2903    Argument       :  None
2904    Return Value   :  None
2905  /*

2906  void head_lamp(void)
2907  {
2908    static byte and4_=0x00, q=0x00;
2909    byte before, after;
2910    byte inv1, inv2, or1, or2, and1, and2, and3, and4, flug = 0x00;

2911    before = ((oLoBeam << 1 oHiBeam);       /*Read Output Value Before Control*/
2912    or2 = oLoBeam || oHibeam;
2913    inv1 = (iHiBeamSw) ? 0x00 : 0x00;        /*High Beam*/
2914    inv2 = (iIGNswST) ? 0x00 : 0x01;
2915    and1 = iIGNswST & inv1 & (!iLiteOn);     /*Low Beam Lamp On Condition*/

2916    and2 = iIGNswST & (!iLiteOn) & iHiBeamSw;  /*High Beam Lamp On condition*/
2917    or1 = inv2 | and2;
2918    and4 = or2 & oRcLock;
2919    if(and1 = 0x01) oLoBeam_On; else oLoBeam_Off;  /*Low Beam Lamp Output*/
2920    if(and2 = 0x01) oHiBeam_On; else oHiBeam_Off;  /*High Beam Lamp Output*/

2921    if(or1 = 0x01) HiBmInd_On; else HiBmiNd_Off;  /*High Beam Indicator Output*/
2922      if(and4_ = 0x00 && and4 = 0x01) q =0x01;    /*Counter's Count Map Condition*/
2923    if(q = 0x01) {
2924      if(++Temp_timer[17] . = T5S) {
2925        flug = 0x01;

2926        Temp_timer[17] = 0x00;
2927        q = 0x00;
2928      }
2929    }
2930    IF(flug = 0x01) {

2931      oLoBeam_Off; oHiBeam_Off;HiBmInd_Off;
2932    }
2933    and4_ = and4;
2934    after = ((oLoBeam << 1) | oHiBeam);     /*Read Output Signal After Control*/
2935    if(before != after)       /*Send Only If Singla Change*/

2936      Send_flug.OR.BIT.Fim = 1;    /*Flag On Of FIM Data Tranfer*/
2937    if(q = 0x00)
2938      head_lamp_Task_Off;     /*Head Lamp On Control Task Release*/
2939  }
```

FIG.31

```
3100 /*
3101    Function Name  :  rear_wiper
3102    Function       :  Rear Wiper Intermittent Control
3103    Argument       :  None
3104    Return Value   :  None
3105 /*

3106 void rear_wiper(boid)
3107 {
3108    byte before, after;
3109    byte or1, and1;
3110    before = (oRrWipCtL);        /*Read Output Singal After Control*/

3111    and1 = iIGNswAcc & (!iRrWip);
3112    if(and1 = 0x01)  {
3113      oRrWipCtL_On;              /*Rear Wiper Drive Signal On*/
3114    }
3115    else {

3116      oRrWipCtL_Off;             /*Rear Wiper Drive Signal Off*/
3117    }
3118    after = (oRrWipCtL);         /*Read Output Signal After Control*/
3119    if(before != after)          /*Send Only If Signal Changes*/
3120      Send_flug.DR.BIT.Rim = 1;  /*Flag On Of FIM Data Transfer*/

3121    rear_wiper_Task_Off;         /*Control Task Release*/
3122 }
```

FIG.33

```
3300  /*
3301    Function Name  :  rear_wash
3302    Function       :  Rear Wiper Washer Control (#6)
3303    Argument       :  None
3304    Return Value   :  None
3305  /*

3306  void rear_wash(void)
3307  {
3308    byte and;
3309    byte before, after;
3310    before = oRrWipWash;      /*Read Output Signal Before Control*/

3111    and1 = iIGNswAcc & (!iRrWipWash);
3112    if(and1) {
3113        oRrWipWash_On;       /*Rear Washer Motor Signal:On*/
3114        oRrWash_On;          /*Rear Washer Motor Drive Signal:On*/
3115    }

3116    else {
3117        oRrWipWash_Off;      /*Rear Washer Motor Signal:On (RIM) */
3118        oRrWash_Off;         /*Rear Washer Motor Drive Signal:Off (FIM) */
3119    }
3320    after = oRrWipWash;

3321    if(before != after) {    /*Send Only If Signal Changes*/
3322        Send_flug. DR. BIT. Rim = 1;  /*Data Transfer Flag On (RIM) */
3323        Send_flug. DR. BIT. Fim = 1;  /*Data Transfer Flag On (RIM) */
3324    }
3325    rear_wash_Task_Off;      /*Rear Wiper Washer Control Task Release*/

```
3500  /*
3501   Function Name  :  rear_defog
3502   Function       :  Rear Defogger Control
3503   Argument       :  None
3504   Return Value   :  None
3505  /*

3506  void rear_defog(void)
3507  {
3508    static byte q = 0. and1_;
3509    byte inv1, or1, and1;
3510    byte before., after;

3511    before = (oDeffog);        /*Read Output Signal Before Control*/
3512    inv1 = (iDefog) ? 0x00 ; 0x01;
3513    or1 = (iDGNswOn_1 | iIGNswOn_2);
3514    and1 = or1 & inv1;
3515    if((q = 0) && (and1_ = 0x00) && (and1 = 0x01)) q=0x01;

3516    if(q = 0x01) {             /*Counter's Count Up Condition*/
3517      if(++Dtimer )>= T10M) {  /*Counter Stop Condition*/
3518        q = 0x00;
3519        Dtimer = 0x00;
3520      }

3521    }
3522      if(((Dtimer )>= 0x5) && (and1_ = 0x00) && (and1 = 0x01)) (/*Forod reset*/
3523        q = 0x00;
3524        Dtimer = 0x00
3525    }

3526    if(or1 = 0x00) {          /*Reset By Ignition Off*/
3527      Dtimer = 0x00;
3528      q = 0x00;
3529    }
3530    and1_ = and1;

3531    if(q = 0x01) oDeffog_On; else oDeffog_Off; /*Defoggen On*/
3532    if(q = 0x01) DeffogInd_On; else DeffogInd_Off; /*Indicator On*/
3533    sfter = (oDeffog);        /*Read Output Signal After Control*/
3534    if(before != after)       /*Check Update Data*/
3535      Send_flug.DR.BIT.Rim = 1;   /*RIM Data Tranfer Flag On*/

3536    if(q = 0x00) {
3537      rear_defog_Task_Off;     /*Control Task Release*/
3538    }
3539  }
```

FIG.37

```
3700  /*
3701   Function Name  :  as_door_lock
3702   Function       :  AS Door Lock Control
3703   Argument       :  None
3704   Return Value   :  None
3705  */

3706  void as_door_lock(void)
3707  {
3708    byte or1, or2, or4;
3709    static byte or1_ 0x00, or2_ = 0x00, or4_ = 0x00;
3710    static byte q1 = 0x00, q2 = 0x00, q3 = 0x00, q4 = 0x00;

3711    byte before, after;
3712    before = ((oDrASLk_2 << 3) | (oDrASk_1 << 2) | (oDrDRLK_2 << 1) | oDrDRLk_1) ;
3713    OR1 = (!iDrASCLk) | (!iDrDRClk) | iRcLock | (!iGatoLkSw) ;
3714    or2 = iRcUnlock | (!iDrDRCUlk) | (!iDrASCUlk) | (!iGatoULkSw) ;
3715    or4 = iRcDrUnlk | (!iDDRCUlk) | (!iDrASCUlk) | (!iGatoULkSw) ;

3716  /*AS Lock Output*/
3717    if(or1_ = 0x00 && or1 = or1 = 0x01;  /*Rese Time Output set at 1*/
3718    if(or2 = 0x01) q1 = Temp_timer[8] = 0x00;
3719    if(q1 = 0x01 && Temp_timer[8] < T450MS {
3720      ++Temp_timer[8] ;    /*ADD if Output is 1 and Before 900m sec. */

3721      if((Temp_timer[8] >= T450MS)) {    /*Reset Condition*/
3722        q1 = 0x00;    /*If After 900m sec. or Q1 is '1' */
3723        Temp_timer[8] = 0x00;
3724      }
3725    }

3726  /*AS Unlock Output*/
3727    if(or2_ = 0x00 && or2 =0x01) q2 = 0x01;  /*Rise Time Output set at 1*/
3728    if(or1 = 0x01) q2 = Temp_timer[9] = 0x00;
3729    if(q2 = 0x01 && Temp_timer[9] < T450mS) {
3730      ++Temp_timer[9] ;    /*Add if Output is 1 and before 900m sec. */

3731      if((Temp_timer[9] >= T450MS)) {    /*Reset Condition*/
3732        q2 = 0x00;    /*If After /00m sec. or Q1 is '1' */
3733        Temp_timer[9] = 0x00;
3734      }
3735    }
```

FIG.38

```
3736 /*Lock Output*/
3737    if(or1_ = 0x00 && or1 =0x00) q3 = 0x01;  /*Rise Time Output set at 1*/
3738    if(or4 = 0x01) q3 = Temp_timer[10] = 0x00;
3739    if(q3 = 0x01 && Temp_timer[10] < T450MS) {
3740      ++Temp_timer[10];    /*Add if Output is 1 and before 900m sec.*/

3741      if((Temp_timer[10]= T450MS)) {    /*Reset Condition*/
3742        q3 = 0x00;    /*If after 900m sec or Q1 is '1'*/
3743        Temp_timer[10] = 0x00;
3744      }
3745    }

3746 /*DR Unlock Output*/
3747    if(or4_ = 0x00 && or4 = 0x01) q4 = 0x01;  /*Rise Time Output set at 1*/
3748    if(or1 = 0x01) q4 = Temp_timer[11] = 0x00;
3749    if(q4 = 0x01 && Temp_timer[11] < T450MS) {
3750      ++Temp_timer[9];    /*Add if Output is 1 and before 900m sec.*/

3751      if((Temp_timer[11] >= T450MS)) {    /*Reset Condition*/
3752        q4 = 0x00;    /*If Over 900m sec or Q1 is '1'*/
3753        Temp_timer[11] = 0x00;
3754      }
3755    }

3756      or1_ = or1; or2_ = or2; or4_ = or4;
3757      if(q1 = 0x01) oDrASLk_2_On; else oDrASLk_2_Off; /*AS Lock Output*/
3758      if(q1 = 0x01) oDraASLk_1_On; else oDrASLk_1_Off; /*AS Unlock Output*/
3759      if(q1 = 0x01) oRrDrLkMt_2_On; else oRrDrLkMt_2Off; /*RR.RL Lock Output*/
3760      if(q2 = 0x01) oRrDrLkMt_1_On; else oRrDrLkMt_1_Off; /*RR.RL Unlock Output*/

3761      if(q3 = 0x01) oDrDRLk_2_On; else oRrDrLkMt_1Off; /*DR Lock Output*/
3762      if(q4 = 0x01) oDrDRLk_1_On; else oRrDrLkMt_1_Off; /*DR Unlock Output*/
3763      after = ((oDrASLk_2 << 3) | (oDrASLk_1 << 2) | (oDrDRLk_2 << 1) | oDrDRLk_1);
3764      if(before != after) {    /*Check Update Data*/
3765        Send_flug.DR.BIT.Pdm = 1;    /*PDM Data Transfer Flag On*/

3766        Send_flug.DR.BIT.Rim = 1;    /*RIM Data Transfer Flag On*/
3767        Send_flug.DR.BIT.Ddm = 1;    /*DOM Data Transfer Flag On*/
3768      }
3769      if((q1 = 0x00) && (q2 = 0x00) && (q3 = 0x00) && (q4 = 0x00) {
3770        as_door_lock_Task_Off;    /*Control Task Release*/

```
4000  /*
4001   Function Name  :  safty_belt_alarm
4002   Function       :  Safety Belt Warning Control
4003   Argument       :  None
4004   Return Value   :  None
4005  */

4006  void safty_belt_alarm(void)
4007  {
4008    static word timer_1, timer_2;
4009    static byte q = 0x00, q1 = 0x00, q2 = 0x00;
4010    static byte and1_ = 0x00, and2_ = 0x00, inv1_ = 0x00, inv2_ = 0x00;

4011    byte and1, and2, inv1, inv2, inv3, or1;
4012    or1 = iIGNswOn_1 | iIGNswOn_2;
4013    and1 = or1 & (!iSftyBelt);
4014    and2 = iIGNswST & (!iSftyBelt);
4015    inv1 = and1 ? 0x00 : 0x01;

4016    inv2 = and2 ? 0x00 : 0x01;
4017    inv3 = or1 ? 0x00 : 0x01;
4018    if(((and2_ = 0x00) && (and2 = 0x01)) ||  /*Trigger Condition 1*/
4019       ((and2_ = 0x00) && (and2 = 0x01)) ||  /*Trigger Condition 2*/
4020       ((inv1_ = 0x00) && (inv1 = 0x01)) ||  /*Trigger Condition 3*/

4021       ((inv2_ = 0x00) && (inv2 = 0x01)) ||  /*Trigger Condition 4*/
4022       ) {
4023      Buzzer_task |= (1 << 3);
4024      q = 0x01; Temp_timer[12] = 0x00; Temp_timer[13] = 0x00;
4025      q1 = 0x01; timer_1 = 0x00;

4026      q2 = 0x01; timer_2 = 0x00;
4027    }
4028    if(q = 0x01) {       /*Counter's Count-up Condition*/
4029  /*Alarm Indicator Control*/
4030      ++Temp_timer[13];

4031      if((0 <= Temp_timer[13]) && (Temp_timer[13]<= T20S))   /*Light on Section*/
4032        q2 = 0x01;
4033        timer_1 = 0x00;
4034      }
4045      if((T20S <= Temp_timer[13]) && (Temp_timer[13]<= T70S))  /*Flash Section*/

4036        if(++timer_1 >= T500MS) {
4037          q2 = q2 ? 0x00 : 0x01;
4038          timer_1 = 0x00;
4039        }
4040        if(Temp_timer[13]>= T70S) {    /*End Display*/

4041          q = q2 ? 0x00;
4042          Temp_timer[13] = 0x00;
4043        }
4044      }
4045  }
```

FIG.41

```
4046    inv_1 = inv1; inv2_ = inv2; and1_ = and1; and2_ = and2
4047    if((inv3 = 0x01) || (iSftyBelt = 0x01))   (/*Reset Signal*/
4048      q = q1 = q2 = 0x00;
4049      Temp_timer[12] = Temp_timer[13] = 0x00;
4050      Buzzer_task & (1 << 3); Buzzer_flug = 0; /*Buzzer Task Release*/

4051    }
4052    if(q2 = 0x01) SftyBltWan_On; else SftyBltWan_Off;/*Indicator Output*/
4053      if(q = 0x00)   {
4054        Buzzer_flug = 0x00;
4055        safty_belt_alarm_Task_Off;    /*Control Task Release*/

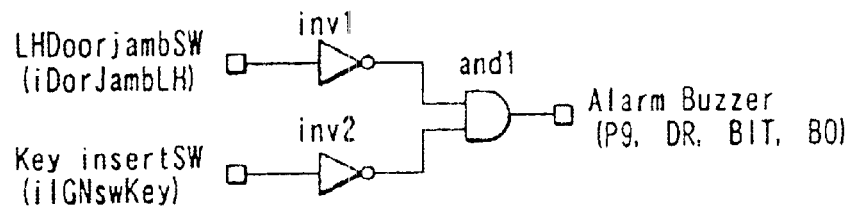

FIG.43

```
4300 /*
4301   Function Name :  Key alarm
4302   Function      :  Key Alarm Buzzer
4303   Argument      :  None
4304   Return Value  :  None
4305 /*
4306 void key_alarm(void)
4307 {
4308   byte inv1, inv2, and1, buzzer_num = 1;
4309   inv1 = (iIGNswKey) ? 0x00 : 0x01;
4310   inv2 = (iDorJamLH) ? 0x00 : 0x01;

4311   and1 = inv1 & inv2;
4312   if(and1 == 0x01) {
4313      Buzzer_task |= (1 << buzzer_num);   /*Start Buzzer Task1*/
4314   }
4315   else {

4316      Buzzer_task &= ~(1 << buzzer_num);   /*Release Buzzer Task1*/
4317      Buzzer_flug = 0;     /*Buzzer Off*/
4318   }
4319   key_alarm_Task_Off;     /*Release Control Task*/
4320 }
```

FIG.44

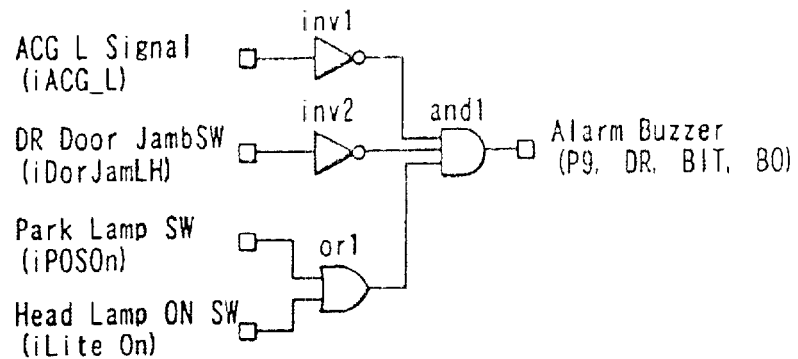

FIG.45

```
4500  /*
4501   Function Name : light_alarm
4502   Function      : Light On Alarm Control
4503   Argument      : None
4504   Return Value  : None
4505  /*

4506  void light_alarm(void)
4507  {
4508    byte inv1, inv2, or1, and1, buzzer_num = 2;
4509  /*  inv1 = (iACG_L) ? 0x00 : 0x01;*/
4510    inv1 = (RPM <= 0x02) ? 0x01 : 0x00;   /*'1' Before 100rpm of Engine Speed*/

4511  inv2 = (iDorJamLH) / 0x00 : 0x01;
4512    or1 = (!iLiteOn) | (iPosOn);
4513    and1 = inv1 & inv2 & or1;
4514    if(and1 == 0x01) {
4515      Buzzer_task |= (1 << buzzer_num);   /*Start Buzzer Task2*/

4516    }
4517    else {
4518      Buzzer_task &=~(1 << buzzer_num);   /*Release Buzzer Task2*/
4519      Buzzer_flug = 0;    /*Buzzer Off*/
4520    }

4521    Light_alarm_Task_Off:   /*Release Control Task*/
4522  }
```

FIG.47

```
4700  /*
4701   Function Name  :  room_lamp
4702   Function       :  Room Lamp Light On Control
4703   Argument       :  None
4704   Return Value   :  None
4705  */

4706  void room_lamp(void)
4707  {
4708      static byte ff1, ff2, ff3, q1, and2_, and3_, inv3_;
4709      byte inv1, inv2, inv3, inv4, inv5, inv6, or1, or2, or3, or4, or5, or6, or7,
             and1, and2, and3, tag1, tag2;
4710      byte before, after;

4711      static word timer;
4712      before = oRrDome;
4713      or5 = (iIGNswOn_1) | (iIGNswOn_2);
4714      inv1 = (iDorJamRH) ? 0x00 : 0x01;
4715      inv2 = (iDorJamLH) ? 0x00 : 0x01;

4716      inv5 = (iPDimOn) ? 0x00 : 0x01;
4717      inv6 = (iRearLamb) ? 0x00 : 0x01;
4718      or1 = inv1 | inv2 | inv6;
4719      inv3 = (or1) ? 0x00 : 0x01;
4720      inv4 = (or5) ? 0x00 : 0x01;

4721      or2 = iDrASHd1 | iDrRHd1 | iRcDrUnlk;
4722      and3 = iDorJamRH & iDorjamLH & (!iDrDRD1K) & (iRearJamb);
4723      and2 = and3 & or2 & inv4;
4724  /*Start 40 sec. Timer (Door Open)
4725      if((inv4 == 0x01) && (ff1 == 0x00) && (inv3_ == 0x00) && (inv3 == 0x01)) {

4726        if(ff2 == 0x01 || ff3 == 0x01) Temp_timer[15] = 0x00;
4727        timer = T40S;
4728        q1 = 0x01;
4729        ff1 = 0x01;
4730        ff2 = 0x01;

4731        ff3 = 0x00;
4732      }
4733  /*Start 40 sec. Timer (Door Handle & Keyless)
4734      if((ff2 == 0x00) && (and2_ == 0x00) && (and2 == 0x01) {
4735        if(ff1 == 0x01 || ff3 == 0x01) Temp_timer[15] = 0x00;

4736        timer = T40S;
4737        q1 = 0x01;
4738        ff2 = 0x01;
4739        ff1 = 0x00;
4740        ff3 = 0x00;

```
4742  /*Start 2Sec. Timer (Door Lock Detect)
4743    if((q1 = 0x01) && (ff3 == 0x00) && (and3_ == 0x00) && (and3 == 0x01)) {
4744      if(ff2 == 0x01 || ff1 == 0x01) Temp_timer[15] = 0x00;
4745      timer = T2S;

4746      q1 = 0x01;
4747      ff3 = 0x01;
4748      ff1 = 0x00;
4749      ff2 = 0x00;
4750    }

4751    if((q1 == 0x01) && (Temp_timer[15] < timer)) {   /*Timer Reset*/
4752      if((q1 == 0x01) && (Temp_timer[15] < timer)) {
4753        Temp_timer[15] = 0x00;
4754        q1 = 0x00;
4755        ff1 = ff2 = ff3 = 0x00;

4756      }
4757    }
4758    if(or == 0x01) {
4759      q1 = 0x00;
4760      Temp_timer[15] = 0x00;

4761    }
4762    tg1 = (or1 == 0x01) ? 0x01 : q1;
4763    tg2 = (or5 == 0x01) ? or1 : tg1;
4764    or6 = inv5 | tg2;
4765    if(or6 == 0x01) Cortsy_On; else Corsty_off;    /*Courtery Lamp Output*/

4766    or7 = or6 | iGateJambSw;
4767    if(or7 == 0x01) oRrDome_On; else oRrDome_Off   /*Dome Lamp Output*/
4768    after = oRrDome;
4769    if(before != after)
4770      Send_flug.DR.BIT =1;     /*RIM Data Transfer Flag On*/

4771    inv3_ = inv3; and2_ = and2; and3_ = and3;
4772    if(q1 == 0x00)
4773      room_lamp_Task_Off;      /*Release Control Task*/
4774  }
```

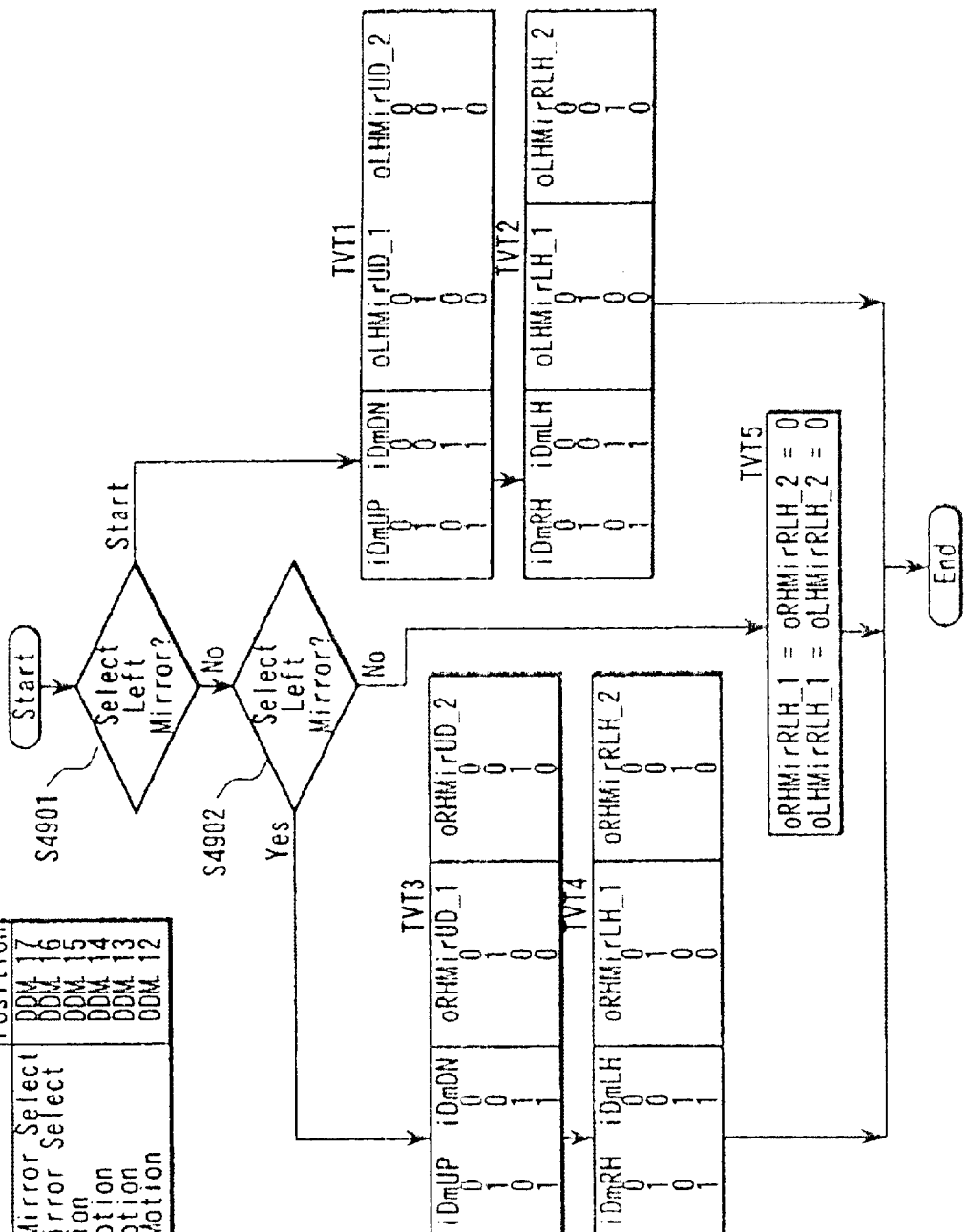

FIG.50

```
5000  /*
5001    Function Name  :  door mirror
5002    Function       :  Door Mirror Control
5003    Argument       :  None
5004    Return Value   :  None
5005  */
5006  void door_miroor(void)
5007  {
5008    byte drive_up_down, drive_left_right;
5009    drive_up_down = (iDmUP << 1) | iDmDN;  /*Vertical Direction SW UP:2, DOWN:1*/
5010    drive_left_right = (iDmRH << 1) | iDmLH;  /*Left Right Direction SW.
          Right:2, Left:1*/

5011    if(iDmLHSel == 0x01) {     /*Select Left Mirror*/
5012      switch(drive_up_down) {    /*Vertical SW, TVT1*/
5013        case 0:oLHMirUD_1_Off; oLHMirUD_2_Off; break; /*Right Vertical 1: Off,
              Right Vertical 1: Off*/
5014        case 1:oLHMirUD_1_Off; oLHMirUD_2_On; break;
5015        case 2:oLHMirUD_1_On; oLHMirUD_2_Off; break;

5016        case 3:oLHMirUD_1_Off; oLHMirUD_2_Off; break;
5017        default: break;
5018      }
5019      switch(drive_left_light) {    /*Right & Left SW, TVT2*/
5020        case 0:oLHMirRLH_1_Off; oLHMirRLH_2_Off; break; /*Right Left Right 1:Off,
              Right Left Right 2:Off*/

5021        case 1:oLHMirRLH_1_Off; oLHMirRLH_2_On; break;
5022        case 2:oLHMirRLH_1_On; oLHMirRLH_2_off; break;
5023        case 3:oLHMirRLH_1_Off; oLHMirRLH_2_On; break;
5024        default: break;
5025      }

5026    }
5027    else {                /*TVT5*/
5028      oLHMirUD_1_Off;   oLHMirUD_2_Off;
5029      oLHMirRLH_1_Off;  oLHMirRLH_2_Off;
5030    }
```

FIG.51

```
5031   if(iDmRHSel == 0x01)    /*Select Light Mirror*/
5032     switch(drive_up_down) {    /*Vertical SW TVT3*/
5033       case 0:oRHMirUD_1_Off; oRHMirUD_2_Off; break; /*Right Vertical 1:Off,
             Right Vertical 2:Off*/
5034       case 1:oRHMirUD_1_Off; oRHMirUD_2_Off; break;/**/
5035       case 2:oRHMirUD_1_On;  oRHMirUD_2_Off; break;/**/

5036       case 0:oRHMirUD_1_Off; oRHMirUD_2_Off; break;/**/
5037       default: break;
5038     }
5039     switch(drive_left_right) {    /*Right Left SW. TVT4*/
5040       case 0:oRHMirRLH_1_Off; oRHMirRLH_2_Off; break; /*Right, Left Right 1:Off,
             Right, Left Right 2:Off*/

5041       case 1:oRHMirRLH_1_Off; oRHMirRLH_2_On;  break;
5042       case 2:oRHMirRLH_1_On;  oRHMirRLH_2_Off; break;
5043       case 3:oRHMirRLH_1_Off; oRHMirRLH_2_Off; break;
5044       default: break;
5045     }

5046   {
5047   else {              /*TVT5*/
5048     oRHMirUD_1_Off;  oRHMirUD_2_Off;
5049     oRHMirRHL_1_Off; oRHMirRHR_2_Off;
5050   }

5051   Send_flug. DR. BIT. Ddm = 1;    /*Data Transfer Flag On (DDM) */
5052   Send_flug. DR. BIT. Pdm = 1;    /*Data Transfer Flag On (PDM) */
5053   door_mirror_Task_Off;    /*Control Task Release*/
5054 }
```

FIG.53

```
5300 /*
5301    Function Name  :  accessory_volt
5302    Function       :  Accessary Pouler Supply
5303    Argument       :  None
5304    Return Value   :  None
5305 /*
5306 void accessory_volt(void)
5307 {
5308 byte or1, and1, inv1;
5309   byte before, after;
5310   before = oRrWipPwr;

5311   or1 = iIGNswOn_1 | iIGNswOn_2 | iIGNswAcc;
5312   inv1 = iIGNswST;
5313   and1 = or1 & inv1;
5314   if(and == 0x01) {
5315     VbBat_On;        /*Battery Power Supply 1*/

5316     VbBat2_On;       /*Battery Power Supply 2*/
5317     VbBat3_On;       /*Battery Power Supply 3*/
5318     VbACC2_On;       /*Accessary Power Supply*/
5319     oRrWipPwr_On;    /*Rear Wiper Power Source Signal*/
5320   }

5321   else {
5322     VbACC_Off;       /*Accessory Power Supply*/
5323     oRrWipPwr_Off;   /*Rear Wiper Power Supply*/
5324   }
5325   after = oRrWipPwr;

5326   if(before != after) {
5327     Send_flug.DR.BIT.Rim = 1;    /*RIM Data Transfer Flag On*/
5328   }
5329   accessory_volt_Task_Off     /*Control Task Release*/
5330 }
```

5501    Function Name  :  ignition_volt
5502    Function       :  IGN Power Supply
5503    Argument       :  None
5504    Return Value   :  None
5505  /*

5506  void ignition_volt(void)
5507  {
5508    byte inv1;
5509    byte before, after, or1;
5510    before = olgn1outFIM;       /*Read Data Before Control*/

5511    inv1 = (iIGNswST) ? 0x00 : 0x01;      /*Starter SW(Active Low)*/
5512    or1 = (iIGNswOn_1) | (iIGNswOn_2) | (inv1);  /*Ignition SW*/
5513    if(or1 == 0x01)  {
5514      VbIGN1_On;          /*Ignition Power Supply 1*/
5515      VbIGN2_On;          /*Ignition Power Supply 2*/

5516      VbIGN3_On;          /*Ignition Power Supply 3*/
5517      VbBAT_On;           /*Battery Power Supply 1*/
5518      VbBAT2_On;          /*Battery Power Supply 2*/
5519      VbBAT3_On;          /*Battery Power Supply 3*/
5520      olgn1outFIM_On;     /*FIM Power Supply 1*/

5521      olgn2outFIM_On;     /*FIM Power Supply 2*/
5522      olgn3outFIM_On;     /*FIM Power Supply 3*/
5523    }
5524    else {
5525      VbIGN1_Off;         /*Ignition Power Supply 1 Off*/

5526      VbIGN2_Off;         /*Ignition Power Supply 2 Off*/
5527      VbIGN3_Off;         /*Ignition Power Supply 3 Off*/
5528      olgn1outFIM_Off;    /*FIM Power Supply 1 Off*/
5529      olgn2outFIM_Off;    /*FIM Power Supply 2 Off*/
5530      olgn3outFIM_Off;    /*FIM Power Supply 3 Off*/

5531    }
5532    after = olgn1outFIM;
5533    if(before != after) {
5534      Send_flug.DR.BIT.Fim = 1;    /*FIM Data Transfer Flag On*/
5535    }

5536    ignition_volt_Task_Off;       /*Control Task Release*/
5537  }
```

5701    Function Name : rear_gate_opem
5702    Function      : Rear Gate Release Control
5703    Argument      : None
5704    Return Value  : None
5705  */

5706  void rear_gate_open(void)
5707  {
5708    byte or1, and1, and2;
5709    staticv byte or1_ = 0x00, q1 = 0x00;
5710    byte before, after;

5711    before = (oGateOpen);
5712    and1 = iDrDRD1k & iGateReLease;
5713    or1 = and1 | (!iLftOpn) | iRcLftOpn;
5714    if(q1 == 0x00 && or1_ == 0x00 && or1 == 0x01) q1 = 0x01;/*Rise Time Output 1*/
5715    if(q1 == 0x01 &&) Temp_timer[14] < T700MS) {

5716      ++Temp_timer[14];    /*Add if Output is 1 and Before 700m sec. */
5717      if(Temp_timer[14] >= T700MS) {  /*Reset Condition*/
5718        q1 = 0x00;    /*After 700ms or if Q1 is '1' Rear Gate Lock Output*/
5719        Temp_timer[14] = 0x00;
5720      }

5721    }
5722    and = q1 & iPNP_LR;
5723    if(and2 == 0x01) oGateOpen_On; else oGateOpen_Off; /*Rear Gate Lock Output*/
5724    or1_ = or1;      /*Save OrR Value*/
5725    after = (oGateOpen);

5726    if(before != after)    /*Check data update*/
5727      send_flug.DR.BIT.Rim = 1;    /*RIM Data Transfer Flag On*/
5728    if(q1 == 0x00) {
5729      reat_gate_open_Task_Off;    /*Control Task Release*/
5730    }

5731  }
```

```
5900 /*
5901    Function Name : shift_interlock
5902    Function      : Shift Interlock Control
5903    Argument      : None
5904    Return Value  : None
5905 */
5906 void shift_intelock(void)
5907 {
5908    byte inv1, or1, and1;
5909    or1 = (iIGNswOn_1) | (iIGNswOn_2) | (!iIGNswST) ;
5910    and1 = or1 &iStopSW & iPNP_SI;

5911    inv1 = (and1) ? 0x00 : 0x01;
5912 if(inv1 == 0x01) SftItlok_On; else SftItlok_Off;/*Output Set*/
5913    Shift_interlock_Task_Off;    /*Control Task Release*/
5914 }
```

FIG.60

Stop Lamp SW (iStopSW) — Center Stop Lamp Output (oHiMountSTP)

FIG.61

```
6100  /*
6101   Function Name : high_mount_stoplamp
6102   Function      : high Mount Stop Lamp
6103   Argument      : None
6104   Return Value  : None
6105  */
6106  void high_mount_stoplamp (void)
6107  {
6108    byte before, after;
6109    before = oHiMountSTP;
6110    if(iStopSw == 0x01       /*Read Stop SW*/
6111      oHiMountSTP_On;
6112    else
6113      oHiMountSTP_Off;
6114    after = oHiMountSTP;
6115    if(before != after) {

6116      Send_flug.OR.BIT.Rim = 1;   /*RIM Data Transfer Flag On*/
6117    }
6118    high_mount_stop_Task_Off;    /*Control Task Release*/
6119  }
```

Horn SW (iHorn) — Horn Operation Signal (oHorn)

```
6300  /*
6301  Function Name :  horn
6302  Function      :  Horn Control
6303  Argument      :  None
6304  Return Value  :  None
6305  */
6306  void horn(void)
6307  {
6308    byte before, after;
6309    before = oHorn;
6310    if((!iHornSW) == 0x01)      /*Read Horn SW Data*/
6311      oHorn_On;
6312    else
6313      oHorn_Off;
6314    after = oHorn;
6315    if(before != after) {
6316      Send_flug.DR.BIT.Fim = 1;   /*FIM Data Tranfer Flag On*/
6317    }
6318    horn_Task_Off;               /*Control Task Release*/
6319  }
```

FIG.64

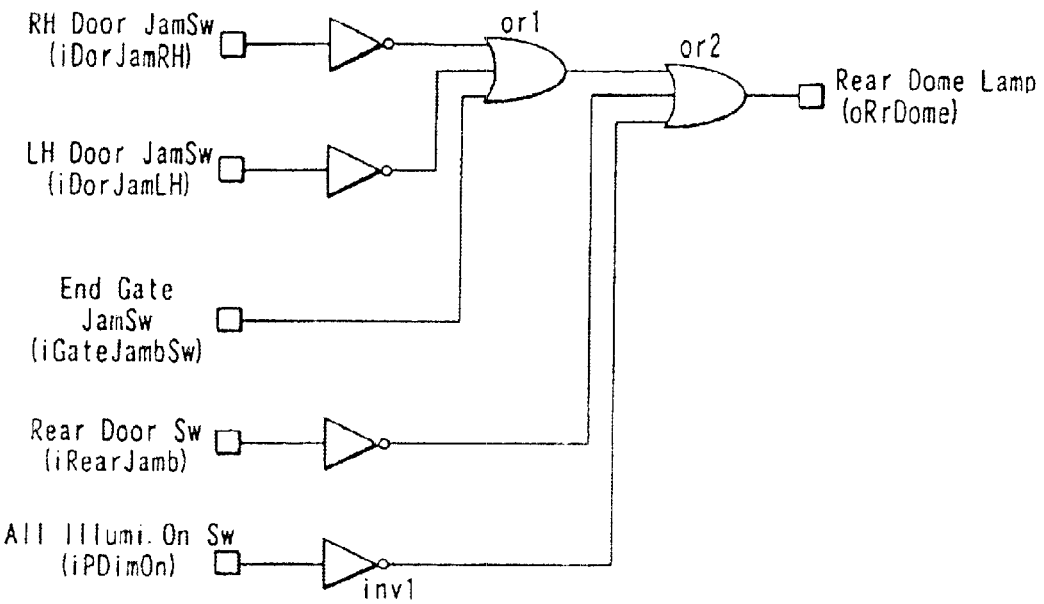

FIG.65

```
6500  /*
6501   Function Name  :  rear_doom_lamp
6502   Function       :  Rear Dome Lamp
6503   Argument       :  None
6504   Return Value   :  None
6505  /*

6506  void rear_doom_lamp (void)
6507  {
6508    byte before, after;
6509    byte inv1, or1, or2;
6510    before = oRrDome;

6511    inv1 = (iPDimOn) ? 0x00 : 0x01;    /*It All Illumi. SW is ON*/
6512    or1 = iGateJambSw | (!iDorJamRH) | (!iDorJamLH) ;
6513    or2 = or | (!iRearJamb) | inv1;
6514    if (or == 0x01) oRrDome_On; else oRrDome_OFF;  /*Input to End Gate Door SW*/
6515    after = oRDome;

6516    if (before != after)
6517       Send_flug.DR.BIT.RIM = 1;    /*RIM Data Transfer Flag ON*/
6518    rear_doom_lamp_Task_Off        /*Control Task Release*/
6519  }
```

FIG.66

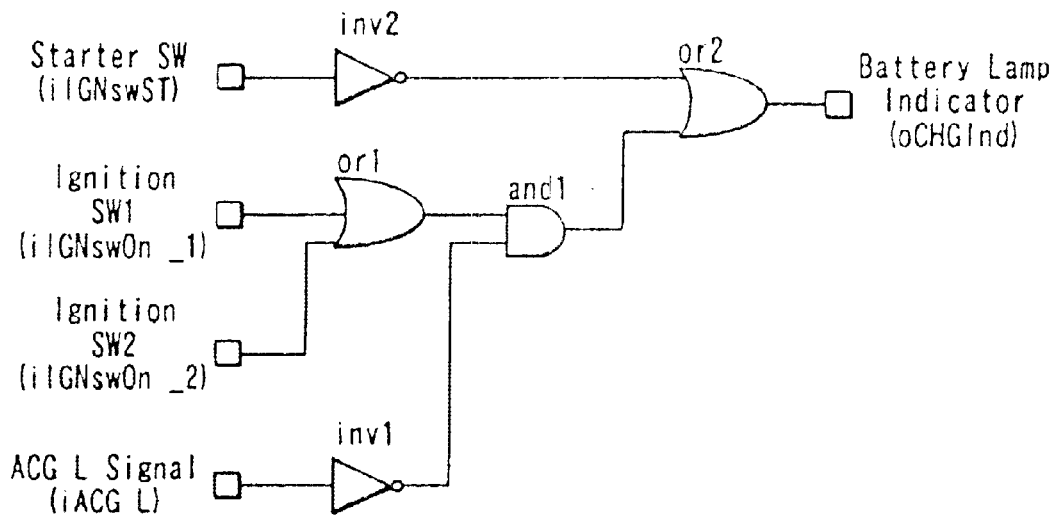

FIG.67

```
6700  /*
6701    Function Name : battery_lamp
6702    Function      : Battery Lamp Indicator
6703    Argument      : None
6704    Return Value  : None
6705  */

6706  void battery_lamp(void)
6707  {
6708    byte before, after;
6709    byte inv1, inv2, and1, or1, or2;
6710    before = oCHGInd;

6711    inv1 = (iACG_L) ? 0x00 : 0x01;       /*Signal Active Low*/
6712    inv2 = (iIGNswST) ? 0x00 : 0x01;     /*Starter Sw Active Low*/
6713    or1  = iIGNswOn_1 | iIGNswOn_2;
6714    and1 = or1 & inv1;
6715    or2  = inv2 | and1;

6716    if (or2 == 0x01) CHGInd_On; else CHGInd_Off;
6717    after = oCHGInd;
6718    battery_lamp_Task_Off;    /*Control Task Release*/
6719  }
```

```
6900  /*
6901    Function Name  :  brake_lamp
6902    Function       :  Brake Warning Lamp
6903    Argument       :  None
6904    Return Value   :  None
6905  */

6906  void brake_lamp(void)
6907  {
6908    byte inv1, inv2, and1, or1, or2, or3;
6909    inv1 = (iIGNswST) ? 0x00 : 0x01;      /*Starter SW Active Low*/
6910    inv2 = (iPkBrkWarn) ? 0x00 : 0x01;

6911    or1 = iIGNswOn_1 | iIGNswOn_2;
6912    or3 = inv2 | iVcmBrk;
6913    and1 = or1 & or3;
6914    or2 = inv1 | and1;
6915    if(or2 == 0x01) BrkWarn_On; else BrkWarn_Off;

6916    brake_lamp_Task_Off    /*Control Task Release*/
6917  }
```

FIG. 70

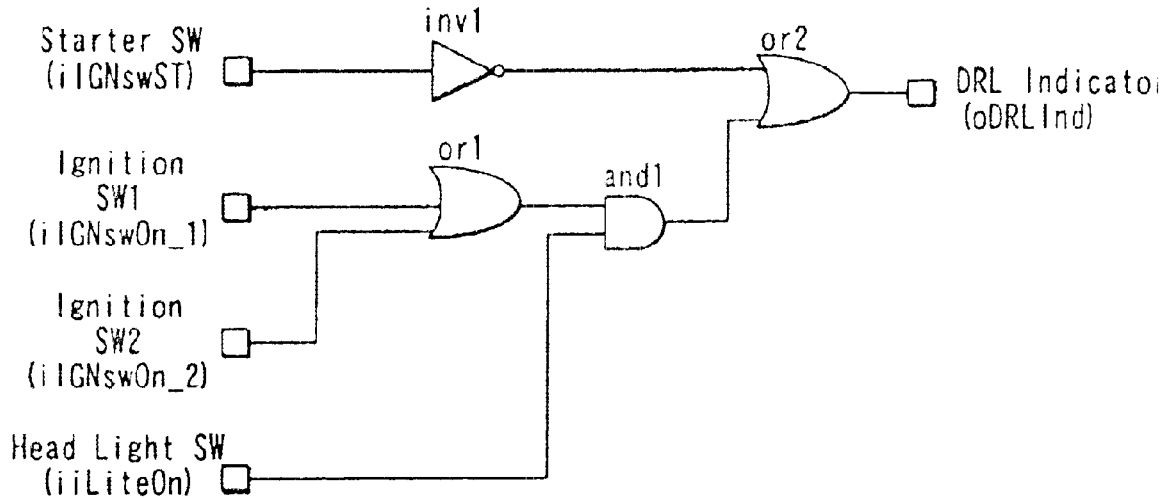

FIG. 71

```
7100  /*
7101     Function Name  :  drl_indicator
7102     Function       :  DRL Indicator Output
7103     Argument       :  None
7104     Return Value   :  None
7105  */

7106  void drl_indicator(void)
7107  {
7108     byte before, after;
7109     byte inv1, and1, or1, or;
7110     before = oDRLInd;

7111     inv = (iIGNswST) ? 0x00 : 0x01;    /*Starter SW Active Low*/
7112     or1 = iIGNswOn_1 | iIGNswOn_2;
7113     and1 = or1 & iLiteOn;
7114     or2 = inv1 | and1;
7115     if(or2 == 0x01) DRLInd_On; else DRLInd_Off;

7116     after = oDRLInd;
7117     drl_indicator_Task_Off;    /*Control Task Release
7118  }
```

FIG. 72

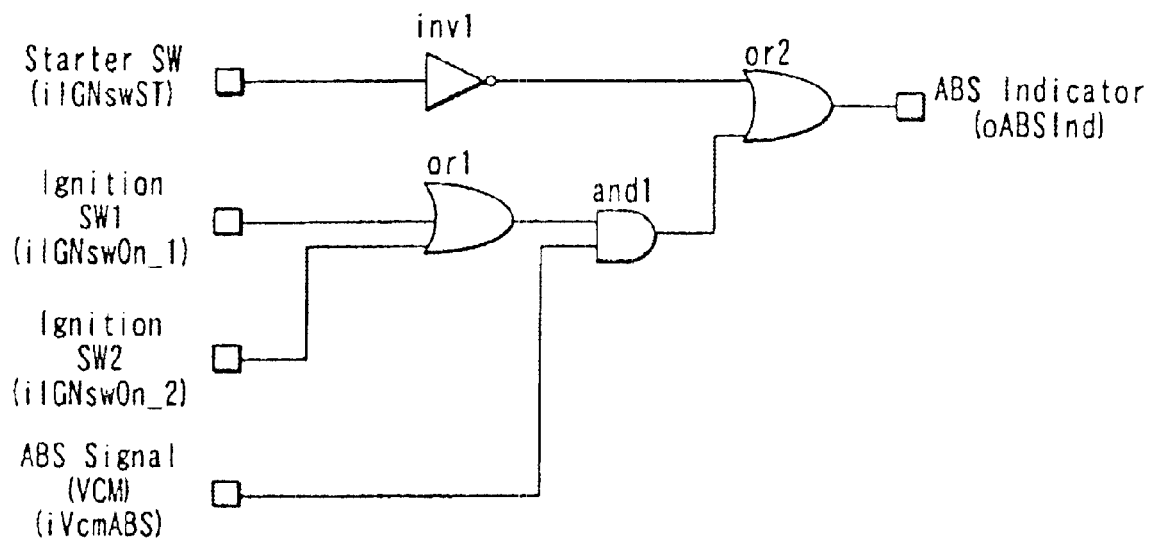

FIG. 73

```
7300  /*
7301   Function Name :  abs indicator
7302   Function      :  ABS Worning Signal
7303   Argument      :  None
7304   Return Value  :  None
7305  */

7306  void abs_indicator(void)
7307  {
7308    byte before, after;
7309    byte inv1, and1, or1, or2;
7310    before = oABSInd;

7311    inv1 = (iIGNswST) ? 0x00 : 0x01;    /*Starter SW Active Low*/
7312    or1  = iIGNswOn_1 | iIGNswOn_2;
7313    and1 = or1 & iVcmABS;
7314    or   = inv1 | and1;
7315    if (or2 == 0x01) ABSInd_On; else ABSInd_Off;

7316    after = oABSInd;
7317    abs_indicator_Task_Off    /*Control Task Release*/
7318  }
```

7501    Function Name  :  mil_indicator
7502    Function       :  MIL Indicator ON Control
7503    Argument       :  None
7504    Return Value   :  None
7505 /*

7506 void mil_indicator(void)
7507 {
7508    static byte timer2 = 0x00, buff2_ = 0x00, q2 = 0x00, q22 = 0x00;
7509    static byte timer3 = 0x00, buff3_ = 0x00, q3 = 0x00, q33 = 0x00;
7510    static byte timer4 = 0x00, buff4_ = 0x00, q4 = 0x00, q44 = 0x00;

7511    static byte timer5 = 0x00, buff5_ = 0x00, q5 = 0x00, q55 = 0x00;
7512    static byte or2 = 0x00;
7513    byte buff2, buff3, buff4, buff5, inv1, or2, or3, and1, and2, and3, and4, and5, ;
7514    inv1 = (iIGNswST) ? 0x00 : 0x01;
7515    or1 = iIGNswOn_1 | iIGNswOn_2;

7516    or2 = xFimSaNG | xDdmSsNG | XPdmSsNG | xRimSsNG;
7517    buff2 = xFimSsNG;
7518    buff3 = xDdmSsNG;
7519    buff4 = xPdmSsNG;
7520    buff5 = xRimSsNG;

7521    Short_flug = (xFimSsNG << 3) | (xPdmSsNG << 2) | (xPdmSsNG;)
7522    and1 = or1 & or2;
7523    or3 = inv1 | and1;
7524 /*FIM*/
7525    if (q2 == 0x00 && buff2_ = 0x00 && buff2 == 0x01) q2 =0x01;
```

FIG.75B

```
7526    if(q2 == 0x01) {      /*Indicator Flash*/
7527      if(++Temp_timer[2] < T10S) {
7528        if(++timer2 >=T250MS)
7529          q22 = q22 ? 0x00 : 0x01;
7530          timer2 = 0x00;

7531      }
7532    }
7533    else {
7534      Temp_timer[2] = 0x00;
7535      q2 = 0x00;

7536    }
7537    if(q22 == 0x01) FIMssInd_On; else FIMssind_Off;/FIM Short Sensor Indicate*/
7538  }
7539 /*DDin/*
7540    if(q3 == 0x00 && buff3_ == && buff3 == 0x01) q3 = 0x01;

7541    if(q3 == 0x01) {      /*Indicator Flash*/
7542      if(++Temp_timer[3] <= T10S) {
7543        if(++timer3 >= T250MS) {
7544          q33 = q33 ? 0x00 : 0x01;
7545          timer3 = 0x00;

7546      }
7547    }
7548    else {
7549      Temp_timer[3] = 0x00;
7550      q3 = 0x00;

7551    }
7552    if(q33 == 0x01) DDMssind_On ; else DDmssInd_Off;/*DOM Short Sensor Indicate*/
7553 }
```

FIG.76

```
7554  /*PDm*/
7555    if(q4 == 0x00 && buff4_ == 0x00 && buff == 0x01) q4 = 0x01;

7556    if(q4 == 0x01) {     /*Indicator Flashing*/
7557      if(++Temp_timer[4] <= T10S) {
7558        if(++timer[4] >= T250MS) {
7559          q4 = q44 ? 0x00 : 0x01;
7560          timer4 = 0x00;

7561        }
7562      }
7563      else {
7564        Temp_timer[4] = 0x00;
7565        q4 = 0x00;

7566      }
7567      if(q44 == 0x01) DDMssInd_On; else DDMssInd_Off;/*DDM Short Sensor Indicate*/
7568    }
7569  /*RIM*/
7570    if(q5 == 0x00 && buff5_ == 0x00 && buff5 == 0x01) q5 = 0x01;

7571    if(q5 == 0x01) {     /*Indicator Flash*/
7572      if(++Temp_timer[5] <= T10S) {
7573        if(++timer[5] >= T250MS) {
7574          q55 = q55 ? 0x00 : 0x01;
7575          timer5 = 0x00;

7576        }
7577      }
7578      else {
7579        Temp_timer[5] = 0x00;
7580        q5 = 0x00;

7581      }
7582      if(q55 == 0x01) DDMssInd_On; else DDMssInd_off;/*DDM Short Sensor Indicate*/
7583    }
7584    if(or == 0x01) MalFunInd _On; else MalFunInd?Off; /*Set Indicator*/
7585    if(or2_ == 0x00 && or2 == 0x01)

7586      Buzzer_task | = (1 << 0);      /*Start Buzzer Task*/
7587    or2_ = or2;
7588    buff2_ = buff2;
7589    buff3_ = buff3;
7590    buff4_ = buff4;

7591    buff5_ = buff5;
7592    if(q2 == 0x00 && q3 == 0x00 && q4 == 0x00 && q5 == 0x00) {
7593      FIMssInd_Off;     /*FIM Short Sensor Indicate*/
7594      DDMssInd_Off;     /*DDM Short Sensor Indicate*/
7595      PDMssInd_Off;     /*PDM Short Sensor Indicate*/

7596      RIMssInd_Off;     /*RIM Short Sensor Indicate*/
7597      mil_indicator_Task_Off    /*Control Task Release*/
7598    }
7599  }
```

7801  Function Name : ccm data trans
7802  Function      : CCM Data Transfer
7803  Argument      : None
7804  Return Value  : None
7805  */

7806  void ccm_data_trans(void)
7807  {
7808    byte before, after;
7809    byte inv1, inv2, inv3, inv4, and1, and2, and3, and4, or1;
7810    before = oCcmBrkLmp;

7811    or1  = iIGNswOn_1 | iIGNswOn_2;
7812    inv1 = iCcmOnOff ? 0x00 : 0x01;
7813    inv2 = iCcmS_C   ? 0x00 : 0x01;
7814    inv3 = iCcmR_A   ? 0x00 : 0x01;
7815    inv4 = iBrkSw    ? 0x00 : 0x01;

7816    and1 = or1 & inv1;
7817    and2 = or1 & inv2;
7818    and3 = or1 & inv3;
7819    and4 = or1 & inv4;
7820    if(iStopSw == 0x01) oCcmBrkLmp_On else oCcmBrkLmp_Off;

7821    if(and1 == 0x01) oCcmCrsOF_On; else oCcmCrsOF_Off;
7822    if(and2 == 0x01) oCcmCrsSC_On; else oCcmCrsSC_Off;
7823    if(and3 == 0x01) oCcmCrsRA_On; else oCcmCrsRA_Off;
7824    if(and4 == 0x01) oCcmBrkPd1_On; else oCcmBrkPd1_Off;
7825    after = oCcmBrkLmp;

7826    Send_flug_DR.BIT.Ccm = 1;    /*ccm Data Tranfer Flag ON*/
7827    ccm_data_trans_Task_Off;     /*Control Task Release*/
7828  }
```

FIG.79

| Input | | | | | Output | | | |
|---|---|---|---|---|---|---|---|---|
| HEX | $2^0$ | $2^1$ | $2^2$ | $2^3$ | | | | |
| 06 → | 1 | 0 | 1 | 0 | | | | |
| 0C → | 1 | 0 | 0 | 1 | | | | |
| 0F → | 1 | 1 | 1 | 0 | | | | |
| 05 → | 1 | 1 | 0 | 1 | | | | |
| 03 → | 0 | 1 | 1 | 0 | | | | |
| 09 → | 0 | 1 | 0 | 1 | | | | |
| 0A → | 0 | 0 | 1 | 0 | | | | |
| Others → | 0 | 0 | 0 | 0 | | | | |

Inputs: P/NP (1) Signal (iPNP_1) $2^0$, P/NP (2) Signal (iPNP_2) $2^1$, P/NP (3) Signal (iPNP_3) $2^2$, P/NP (4) Signal (iPNP_4) $2^3$ Outputs: PRNDL Signal 1 (oPRNDL1) $2^0$, PRNDL Signal 2 (oPRNDL2) $2^1$, PRNDL Signal 3 (oPRNDL3) $2^2$, PRNDL Signal 4 (oPRNDL4) $2^3$

8001    Function Name  :  prdnl decode
8002    Function       :  Gear Position Indication
8003    Argument       :  None
8004    Return Value   :  None
8005  */

8006  void prdnl_decode(void)
8007  {
8008    byte before, after;
8009    byte input;
8010    input = iPNP_1 << 3 | iPNP_2 | iPNP_3 << 1 | iPNP_4;
         /*Allocate Bit to Input Sinal*/

8011    switch(input) {
8012      case 0x06: PRNDL_1_On;   PRNDL2_Off;  PRNDL3_On;   PRNDL4_Off; break;
8013      case 0x0C: PRNDL_1_On;   PRNDL2_Off;  PRNDL3_Off;  PRNDL4_On;  break;
8014      case 0x0F: PRNDL_1_On;   PRNDL2_On;   PRNDL3_On;   PRNDL4_On;  break;
8015      case 0x05: PRNDL_1_On;   PRNDL2_On;   PRNDL3_Off;  PRNDL4_Off; break;

8016      case 0x03: PRNDL_1_Off;  PRNDL2_On;   PRNDL3_On;   PRNDL4_Off; break;
8017      case 0x09: PRNDL_1_Off;  PRNDL2_On;   PRNDL3_Off;  PRNDL4_On;  break;
8018      case 0x0A: PRNDL_1_Off;  PRNDL2_Off;  PRNDL3_On;   PRNDL4_Off; break;
8019      default:   PRNDL1_Off;   PRNDL2_Off;  PRNDL3_Off;  PRNDL4_Offbreak;
8020    }

8021    prndl_decode_Task_Off;    /*Control Task Release*/
8022  }
```

8201    Function Name  :  door power wind
8202    Function       :  DR Power Window Control
8203    Argument       :  None
8204    Return Value   :  None
8205  /*

8206  void door_power_wind(void)
8207  {
8208     static byte q1 = 0x00;
8209     byte before1, after1, before2, after2, before3, after3, before4, after4;
8210     byte or1, or2, or3, and1, and2, and3, and4, inv1, inv2, inv3, inv4;
         /*Internal Gate Circuit*/

8211     byte or11, or12, or13, and11, and12, and13, and14, inv11;
8212     byte or21, or22, or23, and21, and22, and23;
8213     byte or31, or32, or33, and31, and32, and33;
8214     before1 = (oPwAS_1 << 1) | (oPwAS_2)
8215     before2 = (oPwRR_1 << 1) | (oPwRR_2)

8216     before3 = (oPwRL_1 << 1) | (oPwRL_2)
8217     before4 = (oPwDR_1 << 1) | (oPwDR_2)
8218  /*AS Power Window*/
8219     or11 = iIGNswOn_1 | iIGNswOn_2;        /*Ignition Key-on*/
8220     inv11 = (iPwLKSw == 0x01) ? 0 : 1;     /*Lock Swtch Reversal*/

8221     and11 = or11 & inv11;
8222     or12 = iDRPwFRUp | iPwFRUp;
8223     or13 = iDRPwFRDn | iPwFRDn;
8224     and12 = and1 & or12;
8225     and13 = and1 & or13;

8226     and14 = and11 & (!and13);
8227     if(and14 == 0x01) oPwAS_1_On; else oPwAS_1_Off;  /*Up Output*/
8228     if(and13 == 0x01) oPwAS_2_On; else oPwAS_2_Off;  /*Down Output*/
8229  /*RR Power Window*/
8230     or22 = iDRPwRRUp | iPwRRUp;

8231     or23 = iDRPwRRDn | iPwRRDn;
8232     and22 = and11 & or22;
8233     and23 = and11 & or23;
8234     and21 = and22 & (!and23);
8235     if(and21 == 0x01) oPwRR_1_On; else oPwRR _1_Off;  /*Up Output*/

8236     if(and23 == 0x01) oPwRR_2_On; else oPwRR _2_Off;  /*Down Output*/
```

FIG.83

```
8237  /*RL Power Window*/
8238    or32 = iDRPwRLUp | iPwRLUp;
8239    or33 = iDRPwRLDn | iPwRLDn;
8240    and32 = and11 & or32;

8241    and32 = and11 & or33;
8242    and31 = and32 & (!and33);
8243    if(and31 == 0x01) oPwRL_1_On; else oPwRL_1_Off; /*Up Output*/
8244    if(and33 == 0x01) oPwRL_2_On; else oPwRL_2_Off; /*Down Output*/
8245  /*DR Power Window*/

8246    inv3 = (or11) ? 0x00 : 0x01;
8247    or1 = inv3 | iPwMtLK | iDRPwFLUp;
8248    and = iDRPwFLUp & or11;
8249    and2 = or11 & iDRPwFLDn;
8250    if(and2 == 0x01) {

8251    ++Temp_timer[0];       /*500ms. Timer*/
8252    }
8253    if(and2 == 0x00) Temp_timer[0] =0;
8254    if(Temp_timer[0] >= T500MS) {
8255      q1 = 0x01;         /*Output 1 at 500 ms of count*/

8256    }
8257    if(or1 == 0x01) q1 = Temp_timer[0] = 0;  /*Timer Reset Signal*/
8258    or2 = q1 | nad2;
8259    if(and1 == 0x01) oPwDR_1_On; else oPwDR_1_Off; /*Up Output*/
8260    if(or2 == 0x01) oPwDR_2_On; else oPwDR_2_Off; /*Down Output*/

8261    after1 = (oPwAS_1 << 1) | (oPwAS_2);
8262    after2 = (oPwRR_1 << 1) | (oPwRR_2);
8263    after3 = (oPwRL_1 << 1) | (oPwRL_2);
8264    after4 = (oPwDR_1 << 1) | (oPwDR_2);
8265  */ if(before1 != after1) */   /*Check AS Data Change*/

8266      Send_flug.DR.BIT.Pdm = 1;   /*PDM Data Tranfer Flag On*/
8267  */ if(before2 != after2) */   /*Check PR Data Change*/
8268      Send_flug.DR.BIT.Pim = 1;   /*PIM Data Tranfer Flag On*/
8269  */ if(before3 != after3) */   /*Check PL Data Change*/
8270      Send_flug.DR.BIT.Pim = 1;   /*Pim Data Tranfer Flag On*/

8271  */ if(before4 != after4) */   /*Check DR Data Change*/
8272      Send_flug.DR.BIT.Ddm = 1;   /*DDM Data Tranfer Flag On*/
8273    if(and2 == 0x00 || or1 == 0x01)  /*Timer Stop*/
8274      door_power_wind_Task_Off;    /*Control Task Release*/
8275    }
```

FIG.84

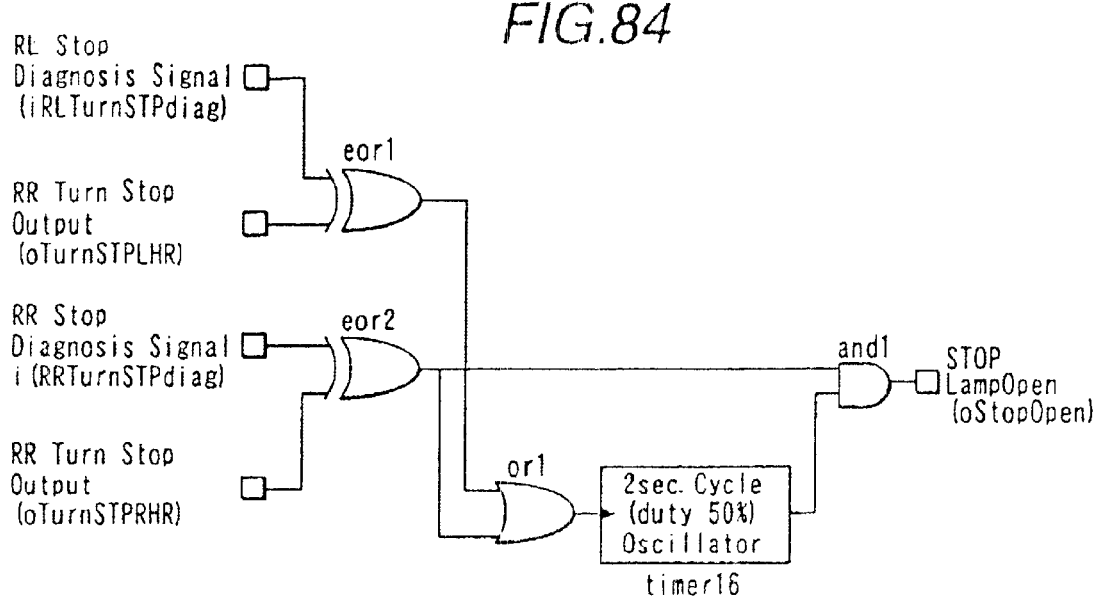

FIG.85

```
8500  /*
8501  Function Name  :  stop lamp diag
8502  Function       :  Stop Lamp Diagnosis
8503  Argument       :  None
8504  Return Value   :  None
8505  */

8506  void stop_lamp_diag(void)
8507  {
8508    byte eor1, eor2, or1, and1;
8509    static byte q = 0x00;
8510    eor1 = iRLTurnsSTPdiag ^ oTurnStpLHR;    /*Left Lamp Diag. Signal Check*/

8511    eor1 = iRRTurnsSTPdiag ^ oTurnStpRHR;    /*Right Lamp Diag. Signal Check*/
8512    or1 = eor1 | eor2;
8513    if(or == 0x01) {      /*Oscillator Enable*/
8514      if(++Temp_timer[16] >= T1S) {
8515        q = q ? 0 : 1;    /*Oscillator Output Reversal*/
8516        Temp_timer[16] = 0;    /*Timer Reset*/
8517      }
8518    }
8119    and1 = q & eor1;
8520    if(and1 == 0x01) StopOpen_On;else StopOpen_Off; /*Flash*/

8521    if(or1 == 0x00)
8522      stop_lamp_diag_Task_Iff;    /*Control Task Release
8523  }
```

ELECTRIC POWER SUPPLY SYSTEM FOR A VEHICLE

This application is a continuation of application Ser. No. 09/403,424, filed Oct. 21, 1999, and now U.S. Pat. No. 6,420,799.

TECHNICAL FIELD

The present invention relates to an electric power supply system for a vehicle, and particularly to an electric power supply system for use in a vehicle such as an automobile and the like, in which an electric power is supplied to electrical loads from a power supply source such as a battery for an automobile.

BACKGROUND ART

In a conventional electric power supply for a vehicle, for example, in an electrical power supply system for an automobile, in order to supply power from a battery to its electrical loads such as lamps, motors and the like, a plurality of power lines are laid out for connecting between respective electrical loads and the battery. For a recent automobile, which has an increased number of electrical loads compared to the conventional automobile, the number of power lines has increased significantly. Further, because it is necessary to provide power lines not only for connection between respective electrical loads and the battery but also for connection between switches that control the respective electrical loads and the battery, a total distance of extension of the power lines has increased substantially. Any such increases in the number of power supplies and the total distance of extension of power lines, which leads to an increase in weight of the vehicle body, will deteriorate fuel mileage.

Therefore, for example, as described in the brochure of International Publication WO 96/26570 (1996), it is proposed that by connecting a plurality of relay circuits (control modules) to a power line which is laid out in a loop, then a plurality of electrical loads are connected respectively to each of these relay circuits through which to supply power thereto.

However, the prior art disclosed in the brochure of International Publication WO 96/26570 (1996) is associated with one problem that because every control modules are connected to a single loop power line, if a fault occurs in one of the control modules, the other control modules may be affected, and in a worst case, it becomes difficult to control the engine itself, which is an essential function for the automobile.

Further, the prior art disclosed in the brochure of the International Publication WO 96/26570 (1996) is associated with a second problem as will be described below. Although when the power line is short-circuited, its electrical loads are isolated from the power line by operating its switching devices, no countermeasure, however, is taken for a case where an over-current flows through an electrical load due to failure in the electrical load itself or the like. In order to prevent the occurrence of over-current, a fuse may be used. However, in order to improve easiness of fuse exchange, it has been preferred to place a plurality of fuses in one concentrated area. In order to place the plurality of fuses in one concentrated area, it becomes necessary to provide for additional power lines to connect between the plurality of fuses that are placed in one concentrated area and their associated electrical loads, consequently failing to reduce the length of the power lines.

The prior art technologies similar to the above are disclosed in the following documents. JPA Laid-Open Nos. 9-275632, 10-4632, 10-20970, U.S. Pat. Nos. 4,652,853 and 4,739,183.

DISCLOSURE OF INVENTION

A first object of the invention is to provide for an electric power supply apparatus for a vehicle, which minimizes proliferation of adverse effect on the other control modules than that is directly involved.

A second object of the invention is to provide for an electric power supply apparatus for the vehicle, which can reduce a total length of its power lines.

(1) The above objects of the invention can be accomplished by provision of an electric power supply system which is comprised of: an electric power source, a plurality of control modules for a plurality of accessory systems connected to the electric power source via a power line; and a power control module for controlling a drive source of the vehicle, which is connected to the electric power source via another power line that is different from the above-mentioned power line.

According to this arrangement described above, because of the provision of the another power line for supplying power of PCM for controlling the engine itself, which is independent from the power line PL for the accessory systems, PCM 20 for controlling the engine is ensured to function normally even if a failure of the control modules for the accessory systems occurs.

(2) The above objects of the invention can be accomplished by provision of an arrangement which is comprised of: an electric power source; a plurality of control modules for a plurality of accessory systems, which are connected to the electric power source via electric power line; and an air-conditioner, which is connected to the electric power source via another power line that is different from the above-mentioned power line.

According to this arrangement of the invention, because of the provision of a dedicated power line for the air-conditioner that consumes a large electric current independent from the power line PL for the accessory systems, normal operation of the automobile is ensured even if the air-conditioner fails.

(3) The above-mentioned objects of the invention can be accomplished by provision of an arrangement which is comprised of: an electric power source; a plurality of control modules for a plurality of accessory systems connected to the electric power source via power lines; and an information device that is connected via another power line which is different from the above-mentioned power lines.

According to this arrangement of the invention, because of the provision of a dedicated power line for the auxiliary information device that assists the operation of the automobile independent from the power lines PL for the accessory systems, the normal operation of the automobile is ensured even if the information device fails.

(4) The above-mentioned objects of the invention can be accomplished by provision of an arrangement which is comprised of: an electric power source; a plurality of control modules for a plurality of accessory systems connected to the electric power source via power lines; a plurality of input means for inputting an input signal to these control modules; a plurality of electrical loads; a plurality of switch devices each connected between the electric power line and the plurality of electrical loads, and having a protection function; and a signal line for transmitting a signal between the plurality of the control modules for the plurality of the accessory systems, wherein by using data processing means provided at least in one of the plurality of the control modules for the plurality of accessory systems, the switch device is controlled in response to an input signal from the input means so as to supply power from the power source to the electrical load via the power line.

According to this arrangement as described above, because the electrical load is supplied with power from supply line PL via its switching device that is controlled by its control module, it becomes possible to reduce the number of power lines, and further, by using as its switching device a MOS FET provided with a protective function, which can prevent for a total length of the power line from increasing due to a necessity of its lengthy layout, it becomes possible to minimize the power lines in the electric power supply system for the vehicle.

(5) The first and the second objects of the invention can be accomplished by provision of an arrangement according to the invention that is comprised of: a power source; a plurality of control modules for a plurality of accessory systems connected to this power source via a power line; a switching device that is connected between the power line and an electrical load, has a protective function, and is controlled in response to a signal from the control module so as to supply power to the electrical load from the power source via the power line; and a power control module that is connected to the power source via another power line different from the above-mentioned power line for controlling the drive source of the vehicle.

According to this arrangement of the invention, because of the provision of an independent power line for supplying power to PCM for controlling the engine itself, which is different from the power line PL for the accessory systems, it becomes possible for PCM 20 which executes the engine control to be ensured to operate normally even if there occurs a failure in the other control modules for the accessory systems. Further, because the electrical load is supplied with power from the power line PL via the switching device that is controlled by the control module associated therewith, it becomes possible to reduce the number of power lines. Still further, because the MOS FET provided with the protective function is used as its switching device, which can prevent for the total length of the power lines from increasing due to a lengthy extension of layout of the power lines, the length of the power lines in the electric power supply system for the vehicle can be minimized.

BRIEF DESCRIPTION OF THE DRAWINGS

Other objects and features of the invention will become apparent from the following description of embodiments with reference to the accompanying drawings, in which:

FIG. 4 is a drawing of an input bit map at module address "#0" of BCM according to this embodiment of the invention;

FIG. 5 is a drawing of an input bit map at module address "#1" of BCM according to the embodiment of the invention;

FIG. 6 is a drawing of an output bit map of BCM according to the embodiment of the invention;

FIG. 8 is a drawing of an input bit map at module address "#2" of VCM according to the embodiment of the invention;

FIG. 10 is an I/O bit map drawing at module address "#3" of FIM according to the embodiment of the invention;

FIG. 12 is an I/O bit map drawing at module address "#4" of DDM according to the embodiment of the invention;

FIG. 14 is an I/O bit map drawing at module address "#5" of RIM according to the embodiment of the invention;

FIG. 16 is an input bit map drawing at module address "#6" of CCM according to the embodiment of the invention;

FIG. 18 is an I/O bit map drawing at module address "#7" of PDM according to the embodiment of the invention;

FIG. 19 is a drawing indicating a list of control tasks in an electric power supply system for the automobile according to one embodiment of the invention;

FIG. 21 is a programming flowchart of the front-turn-signal control task to be executed by CPU in the electric power supply system for the automobile according to one embodiment of the invention;

FIG. 23 is a programming flowchart for a rear-turn-signal control task to be executed by CPU in the electric power supply system for the automobile according to one embodiment of the invention;

FIG. 25 is a programming flowchart of a backup-lamp control task to be executed by CPU in the electric power supply system for the automobile according to one embodiment of the invention;

FIG. 27 is a programming flowchart of a front-rear-light control task to be executed by CPU in the electric power supply system for the automobile according to one embodiment of the invention;

FIG. 29 is a programming flowchart for a head lamp control task to be executed by CPU in the electric power supply system for the automobile according to one embodiment of the invention;

FIG. 31 is a programming flowchart of a rear wiper intermittent control task to be executed by CPU in the electric power supply system for the automobile according to one embodiment of the invention;

FIG. 33 is a programming flowchart of a rear wiper washer control task to be executed by CPU in the electric power supply system for the automobile according to one embodiment of the invention;

FIG. 35 is a programming flowchart of a rear defogger control task to be executed by CPU in the electric power supply system for the automobile according to one embodiment of the invention;

FIG. 37 is a programming flowchart of a rear defogger control task to be executed by CPU in the electric power supply system for the automobile according to one embodiment of the invention;

FIG. 38 is a programming flowchart of a rear defogger control task to be executed by CPU in the electric power supply system for the automobile according to one embodiment of the invention;

FIG. 40 is a programming flowchart of a sheet belt alarm control task to be executed by CPU in the electric power supply system for the automobile according to one embodiment of the invention;

FIG. 41 is a programming flowchart of a sheet belt alarm control task to be executed by CPU in the electric power supply system for the automobile according to one embodiment of the invention;

FIG. 42 is a function block diagram indicating a control specification for a key-forget alarm control in the electric power supply system for the automobile according to one embodiment of the invention;

FIG. 43 is a programming flowchart of a key-forget alarm control task to be executed by CPU in the electrical power supply system for the automobile according to one embodiment of the invention;

FIG. 44 is a function block diagram indicating a control specification for a light-on forget alarm control in the electric power supply system for the automobile according to one embodiment of the invention;

FIG. 45 is a programming flowchart of a light-on forget alarm control task to be executed by CPU in the electric power supply system for the automobile according to one embodiment of the invention;

FIG. 47 is a programming flowchart of a room lamp turn-on control task to be executed by CPU in the electric power supply system for the automobile according to one embodiment of the invention;

FIG. 48 is a programming flowchart of a room lamp turn-on control task to be executed by CPU in the electric power supply system for the automobile according to one embodiment of the invention;

FIG. 49 is a flowchart indicating a control specification for a door mirror control in the electric power supply system for automobile according to one embodiment of the invention;

FIG. 50 is a program flowchart of a door mirror control task to be executed by CPU in the electric power supply system for automobile according to one embodiment of the invention;

FIG. 51 is a program flowchart of a door mirror control task to be executed by CPU in the electric power supply system for automobile according to one embodiment of the invention;

FIG. 53 is a program flowchart of an accessory power supply control task to be executed by CPU in the electric power supply system for automobile according to one embodiment of the invention;

FIG. 55 is a program flowchart of an IGN power supply control task to be executed by CPU in the electric power supply system for automobile according to one embodiment of the invention;

FIG. 57 is a program flowchart of a rear gate release control task to be executed by CPU in the electric power supply system for automobile according to one embodiment of the invention;

FIG. 60 is a function block diagram indicating a control specification for a high-mount stop lamp control in the electric power supply system for automobile according to one embodiment of the invention;

FIG. 61 is a program flowchart of a high-mount stop lamp control task to be executed by CPU in the electric power supply system for automobile according to one embodiment of the invention;

FIG. 64 is a function block diagram indicating a control specification for a rear-dome lamp control in the electric power supply system for automobile according to one embodiment of the invention;

FIG. 65 is a program flowchart of a rear-dome lamp control task to be executed by CPU in the electric power supply system for automobile according to one embodiment of the invention;

FIG. 66 is a function block diagram indicating a control specification for a battery indicator control in the electric power supply system for automobile according to one embodiment of the invention;

FIG. 67 is a program flowchart of a battery indicator control task to be executed by CPU in the electric power supply system for automobile according to one embodiment of the invention;

FIG. 70 is a function block diagram indicating a control specification for a DRL indicator control in the electric power supply system for automobile according to one embodiment of the invention;

FIG. 71 is a program flowchart of a DRL indicator control task to be executed by CPU in the electric power supply system for automobile according to one embodiment of the invention;

FIG. 72 is a function block diagram indicating a control specification for an ABS alarm control in the electric power supply system for automobile according to one embodiment of the invention;

FIG. 73 is a program flowchart of an ABS alarm control task to be executed by CPU in the electric power supply system for automobile according to one embodiment of the invention;

FIG. 75 is a program flowchart of a MIL turn-on control task to be executed by CPU in the electric power supply system for automobile according to one embodiment of the invention;

FIG. 76 is a program flowchart of a MIL turn-on control task to be executed by CPU in the electric power supply system for automobile according to one embodiment of the invention;

FIG. 78 is a program flowchart of a CCM data transfer control task to be executed by CPU in the electric power supply system for automobile according to one embodiment of the invention;

FIG. 79 is a function block diagram indicating a control specification for a PRNDL decoder control in the electric power supply system for automobile according to one embodiment of the invention;

FIG. 80 is a program flowchart of a PRNDL decoder control task to be executed by CPU in the electric power supply system for automobile according to one embodiment of the invention;

FIG. 82 is a program flowchart of a door's power-driven window control task to be executed by CPU in the electric power supply system for automobile according to one embodiment of the invention;

FIG. 83 is a program flowchart of a door's power-driven window control task to be executed by CPU in the electric power supply system for automobile according to one embodiment of the invention;

FIG. 84 is a function block diagram indicating a control specification for a stop lamp diagnosis control in the electric power supply system for automobile according to one embodiment of the invention; and FIG. 85 is a program flowchart of a stop lamp diagnosis control task to be executed by CPU in the electric power supply system for automobile according to one embodiment of the invention.

BEST MODE FOR CARRYING OUT THE INVENTION

An electric power supply system for a vehicle according to one preferred embodiment of the invention will be described, in particular, by way of example as applied to an automobile, with reference to accompanying drawings of FIGS. 1–85 in the following.

To begin with, a total system configuration of an automobile which applies an electric power supply system for a vehicle according to one preferred embodiment of the invention will be described in reference to FIG. 1.

Figure 1:
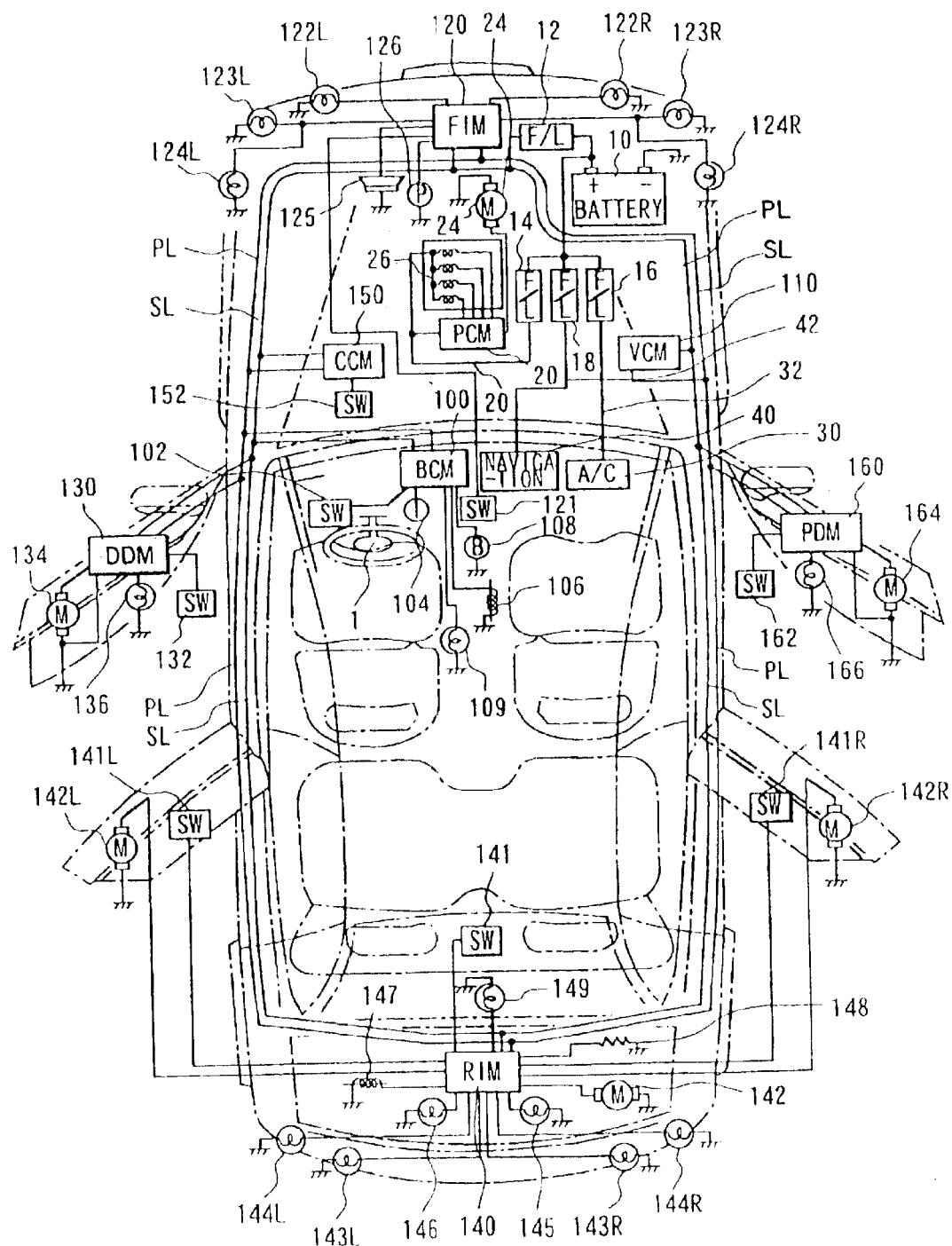
FIG. 1 is a schematic diagram indicating a system configuration of an automobile according to one embodiment of the invention.

FIG. 1 is a schematic diagram indicating a system configuration of an automobile according to one embodiment of the invention.

A battery 10 is connected to a power line PL via a fusible link 12. Power line PL, which is provided in a loop of one turn circuit in an automobile, extends from a front engine room of the automobile running through a left-hand side door section, a rear section of the car and a right-hand side door section, and returns to the front engine room. To power line PL are connected seven control modules for seven different accessory systems, which include a body control module (BCM) 100, a vehicle control module (VCM) 110, a front integrated module (FIM) 120, a driver door module (DDM) 130, a rear integrated module (RIM) 140, a cruise control module (CCM) 150, and a passenger door module (PDM) 160, which are supplied power from battery 10.

Body control module (BCM) 100 is disposed in the vicinity of a dashboard in the car. Switch 102 in the vicinity of a steering wheel and input means such as remote control receiver circuit and the like are connected to BCM100. Also, electrical loads such as indicator 104, solenoid 106, buzzer 108 and lamp 109 which is a room light are connected to BCM 100. This BCM 100 has a built-in central processing unit (CPU).

Vehicle control module (VCM) 110 is installed within the engine room, and to which input means such as a vehicle speed detector, engine revolution detector and the like are installed.

Front integrate module (FIM) 120 is positioned in the front side of the engine room. FIM 120 is connected with input means such as switch 121 and the like which are provided for an automatic transmission (A/T), and further with lamps and electrical loads such as left and right-hand headlamps 122R, 122L, vehicle's side lamps 123R, 123L, turn/stop lamps 124R, 124L and the like.

Driver door module (DDM) 130 is installed within a door beside the driver. DDM 130 is connected with input means such as switch 132 and the like including a power window-switch, mirror switch and the like, and further with electrical loads such as motor 134 including a power window motor, door lock motor and the like as well as lamps 136 such as door illumination lamps or the like.

Rear integrate module (RIM) 140 is installed on the backward side of a rear seat. RIM 140 is connected with input means such as switches 141 and the like including power window switches 141R, 141L provided at the left and right side doors of the rear seat, an end gate switch provided at an end gate, and further with other electric loads including motors 142, 142R, 142L such as power window motors, door lock motors, lamps such as left and right turn/stop lamps 143R, 143L, tail light 144R, 144L, a center stop lamp (high mount lamp) 145, backup lamp 146 for illuminating a reverse direction, as well as with solenoid 147 for end gate release, heater 148 for use as a rear defogger, rear dome lamp 149 mounted in the ceiling over the rear seat, and the like. This automobile according to the embodiment of the invention is provided, in addition to a driver's side door, a driver's opposite side door, left and right side doors at the rear seat, with an end gate at the rear side of the body which opens in a downward direction and a lift gate which is provided in the upper direction of the end gate and jumps upward. The same also uses a turn/stop lamp which serves as a turn signal lamp and a stop lamp in combination.

Cruise control module (CCM) 150 is installed within the engine room, and to which are connected input means such as a switch 152, a cruise controller and the like which are provided in the vicinity of a brake pedal.

Passenger door module (PDM) 160 is provided inside the door at the driver's side. PDM 160 is connected with input means such as switch 162 and the like including the power window switches, door mirror switches and the like, and with motor 164 such as the power window motors, door lock motors and the like, as well as with other electric loads such as lamp 166 including the door illumination lamps and the like.

BCM 100, VCM 110, FIM 120, DDM 130, RIM 140, CCM 150 and PDM 160 are mutually connected by a signal line SL that is laid out in a loop turn. VCM 110, FIM 120, DDM 130, RIM 140, CCM 150 and PDM 160 do not have their own CPU provided therein, however, instead thereof, they are provided with a built-in communication IC, respectively. Any signal input into control modules other than BCM 100 is controlled by its own communication IC to be transmitted through signal line SL to BCM 100 and to be entered into CPU within BCM 100. The CPU, after executing a necessary signal processing thereof, transmits the processed signal to each control module via signal line SL so as to control accordingly the electric load connected to each control module.

Further, according to this embodiment of the invention, battery 10 is connected to power train module (PCM) 20 provided within the engine room via fusible link 14 and power line 22 for supplying power from battery 10. It should be noted that power line 22 is a separate power line different from the power line PL in the loop. PCM 20 executes starting of the engine using starter motor 24, control of quantity of fuel injection into the engine by injector 26, ignition timing control, and automatic transmission (A/T) control. PCM 20 is connected with sensors such as air-flow meter, water temperature sensor and the like, and further with actuators such as for injector 26, cooling fan motor and the like.

PCM 20 is provided specifically for carrying out control of the engine itself. If a malfunction occurs in other control modules such as BCM 100, CCM 110 or the like, and if the engine control is affected, the ultimate object and function of the engine control basically required for the control of the automobile cannot be achieved. However, it is contemplated according to the invention that if BCM 100, CCM 110 or the like which are connected to the power line PL in the loop turn fails, it merely follows that the power window does not operate or that the lamps do not turn on, which are not immediately a serious trouble and can be tolerated for a while until the automobile is managed to get to a repair shop without using such troubled functions.

Therefore, according to this embodiment of the invention, a power supply to PCM 20 that executes the ultimate function of the engine control is ensured using the power line 22 independent from the power line PL in the loop. Therefore, even if other control modules such as BCM 100, CCM 110 or the like provided for accessory systems fail, and if PCM 20 for carrying out the engine control is ensured to operate normally, it becomes possible to manage to drive the automobile to a repair shop.

Further, sensors which are input means to PCM 20 and injectors which are actuators and the like are accommodated in a relatively compact space within the engine room, and also the battery is placed therein. Therefore, even if the power line PL in loop is not used in the instant case and a separate power line independent therefrom is used, there occurs no particular problem because it does not incur any substantial increases in the number of wiring and/or length thereof.

Still further, according to the embodiment of the invention, battery 10 is connected to air-conditioner (A/C) 30 which is provided within the passenger room via fusible link 16 and power line 32 for supplying power from the battery. Power line 32 is a separate power line different from the loop-turn power line PL. A/C 30 which is provided with a blower motor therein consumes a large electric current. Therefore, compared to other control modules such as BCM 100 or FIM 110 that consumes a relatively small current, A/C 30 is more likely to have a greater frequency of failures. Even if A/C 30 fails, it does not affect the normal drive operation of the automobile itself. On the other hand, priority level of control of BCM 100, FIM 110 or the like is higher than that of A/C 30. If, however, control modules of BCM 100 and FIM 120 fail due to the failure of A/C 30, there occurs such a problem that the stop lamp or head lamp will not illuminate. Therefore, according to the embodiment of the invention, power line 32 for supplying power to A/C 30 which consumes a large current is provided independently from the power line PL in the loop circuit.

Still further, according to the embodiment of the invention, battery 10 is connected to navigation system (Navi)40 via fusible link 18 and power line 42 for supplying power from the battery. Power line 42 is a separate power line independent from the loop-circuit power line PL. Navi 40 is an auxiliary information device which can assist the driver with guidance to a destination and the like. Therefore, even if Navi 40 fails, there will be no serious trouble such as to prevent the normal drive operation of the automobile. On the other hand, priority level of the control modules such as BCM 100 and FIM 120 is higher than that of Navi 40, and if the control modules of BCM 100 and FIM 120 go down due to a failure of Navi 40, there occurs such inconveniences that the stop lamp or head lamp will not turn on. Therefore, according to the embodiment of the invention, power line 32 for supply power to Navi 40 which is auxiliary information device is provided independently from the power line PL in loop circuitry. Other such information devices include, for example, a beacon and the like.

As described above, PCM 20 that carries out the fundamental engine control, A/C 30 that consumes a large current, and Navi 40 that is the auxiliary information device and the like are ensured to be supplied with power using their own power lines which are provided independently of the power line PL in loop turn that supplies power to BCM 100, FIM 120 and the like. Therefore, mutual adverse influences between respective control modules can be minimized according to the invention.

Further, because the control modules such as BCM 100, FIM 120 and the like are supplied power via power line PL in the loop turn, the length of the power line can be minimized.

Now, in reference to FIG. 2, a schematic block diagram indicating a plurality of control modules such as BCM and the like that are connected using the power line and a signal line both provided in a loop turn will be described in the following.

Figure 2:
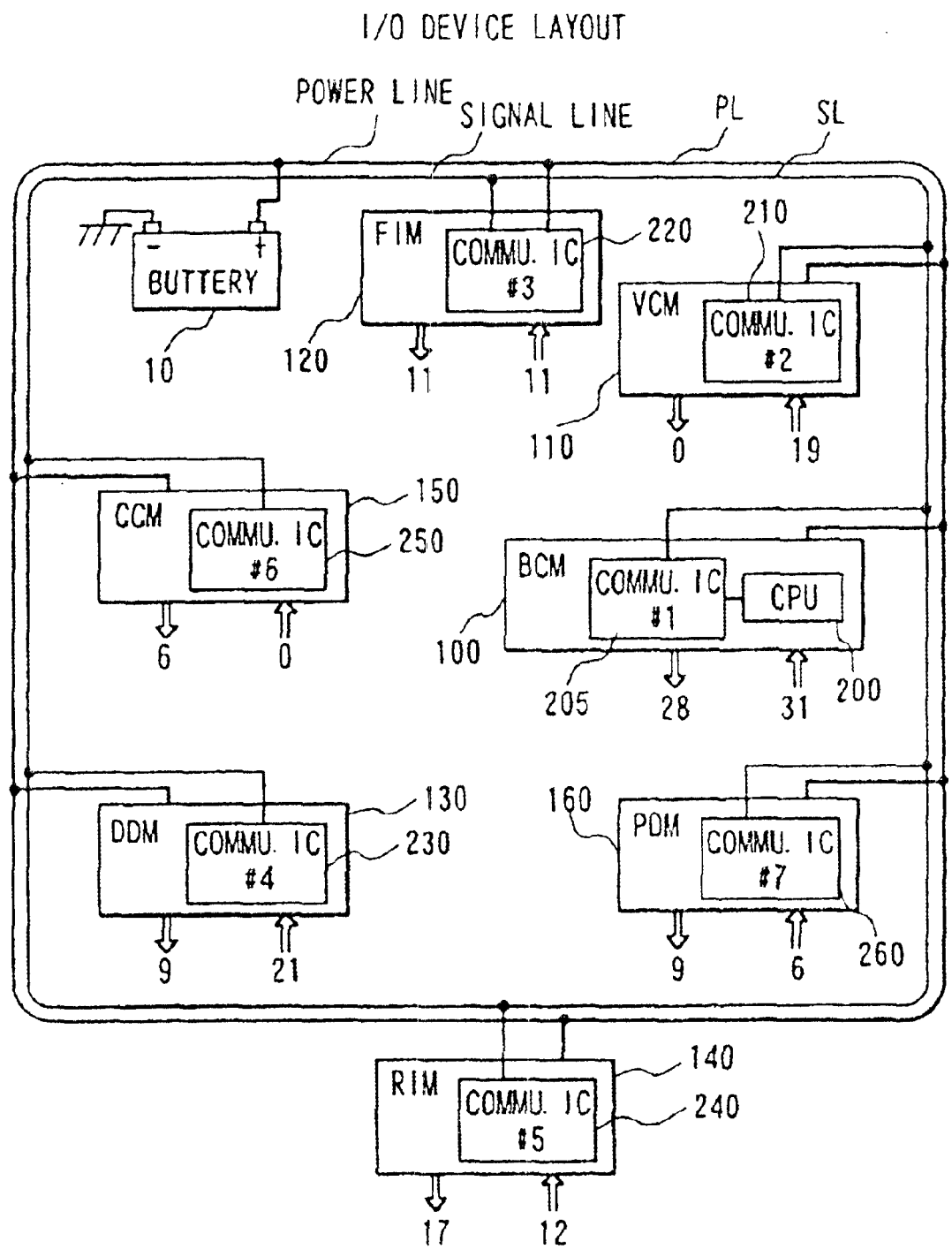
FIG. 2 is a schematic block diagram indicating a connection relation between control modules in an electric power supply system for a vehicle according to one embodiment of the invention.

FIG. 2 is a block diagram indicating a connection relationship between control modules in an electric power supply system for a vehicle according to one embodiment of the invention. It should be noted that FIG. 2 depicts only a part of the arrangement of FIG. 1, relating to control modules therein.

Seven units of control modules including BCM 100, VCM 110, FIM 120, DDM 130, RIM 140, CCM 150 and PDM 160 are connected to the power line PL in a loop turn for supplying power from the battery 10. Further, BCM 100, VCM 110, FIM 120, DDM 130, RIM 140, CCM 150 and PDM 160 are connected mutually via signal line SL that is provided also in a loop turn.

BCM 100 is provided with a central processing unit (CPU) for executing arithmetic operation for control processing, and a communication IC for controlling data transmission to and from other communication ICs. VCM 110, FIM 120, DDM 130, RIM 140, CCM 150 and PDM 160 excepting for BCM 100 are not provided with a CPU, but, instead thereof, are provided with built-in communication ICs 210, 220, 230, 240, 250 and 260, respectively.

A signal input into any control module other than BCM 100 is controlled by its own built-in communication IC to be transmitted serially via signal line SL to communication IC 205 within BCM 100 through which to be entered into its CPU 200. After executing a required signal processing, CPU 200 transmits its processed signal via communication IC 200 and signal line SL to respective communication ICs 210, 220, 230, 240, 250 and 260 in respective control modules, thereby providing a control signal to respective electrical loads connected to respective control modules so as to control the loads accordingly. Further, in case of any control logic wherein a relation between an input signal and an output signal corresponding thereto is simple, it may be arranged such that they are processed in its communication IC discretely.

Here, it should be noted that each control module is assigned with its unique nodule number. A module number of BCM 100 is assigned "#1", a module number of VCM 110 is assigned "#2", a module number of FIM 120 is assigned "#3", a module number of DDM 130 is assigned "#4", a module number of RIM 140 is assigned "#5", a module number of CCM 150 is assigned "#6", and a module number of PDM 160 is assigned "#7".

Respective communication ICs 210, 220, 230, 240, 250 and 260 are assigned with a unique module address. When transmitting communication data, a particular communication IC of a sender and a particular communication IC of a receiver are specified using this module address. A unique module address of built-in communication IC 205 of BCM 200 is assigned "#1". However, because of presence of too many numbers of input signals, a unique module number of "#0" is assigned internally. More specifically, built-in communication IC 210 inside VCM 110 is assigned a unique module address "#2", communication IC 220 inside FIM 120 is assigned a unique module address "#3", communication IC 230 inside DDM 130 is assigned a unique module address "#4", communication IC 240 inside RIM 140 is assigned a unique module address "#5", communication IC 250 inside CCM 150 is assigned a unique module address "#6", and communication IC 260 inside PDM 160 is assigned a unique module address "#7", respectively.

CPU 200 in BCM 100 has an input signal number of 31 bits and an output signal number of 28 bits. Communication IC 210 in VCM 110 has an input signal number of 19 bits and an output signal number of 0 bit. Communication IC 220 in FIM 120 has an input signal number of 11 bits and an output signal number of 11 bits. Communication IC in DDM 130 has an input signal number of 21 bits and an output signal number of 9 bits. Communication IC 240 in RIM 140 has an input signal number of 12 bits and an output signal number of 17 bits. Communication IC 250 in CCM 150 has an input signal number of 0 bit and an output signal number of 5 bits. Communication IC 260 in PDM 160 has an input signal number of 6 bits and an output signal number of 9 bits.

Now, with reference to FIGS. 3–6, an internal construction of BCM 100, input means and electric loads connected to the CPU in BCM 100 as well as input signals and output signals will be described in the following.

Figure 3:
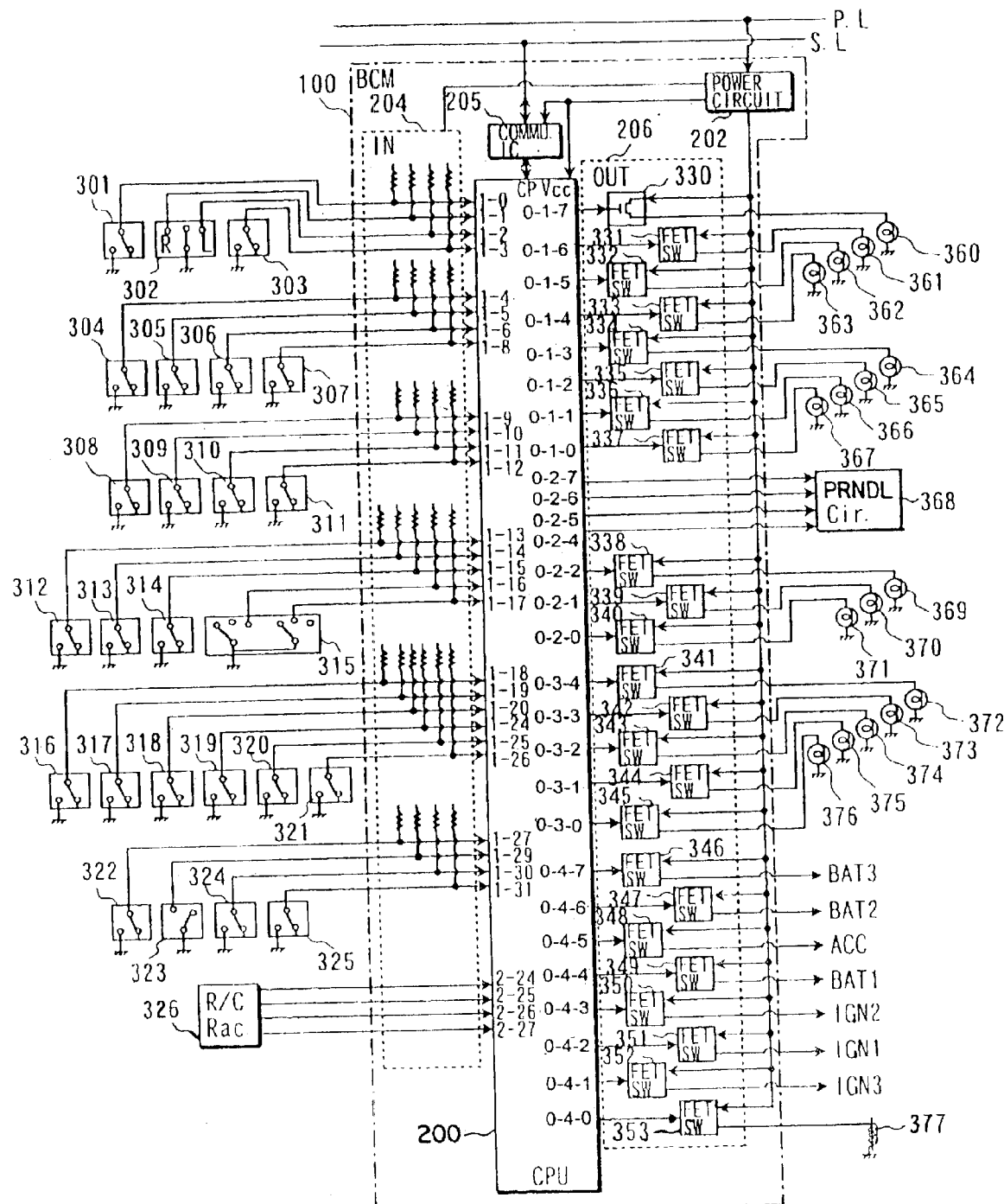
FIG. 3 is a schematic block diagram of a BCM in the electric power supply system for vehicle according to the one embodiment of the invention.

FIG. 3 is a schematic block diagram of BCM in the electric power supply system for automobiles according to one embodiment of the invention. FIG. 4 is an input bit map flowchart at module address "#0" of BCM according to the embodiment of the invention. FIG. 5 is an input bit map flowchart at module address "#1" of BCM according to the embodiment of the invention. FIG. 6 is an output bit map flowchart of BCM according to the embodiment of the invention.

With reference to FIG. 3, BCM 100 is comprised of CPU 200, communication IC 205, power line circuit 202, input circuit 204 and output circuit 206. Communication IC 205 is connected between signal line SL and CPU 200. Communication IC 205 fetches data transmitted via signal line SL into CPU 200, and transmits control data obtained by arithmetic operation in CPU 200 to other control modules via signal line SL.

Power source circuit 202 which is connected to power line PL converts a power supplied from the battery into a predetermined voltage suitable for operating CPU 200 and communication IC 205, for supplying a voltage to input circuit 204 for entry of input signals, and also for supplying a voltage for actuating electrical loads connected to output circuit 206.

Input circuit 204, which is an input interface for input means such as switches and the like, enters each status of each switch and the like into CPU 200 via each input terminal 1-n and 2-m. Further, output circuit 206, in response to an output signal which is output from output terminal o-I-1 of CPU 200, drives MOSFET which is a switching device provided with a protection function for supplying power from power source circuit 202 to each electric load.

Now, with reference to FIGS. 3–5, a relation between an input signal at an input terminal of CPU 200 and its input means will be described. As for a control method based on the signal input from the input means, it will be described later with reference to FIG. 21 and subsequent figures describing function block diagrams and programming flowcharts of respective control specifications.

As shown in FIG. 4, a first input terminal BCM1 specified by address "#0" of BCM is comprised of 32 bits, and wherein bits 21 to 23 and bit 28 are not used.

As shown in FIG. 3, a signal of hazard switch (Hazard sw) 301 for simultaneously flashing four turn signal lamps 124R, 124L, 143R and 143L which are indicated in FIG. 1 is input at bit 0 (1-0) of BCM1. When switch 301 is off-state, the input signal is set at "H" level by a voltage supplied from power source circuit 202 through a resistance in input circuit 204. When switch 301 is on-state, the input signal becomes "L" level. By the way, as will be described later, a variable name of the input signal on a control program is given by "iHazardSw".

At bit 1 (1-1) of BCM1, a signal of turn switch (Turn sw) 302 for simultaneously flashing two of right turn signal lamps 124R and 143R out of four turn signal lamps 124R, 124L, 143R and 143L is input. When switch 302 is off-state, its input signal is set at "H" level by a voltage supplied from power source circuit 202 via a resistance in input circuit 204. When switch 302 is switched to R side, its input signal becomes "L" level. By the way, as will be described later, a variable name of its input signal is given by "iTrnSwRH" in a control program.

At bit 2 (1-2) of BCM1, a signal of turn switch (Turn sw) 302 for simultaneously flashing two of left side turn signal lamps 124L and 143L out of four turn signal lamps 124R, 124L, 143R and 143L is input. When switch 302 is off-state, its input signal is set at "H" level. When switch 302 is switched to L side, its input signal becomes "L" level. By the way, as will be described later, a variable name of its input signal on its control program is given by "iTrnSwLH".

At bit 3 (1-3) of BCM1, a signal of park lamp switch (Park lamp sw) 303 for simultaneously turning on four of the side width indicator lamps 123R, 123L and tail light lamp 144R and 144L which are depicted in FIG. 1 is input. When switch 303 is off-state, its input signal is set at "H" level by a voltage supplied via a resistance in input circuit 204 from power source circuit 202. When switch 303 becomes on-state, its input signal become "L" level. By the way, as will be described later, a variable name of its input signal is given by "iPosOn" on its control program.

At bit 4 (1-4) of BCM1, a signal of accessory switch (Key sw Acc sw) 304 in a key switch, which is operated when an engine key in switch 102 depicted in FIG. 1 is turned to a position of accessory (Acc), is input. When switch 304 is off-state, its input signal is set at "H" level by a voltage supplied from power source circuit 202 via a resistance in input circuit 204. When switch 304 becomes on-state, its input signal becomes "L" level. By the way, as will be described later, a variable name of its input signal on its control program is given by "iLGswAcc".

At bit 5 (1-5) of BCM1, a signal of ignition "1" switch (Key sw IGN (RUN)1 sw) 305 in the key switch, which is operated when the engine key in switch 102 depicted in FIG. 1 is turned to a position of ignition "1" (IGN1), is input. When switch 305 is off-state, its input signal is set at "H" level by a voltage supplied from power source circuit 202 via a resistance in input circuit 204. When switch 305 is on-state, its input signal becomes "L" level. By the way, as will be described later, a variable name of its input signal on its control program is given by "iIGswOn_1".

At bit 6 (1-6) of BCM1, a signal of ignition "2" switch (Key sw IGN (RUN)2 sw) 306 in the key switch, which is operated when the engine key in switch 102 depicted in FIG. 1 is turned to a position of ignition "2" (IGN2), is input. When switch 306 is off-state, its input signal is set at "H" level by a voltage which is supplied from power source circuit 202 via a resistance in input circuit 204. When switch 306 becomes on-state, its input signal becomes "L" level. By the way, as will be described later, a variable name of its input signal on its control program is given by "iIGswOn_2".

At bit 8 (1-8) of BCM1, a signal of parking brake warning switch (Park brake warning sw (side brake)) 307, which operates when a parking brake in switch 102 shown in FIG. 1 is operated, is input. When switch 307 is off-state, its input signal is set at "H" level by a voltage supplied from power source circuit 302 through a resistance in input circuit 204. When switch 307 becomes on-state, its input signal becomes "L" level. By the way, as will be described later, a variable name of its input signal is given by "iPkBrkWarn" on its control program.

At bit 9 (1-9) of BCM1, a signal of head lamp switch (Head lamp on sw) 308, which operates when the head lamp in switch 102 shown in FIG. 1 is to be switched on, is input. When switch 308 is off-state, its input signal is set at "H" level by a voltage which is supplied from power source circuit 202 through a resistance in input circuit 204. When switch 308 becomes on-state, its input signal becomes "L" level. By the way, as will be described later, a variable name of its input signal is given by "iLiteOn" on its control program.

At bit 10 (1-10) of BCM1, a signal of cruise release switch (TTC/Cruise release sw) 309, which operates when releasing a cruise controller in switch 102 as shown in FIG. 1, is input. When switch 309 is off-state, its input signal is set at "H" level by a voltage supplied from power source circuit 202 via a resistance in input circuit 204. When switch 309 becomes on-state, its input signal becomes "L" level. By the way, as will be described later, a variable name of input signal is given by "iCrsRisSw" on its control program.

At bit 11 (1-11) of BCM1, a signal of cruise release switch (Brake lamp/Cruise release sw) 310, which operates when releasing the cruise controller by pressing the brake pedal in switch 102 as shown in FIG. 1, is input. When switch 310 is off-state, its input signal is set at "H" level by a voltage supplied from power source circuit 202 through a resistance in input circuit 204. When switch 310 becomes on-state, its input signal becomes "L" level. By the way, as will be described later, a variable name of input signal is given by "iBrkSw" on its control program.

At bit 12 (1-12) of BCM1, a signal of stop lamp switch (TTC/Stop lamp sw) 311 is input, which is produced to turn on turn/stop lamps 143R and 143L by-pressing the brake pedal in switch 102 shown in FIG. 1. When switch 311 is off-state, its input signal is set at "H" level by a voltage supplied from power source circuit 202 through a resistance in input circuit 204. When switch 311 becomes on-state, its input signal becomes "L" level. By the way, as will be described later, a variable name of input signal is given by "iStopSw" on its control program.

At bit 13 (1-13) of BCM1, a left door switch (LH door jamb sw) 312 which is attached to a center pillar (jamb) beside the left door is input, which actuates when the left door in switch 102 shown in FIG. 1 is opened. When switch 312 is off, its input signal becomes "H" level by a voltage supplied from power supply circuit 202 via a resistance in input circuit 204. When switch 312 is on, its input signal becomes "L" level. By the way, a variable name of its input signal on the control program which will be described later is given by "iDorJamLH".

At bit 14 (1-14) of BCM1, a signal of a right door switch (RH door jamb sw) 313 is input, which switch is attached to a center pillar beside the right-side door, and operates when a right-side door in switch 102 shown in FIG. 1 is opened. When switch 313 is off, its input signal becomes "H" level by a voltage supplied from the power supply circuit 202 via a resistance in input circuit 204. When switch becomes on-state, its input signal becomes "L" level. By the way, a variable name of the input signal in the control program which will be described later is given by "iDorJamRH".

At bit 15 (1-15) of BCM1, a signal of a seat belt switch (Safety belt on sw) in switch 102 shown in FIG. 102 is input, which operates when a driver's seat belt is set. When switch 314 is off, its input signal becomes "H" level by a voltage supplied from power supply circuit 202 via a resistance in input circuit 204. When switch 314 is on, its input signal becomes "H" level. By the way, a variable name of the input signal on its control program is given by "iSftyBelt" as will be described later.

At bit 16 (1-16) of BCM1, a signal of a rear wiper washer switch (Rear Wiper Wash sw) 315 is input, which enables a rear wiper washer in switch 102 shown in FIG. 1 to operate to eject. When switch 315 is off, its input signal becomes "H" level by a voltage supplied from power supply circuit 202 via a resistance in input circuit 204. Switch 315 is capable of switching in two modes of position. When switch 315 is turned on in the second mode, its input signal becomes "L" level. The first mode of position is used for operating the rear wiper. By the way, a variable name of the input signal thereof on its control program is given by "iRrWipWash" as will be described later.

At bit 17 (1-17) of BCM1, a signal of rear wiper switch (Rear Wiper sw) 315 is input for operating the rear wiper in switch 102 shown in FIG. 1. When switch 315 is off, its input signal is set at "H" level by a voltage supplied from power supply circuit 202 via a resistance in input circuit 204. When switch 315 is turned on in the first stage of position, its input signal becomes "L" level. By the way, a variable name of the input signal thereof on its control program is given by "iRrWip" as will be described later.

At bit 18 (1-18) of BCM1, a signal of rear window defogger switch (Rear window Defogger sw) 316 is input, which enables operation of a rear window defogger switch in switch 102 shown in FIG. 1 when the same is desired to be used. When switch 316 is off, its input signal is set at "H" level by a voltage supplied from power supply circuit 202 via a resistance in input circuit 204. When switch 316 is on, its input signal becomes "L" level. By the way, a variable name of the input signal thereof on its control program is given by "iDefog" as will be described later.

At bit 19 (1-19) of BCM1, a signal of lift gate open switch (Lift gate open sw) 317 is input, which enables to open the lift gate at the rear end of the body, and is provided in switch 102 shown in FIG. 1. When switch 317 is off, its input signal is set at "H" level by a voltage supplied from power supply circuit 202 via a resistance in input circuit 204. When switch 317 is on, its input signal becomes "L" level. By the way, a variable name of the input signal thereof on its control program is given by "iLftOpn" as will be described later.

At bit 20 (1-20) of BCM1, a signal of panel dimmer switch (Panel Dimmer on sw) 318 in switch 102 shown in FIG. 1 is input, which operates when turning on an instrument panel illumination. When switch 318 is off, its input signal is set at "H" level by a voltage supplied from power supply circuit 202 via a resistance in input circuit 204. When switch 318 becomes on-state, its input signal becomes "L" level. By the way a variable name of the input signal on its control program is given by "iPDimOn" as will be described later.

At bit 24 (1-24) of BCM1, a signal of cruise release switch (Cuise Resume/accel sw) 319 in switch 102 shown in FIG. 1 is input, which operates for releasing its control while the vehicle is running at a constant speed under a cruise control by the cruise controller. When switch 319 is off, its input signal is set at "H" level by a voltage supplied from power supply circuit 202 through a resistance in input circuit 204. When switch 319 becomes on-state, its input signal becomes "L" level. By the way, a variable name of the input signal on its control program is given by "iCcmR_A" as will be described later.

At bit 25 (1-25) of BCM1, a signal of cruise set switch (Cruise set/coast sw) 320 in switch 102 shown in FIG. 1 is input, for causing the cruise controller to executes its constant speed cruise control. When switch 320 is off, its input signal becomes "H" level by a voltage supplied from power supply circuit 202 through a resistance in input circuit 204. When switch 320 becomes on-state, its input signal becomes "L" level. By the way, a variable name of the input signal on its control program is given by "iCcmS_C" as will be described later.

At bit 26 (1-26) of BCM1, a signal of cruise on/off switch (Cruise on/off sw) 321 in switch 102 shown in FIG. 1 is input, for turning on and off of the cruise controller itself. When switch 321 is off, its input signal is set at "H" level by a voltage supplied from power supply circuit 202 through a resistance in input circuit 204. When switch 321 becomes on-state, its input signal becomes "L" level. By the way a variable name of the input signal on its control program which will be described later is given by "iCcmOnOff".

At bit 27 (1-27) of BCM1, a signal of horn switch (Horn sw) 322 in switch 102 shown in FIG. 1 is input, which operates by pressing a horn button provided in the steering wheel. When switch 322 is off, its input signal is at "H" level by a voltage supplied from power supply circuit 202 through a resistance in input circuit 204. When switch 322 becomes on-state, its input signal becomes "L" level. By the way, a variable name of the input signal on its control program which will be described later is given by "iHornSw".

At bit 29 (1-29) of BCM1, a signal of high beam switch (Hi-beam sw) 323 in switch 102 shown in FIG. 1 is input, which operates for switching the head lamp to its high beam. When switch 323 is off, its input signal is set at "H" level by a voltage supplied from power supply circuit 202 through a resistance in input circuit 204. When switch 323 becomes on-state, its input signal becomes "L" level. By the way, a variable name of the input signal on its control program which will be described later is given by "iHornSw".

At bit 30 (1-30) of BCM1, a signal to starter switch (Starter sw) 324 in switch 102 shown in FIG. 1 is input, which operates when actuating the starter by turning the ignition key to a position of starter. When switch 324 is off, its input signal is at "H" level by a voltage supplied from power supply circuit 202 through a resistance in input circuit 204. When switch 24 is on, its input signal becomes "L" level. By the way, a variable name of the input signal on its control program which will be described later is given by "iIGNswST".

At bit 31 (1-31) of BCM1, a signal to key insertion switch (Key insert sw) 325 in switch 102 shown in FIG. 1 is input, which operates when the ignition key is inserted in the key hole. When switch 325 is off, its input signal is at "H" level by a voltage supplied from power supply circuit 202 through a resistance in input circuit 204. When switch 325 becomes on, its input signal becomes "L" level. By the way, a variable name of the input signal on its control program which will be described later is given by "iIGNswKey".

Now, with reference to FIG. 5, a second input terminal BCM2 specified at address "#1" of BCM is comprised of 32 bits, of which only bits 24–27 are used.

As shown in FIG. 3, at bit 24 (2-24) of BCM2, a signal from a remote controller receiver circuit (R/C Rec) 326 is input, the receiver circuit is for receiving a signal sent from a remote controller of a so-called keyless entry system carried by the driver and when it is operated. When a lift gate open switch (R/C Lift-gate open sw) of the remote controller which operates when opening the lift gate at the end of the car body is off, a signal of "L" level is input. When the lift gate open switch becomes on, a signal of "H" level is input. By the way, a variable name of the input signal on its control program which will be described later is given by "iRcLftOpn".

At bit 25 (2-25) of BCM2, a signal from the remote controller receiver circuit (R/C Rec) 326 is input. When a door unlock switch of the remote controller (R/C Door unlock sw), which operates when releasing all the door locks, is off, a signal of "L" level is input. When the door unlock switch is on, a signal of "H" level is input. By the way, a variable name of the input signal on its control program which will be described later is given by "iRcUnlock".

At bit 26 (2-26) of BCM2, a signal from the remote controller receiver circuit (R/C Rec) 326 is input. When the remote controller's door lock switch (R/C Door lock sw), which operates when all the doors are to be locked, is off, a signal of "L" level is input. When the door lock switch is on, a signal of "H" level is input. By the way, a variable name of the input signal on its control program which will be described later is given by "iRcLock".

At bit 27 (2-27) of BCM2, a signal from the remote controller receiver circuit (R/C Rec) 326 is input. When a driver door unlock switch of the remote controller (R/C DR Door unlock sw) which operates when unlocking the door beside the driver is off, a signal of "L" level is input. When the door lock switch is on, a signal of "H" level is input. By the way, a variable name of the input signal on its control program which will be described later is given by "iRcDrUnlk".

Now, with reference to FIGS. 3 and 6, each output signal to be output from each output terminal of CPU 200 and each electrical load to be controlled in response to this output signal from CPU will be described in the following.

As shown in FIG. 6, output terminal BCMOUT is comprised of four sets of 8 bit structure, namely, a total of 32 bit structure, wherein bit (2-3), and bits (3-7) to (3-5) are not used.

As shown in FIG. 3, bit 1-7 (o-1-7) of BCMOUT in CPU 200 is connected to a gate terminal of FET switch circuit (FET SW) 330 comprising a MOSFET with a protection function provided in output circuit 206. A source terminal of FET switch circuit 330 is applied with a predetermined voltage from power supply circuit 202. Further, a drain terminal of FET switch circuit 330 is connected to a defogger indicator (Defogger Indicator) 360 in indicator 104 shown in FIG. 1 for indicating that a rear defogger is operating. Therefore, when an output signal of "H" level is output from bit 1-7 (o-1-7) of BCMOUT, FET switch circuit 330 becomes conductive thereby applying the voltage from power supply circuit 202 to defogger indicator 360 to turn on the same. By the way, a variable name of the input signal thereof on its control program which will be described later is given by "oDefogInd".

Here, a MOSFET with protection function is used as a switching device which constitutes output circuit 206. As the MOSFET with protection function, an over-current detection type MOSFET or an overheat detection type MOSFET is used. The over-current detection type MOSFET has a function to interrupt its switching device when a large current in excess of a predetermined current flows. Further, the overheat detection type MOSFET has a function to interrupt its switching device when its temperature increases higher than a predetermined temperature due to heating by the flow of an over-current. These MOSFETs with protection function are used in place of conventional fusible link that is used between the battery and respective electrical loads. MOSFETs with protection function can self-reset when the over-current or over-heat conditions are removed. Therefore, without necessities of a specified maintenance work and of locating a plurality of these in one concentrated area as required for the conventional fusible links, they can be disposed appropriately at any position between power supply circuit 202 and respective electrical loads indicated in FIG. 3. In practice, because CPU 200 and power supply circuit 202 are mounted on the same substrate of BCM 100, its MOSFET with protection function can be mounted on the same substrate. Therefore, there will arise no such problem associated with the prior art that the total distance of extension of power lines increases substantially due to additional laying-out of power lines required for disposing fusible links in one concentrated area for ease of maintenance and inspection work. Further, it should be noted that FET switch circuit in the following description is comprised of MOSFET with protection function described above. Still further, the FET switch circuit of the invention can be comprised by combining a conventional MOSFET and a self-healing type interruption device instead of the MOSFET with protection function within the scope of the invention.

Bit 1-6 (o-1-6) of BCMOUT of CPU 200 is connected to a gate terminal of FET switch circuit (FET SW) 331 in output circuit 206. FET switch circuit 331 is connected to power supply circuit 202 and to an electric load of right turn signal indicator (RH turn Indicator) 361 in indicator 104 shown in FIG. 1, which indicates that the right direction turn signal is in operation. Therefore, when an output signal at "H" level is output from bit 1-6 of BCMOUT (o-1-6), FET switch circuit 331 becomes conductive thereby applying a voltage from power supply circuit 202 to right turn signal indicator 361 so as to light up. By the way, a variable name of its output signal on its control program which will be described later is given by "oTrnRHInd".

Bit 1-5 (o-1-5) of BCMOUT in CPU 200 is connected to a gate terminal of FET switch circuit (FET SW) 332 in output circuit 206. FET switch circuit 332 is connected to power supply circuit 202 and to an electric load of left turn signal indicator (LH turn Indicator) 362 in indicator 104 shown in FIG. 1, which indicates that the left turn signal is in operation. Therefore, when an output signal of "H" level is output from bit 1-5 (o-1-5) of BCMOUT, FET switch circuit 332 becomes conductive thereby applying a voltage from power supply circuit 202 to left turn signal indicator 362 so as to light up. By the way, a variable name of its output signal on its control program which will be described later is given by "oTrnLHInd".

Bit 1-4 of BCMOUT (o-1-4) in CPU 200 is connected to a gate terminal of FET switch circuit (FET SW) 333 of output circuit 206. FET switch circuit 333 is connected to power supply circuit 202 and to an electric load of high beam indicator (Hi-Beam Indicator) 363 in indicator 104 shown in FIG. 1, which indicates that high beam of the head lamp is turned on. Therefore, when an output of "H" level is output from bit 1-4 of BCMOUT (o-1-4), FET switch circuit 333 becomes conductive, thereby applying a voltage from power supply circuit 202 to high beam indicator 363 so as to illuminate the same. By the way, a variable name of the output signal on its control program which will be described later is given by "oHiBmInd".

Bit 1-3 of BCMOUT (o-1-3) in CPU 200 is connected to a gate terminal of FET switch circuit (FET SW) 334 in output circuit 206. FET switch circuit 334 is connected to power supply circuit 202 and to an electric load of seat belt warning lamp (Safety belt warning) 364 in indicator 104 shown in FIG. 1, which indicates that a safety seat belt is not fastened. Therefore, when an output signal of "H" level is output from bit 1-3 of BCMOUT (o-1-3), FET switch circuit 334 becomes conductive thereby applying a voltage from power supply circuit 202 to seat belt warning lamp 364 so as to illuminate the same. By the way, a variable name of the output signal on its control program which will be described later is given by "oSftyBltWan".

Bit 1-2 of BCMOUT (o-1-2) in CPU 200 is connected to a gate terminal of FET switch circuit (FET SW) 335 in output circuit 206. FET switch circuit 335 is connected to power supply circuit 202 and to an electric load of FIM short-circuit detection sensor/short-circuit detection indicator (FIM short-sensor Fail detect Indicator) 365 in indicator 104 shown in FIG. 1, which indicates that the short-circuit detection sensor of FIM 120 has detected a short-circuit event. Therefore, when an output signal of "H" level is output from bit 1-2 of BCMOUT (o-1-2), FET switch circuit 335 becomes conductive thereby applying a voltage from power supply circuit 202 to FIM short-circuit detection indicator 365 so as to illuminate the same. By the way, a variable name of the output signal on its control program which will be described later is given by "oFIMssInd".

Bit 1-1 of BCMOUT (o-1-1) in CPU 200 is connected to a gate terminal of FET switch circuit (FET SW) 336 in output circuit 206. FET switch circuit 336 is connected to power supply circuit 202 and to an electric load of DDM short-circuit detection sensor/short-circuit detection indicator (DDM short-sensor Fail detect Indicator) 366 in indicator 104 shown in FIG. 1, which indicates that the short-circuit sensor of DDM 130 has detected a short-circuit condition. Therefore, when an output signal of "H" level is output from bit 1-1 of BCMOUT (o-1-1), FET switch circuit 336 becomes conductive thereby applying a voltage from power supply circuit 202 to DDM short-circuit detection indicator 366 so as to illuminate the same. By the way, a variable name of the output signal on its control program which will be described later is given by "oDDMssInd".

Bit 1-0 of BCMOUT (o-1-0) in CPU 200 is connected to a gate terminal of FET switch circuit (FET SW) 337 in output circuit 206. FET switch circuit 337 is connected to power supply circuit 202 and to an electric load of PDM short-circuit detection sensor/short-circuit detection indicator (PDM short-sensor Fail detect Indicator) 367 in indicator 104 shown in FIG. 1, which indicates that the short-circuit detection sensor of PDM 160 has detected a short-circuit condition. Therefore, when an output signal of "H" level is output from bit 1-0 of BCMOUT (o-1-0), FET switch circuit 337 becomes conductive thereby causing to apply a voltage from power supply circuit 202 to PDM short-circuit detection indicator 367 so as to illuminate the same. By the way, a variable name of the output signal on its control program which will be described later is given by "oPDMssInd".

Bit 2-7(o-2-7), bit 2-6 (o-2-6), bit 2-5 (o-2-5) and bit 2-4 (o-2-4) of BCMOUT in CPU 200 are connected respectively to PRNDL display circuit (PRNDL Cir.) 368, which indicates a shift position of the automatic transmission gears. As will be described later in detail, using 4 bit data input, PRNDL display circuit 368 displays each shift position of P (parking), R (reverse), N (neutral), D (drive) and L (low) on PRNDL indicator in indicator 104 shown in FIG. 1. By the way, a variable name of the output signal on its control program which will be described later is given by "oPRNDL1", "oPRNDL2", "oPRNDL3" and "oPRNDL4", respectively.

Bit 2-2 of BCMOUT (o-2-2) in CPU 200 is connected to a gate terminal of FET switch circuit (FET SW) 338 in output circuit 206. FET switch circuit 338 is connected to power supply circuit 202 and to an electric load of room lamp (Courthesy lamp) 369 which is shown as lamp 109 in FIG. 1. Therefore, when an output signal of "H" level is output from bit 2-2 of BCMOUT (o-2-2), FET switch circuit 338 becomes conductive thereby causing a voltage from power supply circuit 202 to be applied to room lamp 369 so as to illuminate the same. By the way, a variable name of the output signal on its control program which will be described later is given by "oCortsy".

Bit 2-1 of BCMOUT (o-2-1) in CPU 200 is connected to a gate terminal of FET switch circuit (FET SW) 339 in output circuit 206. FET switch circuit 339 is connected to power supply circuit 202 and to an electric load of RIM short-circuit detection sensor/short-circuit detection indicator (RIM short-sensor Fail detect Indicator) 370 in indicator 104 shown in FIG. 1, which indicates that the short-circuit detection sensor of RIM 140 has detected a short-circuit condition. Therefore, when an output signal of "H" level is output from bit 2-1 of BCMOUT (o-2-1), FET switch circuit 339 becomes conductive thereby causing a voltage from power supply circuit 202 to be applied to RIM short-circuit detection indicator 370 so as to illuminate the same. By the way, a variable name of the output signal on its control program which will be described later is given by "oRIMss-Ind".

Bit 2-0 of BCMOUT (o-2-0) in CPU 200 is connected to a gate terminal of FET switch circuit (FET SW) 340 in output circuit 206. FET switch circuit 340 is connected to power supply circuit 202 and to an electric load of stop lamp load open detection indicator (Stop lamp load open detect Indicator) 371 in indicator 104 shown in FIG. 1, which indicates a failure of turn/stop lamps 143R, 143L. Therefore, when an output signal of "H" level is output from bit 2-0 of BCMOUT (o-2-0), FET switch circuit 340 becomes conductive thereby causing a voltage from power supply circuit 202 to be applied to stop lamp load open detection indicator 371 so as to illuminate the same. By the way, a variable name of the output signal on its control program which will be described later is given by "oStopOpen".

Bit 3-4 of BCMOUT (o-3-4) in CPU 200 is connected to a gate terminal of FET switch circuit (FET SW) 341 in output circuit 206. FET switch circuit 341 is connected to power supply circuit 202 and to an electric load of malfunction indicator (Malfunction Indicator) 372 in indicator 104 shown in FIG. 1, which indicates that FIM short-circuit detection sensor, DDM short-circuit detection sensor, PDM short-circuit detection sensor or RIM short-circuit detection sensor has detected a short-circuited condition. Therefore, when an output signal of "H" level is output from bit 3-4 of BCMOUT (o-3-4), FET switch circuit 341 becomes conductive thereby causing a voltage from power supply circuit 202 to be applied to malfunction indicator 372 so as to illuminate the same. By the way, a variable name of the output signal on its control program which will be described later is given by "oMalFunInd".

Bit 3-3 of BCMOUT (o-3-3) in CPU 200 is connected to a gate terminal of FET switch circuit (FET SW) 342 in output circuit 206. FET switch circuit 342 is connected to power supply circuit 202 and to an electric load of day-time light indicator (DRL Indicator) 373 in indicator 104 shown in FIG. 1, which indicates a status of the head lamp that it is on during the day-time. Therefore, when an output signal of "H" level is output from bit 3-3 of BCMOUT (o-3-3), FET switch circuit 342 becomes conductive thereby causing a voltage from power supply circuit 202 to be applied to day-time light indicator 373 so as to illuminate the same. Further, a variable name of the output signal on its control program which will be described later is given by "oDRLInd".

Bit 3-2 of BCMOUT (o-3-2) in CPU 200 is connected to a gate terminal of FET switch circuit (FET SW) 343 in output circuit 206. FET switch circuit 343 is connected to power supply circuit 202 and to an electric load of ABS indicator (ABS Indicator) 374 in indicator 104 shown in FIG. 1, which indicates that anti-brake lock system (ABS) is in operation. Therefore, when an output signal of "H" level is output from bit 3-2 of BCMOUT (o-3-2), FET switch circuit 343 becomes conductive thereby causing a voltage from power supply circuit 202 to be applied to ABS indicator 374 so as to illuminate the same. Further, a variable name of the output signal on its control program which will be described later is given by "oABSInd".

Bit 3-1 of BCMOUT (o-3-1) in CPU 200 is connected to a gate terminal of FET switch circuit (FET SW) 344 in output circuit 206. FET switch circuit 344 is connected to power supply circuit 202 and to an electric load of brake warning indicator (Brake warning Indicator) 375 in indicator 104 shown in FIG. 1, which indicates that a parking brake is in operation. Therefore, when an output signal of "H" level is output from bit 3-1 of BCMOUT (o-3-1), FET switch circuit 344 becomes conductive thereby causing a voltage from power supply circuit 202 to be applied to brake warning indicator 375 so as to illuminate the same. In addition, a variable name of the output signal on its control program which will be described later is given by "oBrkWarn".

Bit 0-3 of BCMOUT (o-3-0) in CPU 200 is connected to a gate terminal of FET switch circuit (FET SW) in output circuit 206. FET switch circuit 345 is connected to power supply circuit 202 and to an electrical load of charge indicator (Charge Indicator) 376 in indicator 104 shown in FIG. 1, which indicates that there is no charging by electric power generation from the generator. Therefore, when an output signal of "H" level is output from bit 3-0 of BCMOUT (o-3-0), FET switch circuit 345 becomes conductive thereby causing a voltage from power supply circuit 202 to be applied to charge indicator 376 so as to illuminate the same. In addition, a variable name of the output signal on its control program which will be described later is given by "oCHGInd".

Bit 4-7 (o-4-7), bit 4-6 (o-4-6) and bit 4-4 (o-4-4) of BCMOUT in CPU 200 are connected respectively to a gate terminal of FET switch circuits (FET SW) 346, 347 and 349. FET switch circuits 346, 347 and 349 are connected respectively between power supply circuit 202 and BAT3, BAT2 or BAT1, which are electrical loads other than accessories. Therefore, when an output signal of "H" level is output from bit 4-7 (o-4-7), bit 4-6 (o-4-6) and bit 4-4 (o-4-4) of BCMOUT, respectively, FET switch circuits 346, 347 and 349 become conductive, thereby causing a voltage from power supply circuit 202 to be applied to electrical loads BAT3, BAT2 and BAT1, respectively. In addition, variable names of the output signals on their control programs which will be described later are given by "oVbBAT3", "oVbBAT2" and "oVbBAT1", respectively.

Bit 4-5 of BCMOUT (o-4-5) in CPU 200 is connected to a gate terminal of FET switch circuit (FET SW) 348 in output circuit 206. FET switch circuit 348 is connected between power supply circuit 202 and an electrical load of accessory ACC such as a radio or the like. Therefore, when an output signal of "H" level is output from bit 4-5 of BCMOUT (o-4-5), FET switch circuit 348 becomes conductive thereby causing a voltage from power supply circuit 202 to be applied to electrical load of ACC. Further, a variable name of the output signal on its control program which will be described later is given by "oVbACC".

Bit 4-3 (o-4-3), bit 4-2 (o-4-2) and bit 4-1 (o-4-1) of BCMOUT in CPU 200 are connected respectively to gate terminals of FET switch circuits (FET SW) 350, 351 and 352 in output circuit 206. FET switch circuits 350, 351 and 352 are connected between power supply circuit 202 and an electrical load of ignition coils IGN1, IGN2 or IGN3, respectively. Therefore, when output signals of "H" level are output respectively from bit 4-3 (o-4-3), bit 4-2 (o-4-2) and bit 4-1 (o-4-1) of BCMOUT, FET switch circuits 350, 351 and 352 become conductive thereby causing a voltage from power supply circuit 202 to be applied to electrical loads of IGG2, IGN1 and IGN3. Further, variable names of the output signals on their control programs which will be described later are given by "oVbIGN2", "oVbIGN1" and "oVbIGN3", respectively.

Bit 4-0 of BCMOUT (o-4-0) in CPU 200 is connected to a gate terminal of FET switch circuit (FET SW) 353 in output circuit 206. FET switch circuit 353 is connected to power supply circuit 202 and to an electrical load of shift interlock solenoid (Shift inter-lock solenoid) 377 in solenoid 106 shown in FIG. 1, which releases shift-lever lock of the automatic transmission. Therefore, when an output signal of "H" level is output from bit 3-0 of BCMOUT (o-3-0), FET switch circuit 353 becomes conductive thereby causing a voltage from power supply circuit 202 to be applied to shift interlock solenoid 377 so as to release the lock thereof. Further, a variable name of the output signal on its control program which will be described later is given by "oSftIt1ok".

By way of example, the voltage to be supplied from power supply circuit 202 to respective source terminals of FET switch circuits 330-353 is not necessarily limited to be the same voltage, but can be varied in accordance with respective requirements of respective electrical loads to be connected thereto. In order to meet with such requirements, electric power supply circuit 202 converts the voltage supplied from the battery via power line PL into a plurality of voltages as required.

Now, with reference to FIGS. 7 and 8, an internal configuration of VCM 110, and input means to be connected to a communication IC in VCM 110 as well as its input signals will be described in the following.

Figure 7:
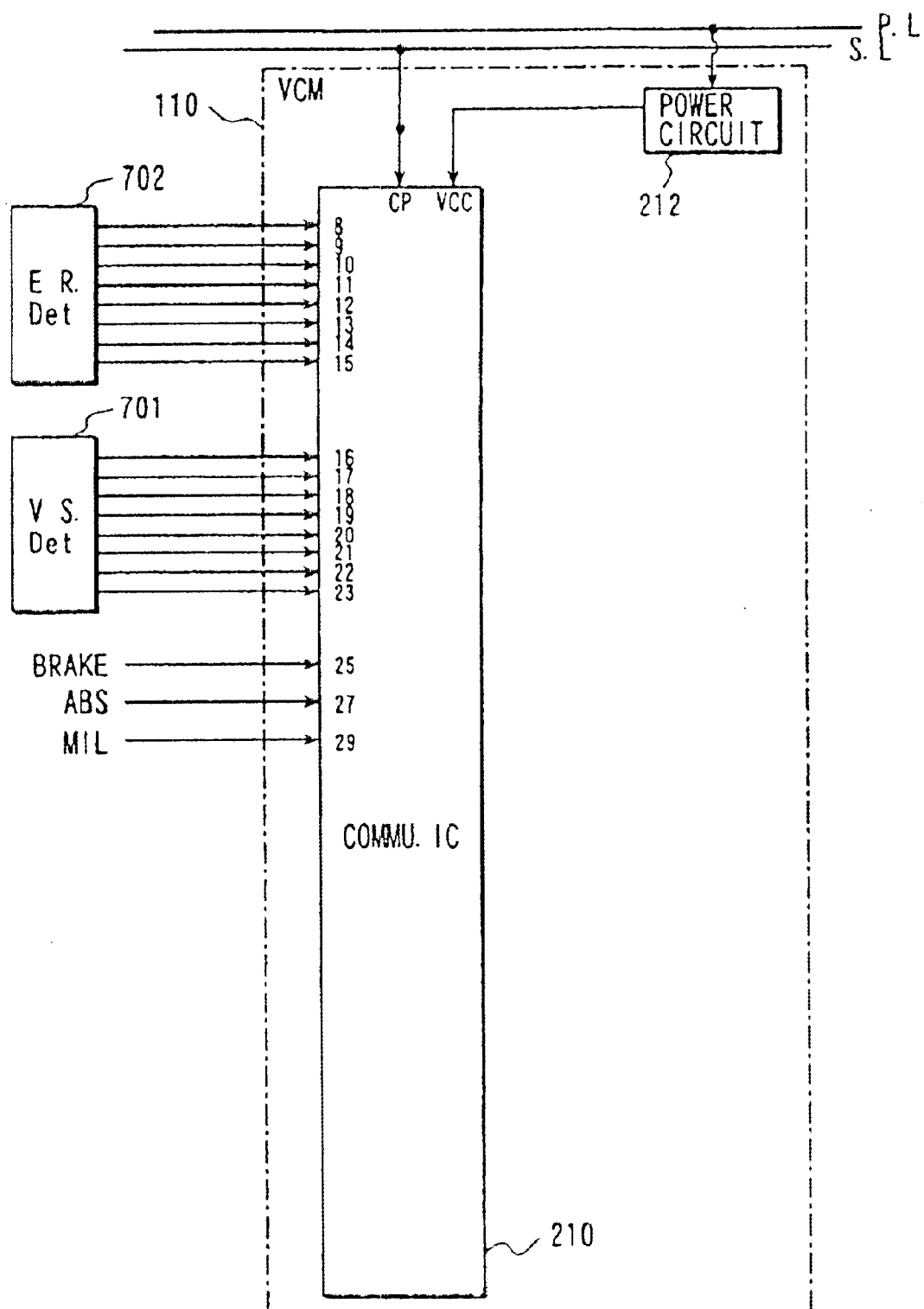
FIG. 7 is a schematic block diagram of a VCM in the electric power supply system for automobile according to one embodiment of the invention.

FIG. 7 is a schematic block diagram of a VCM in an electrical power supply system for an automobile according to one embodiment of the invention. FIG. 8 is an input bit map diagram at module address "#2" of the VCM according to the embodiment of the invention.

Referring to FIG. 7, VCM 110 is comprised of communication IC 210 and electrical power supply circuit 212. Communication IC 210 is connected to signal line SL. Communication IC 210 receives data transmitted through signal line SL and transmits data input through input means to BCM 100 via signal line SL.

Power supply circuit 212, which is connected to power line PL, converts the power supplied from the battery into a predetermined voltage, and supplies the same to communication IC 210 as its driver voltage.

Now, with reference to FIGS. 7 and 8, a relation between an input signal to be input to an input terminal of communication IC 210 and its input means will be described. As for a particular control method in response to a particular signal input from a particular input means will be described later with reference to FIG. 21 and subsequent figures indicating respective function block diagrams and programs of respective control specifications for respective controls.

As indicated in FIG. 8, input/output terminals specified at address "#2" of VCM have a 32 bit structure, of which a total of 19 bits are used including bits 8-23, bit 26, bit 27 and bit 29.

As indicated in FIG. 7, at bit 29 of communication IC 210, a fault indication signal (MIL indication signal) that indicates a fault in VCM 110 itself is input. A variable name of the input signal on its control program which will be described later is given by "iVcmMIL".

At bit 28 of communication IC 210, an ABS indication signal (ABS indication signal) is input for indicating that ABS is in operation. A variable name of the input signal on its control program which will be described later is given by "iVcmABS".

At bit 27 of communication IC 210, a brake indication signal (BRAKE indication signal) is input for indicating that the parking brake is at work. A variable name of the input signal on its control program which will be described later is given by "iVcmBrk".

From bit 23 to bit 16 of communication IC 210, which are connected to vehicle speed detector (VS Det) 701, there are input 8 bit data indicative of vehicle speeds detected by vehicle speed detector 701.

Further, from bit 15 to bit 8, which are connected to engine revolution detector (ER Det) 702, there are input 8 bit data (Engine Revolution data) indicative of engine revolutions detected by engine revolution detector 702.

Now, with reference to FIGS. 9 and 10, an internal configuration of FIM 120, and input and output means to be connected to communication IC in FIM 120 and its input and output signals will be described in the following.

Figure 9:
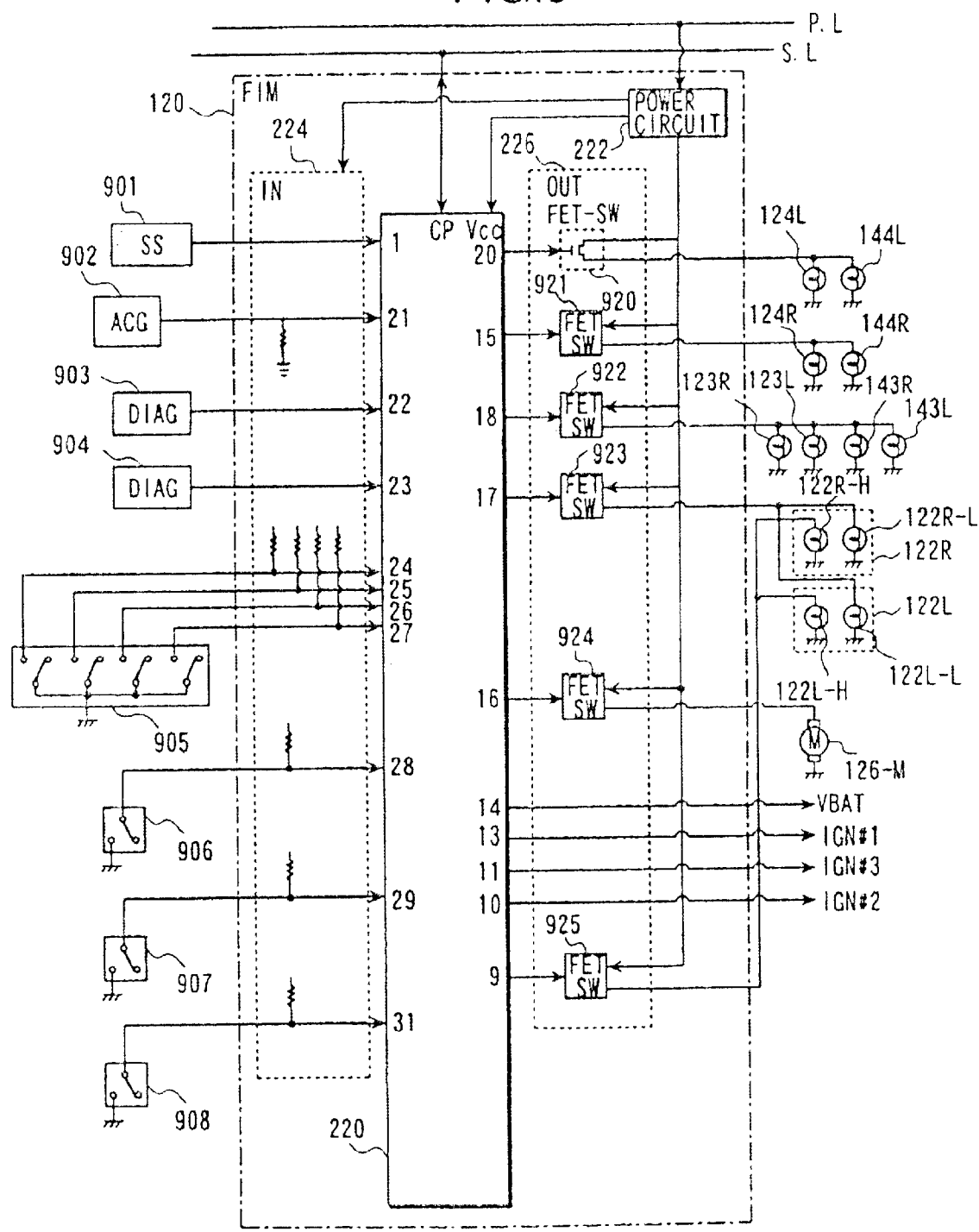
FIG. 9 is a schematic block diagram of an FIM in the electric power supply system for automobile according to one embodiment of the invention.

FIG. 9 is a schematic block diagram of an FIM in the power supply system for automobile according to one embodiment of the invention. FIG. 10 is an input bit map diagram at module address "#3" of the FIM according to the embodiment of the invention.

Referring to FIG. 9, FIM 120 is comprised of communication IC 220, power supply circuit 222, input circuit 224 and output circuit 226. Communication IC 220 is connected to signal line SL. Communication IC 220 transmits data input from input means to BCM 100 via signal line SL. Further, communication IC 220 receives data transmitted via signal line SL to output to its output circuit.

Power supply circuit 222, which is connected to power line PL, converts the power supplied from the battery into a predetermined voltage, and supplies a driver voltage to communication IC 220, a voltage to input circuit 224 for receiving input signals, as well as a driver voltage to output circuit 226 to drive electrical loads connected thereto.

Input circuit 224 is an interface for each switch and the like which is input means, and enters each status of each switch and the like into communication IC 220 through each input terminal. Further, output circuit 226, in response to an output signal output from a corresponding output terminal of communication IC 220, drives a corresponding MOSFET with protection function which is a switching device so as to supply a power from power supply circuit 222 to its electrical load.

Now, referring to FIGS. 9 and 10, a relation between each input signal to enter each input terminal of communication IC 220 and each input means therefor, as well as a relation between each output signal to output from each output terminal of communication IC 220 and each output circuit associated therewith and its electric load will be described in the following. By the way, as for a particular control method in response to a particular signal input from its associated input means will be described later with reference to FIG. 21 and its subsequent figures indicating function block diagrams and programs of each control specification for each control.

As shown in FIG. 10, input/output terminals of FIM specified at address "#3" thereof are comprised of 32 bit structure, of which bit 0 to bit 7, bit 15 and bit 30 are not used.

Referring to FIG. 9, short-circuit sensor (SS) 901 is connected to bit 8 of communication IC 220. Short-circuit sensor 901 detects a short-circuit condition of power line PL between its own module and the other modules. The short-circuit sensor is provided in FIM 120, DDM 130 and PDM 160, respectively. Respective short-circuit sensors have their own territory assigned thereto for detecting a short-circuit location of power line PL therein. For example, in the arrangement of FIG. 1, short-circuit sensor 901 of FIM 120 is assigned to detect occurrence of a short-circuit of power line PL between FIM 120 and DDM 130. Further, the short-circuit sensor of DDM 130 is assigned to detect occurrence of a short-circuit of power line PL between DDM 130 and PDM 160. Still further, the short-circuit sensor of PDM 160 is assigned to detect occurrence of a short-circuit of power line PL between PDM 160 and FIM 120. As described above, three units of the short-circuit sensors are used to assign a three-divisional coverage area of the power line PL in loop to each of them. Thereby, it is possible to determine in which location of these areas of the power line PL a short-circuit fault has occurred. By the way, a variable name of the input signal on its control program which will be described later is given by "xFimSsNG".

To bit 21 of communication IC 220, an AC generator (ACG) 902 is connected. When ACG 902 is not generating power, its input signal is "L" level, and when the same is generating power, its input signal is at "H" level. A variable name of the input signal on its control program which will be described later is given by "iACG_L".

To bit 22 of communication IC 220, a diagnosis unit (DIAG 903 for diagnosing a lamp failure of the automatic transmission is connected. When the lamp is not at failure, its input signal is "L" level, and when the lamp indicator fails, its input signal becomes "H" level. By the way, a variable name of the input signal on its control program which will be described later is given by "iPosFIdiag".

To bit 23 of communication IC 220, a diagnosis unit (DIAG) 904 for diagnosing a lamp failure of the turn signal lamp is connected. When the lamp is not in fault, its input signal is at "L" level, and when the lamp fails to turn on, its input signal becomes "H" level. By the way, a variable name of the input signal on its control program which will be described later is given by "iPTurnPIMdiag".

To bits 24-27 of communication IC 220, shift position detection means 905 for detecting the positions of the shift-lever (PRNDL) of the automatic transmission is connected. As will be described later, shift position detection means 905 outputs four bit data corresponding to each of the five shift-lever positions of PRNDL. A variable name of the input signal on its control program which will be described later is given by "iPNP_4", iPNP_3, "iPNP_2" and "iPNP_1", respectively.

To bit 28 of communication IC 220, a signal of shift interlock switch (P/NP(SI)SW(shift interlock)) 906 indicating that the shift lever of the automatic transmission is locked is input. When switch 906 is off, its input signal is set at "H" level by a voltage supplied from power supply circuit 222 via a resistance in input circuit 224. When switch 906 is turned on, its input signal becomes "L" level. By the way, a variable name of the input signal on its control program which will be described later is given by "iPNP_SI".

To bit 29 of communication IC 220, a signal of lift gate release switch (P/NP(LR)SW (liftgate release) 907 indicating that the lift gate is released is input. When switch 907 is off, its input signal is set at "H" level by a voltage supplied from power supply circuit 222 via a resistance in input circuit 222. When switch 907 becomes on, its input signal becomes "L" level. By the way, a variable name of the input signal on its control program which will be described later is given by "iPNP_LR".

To bit 31 of communication IC 220, a signal of reverse switch (reverse SW) 908 indicating that the shift lever of the automatic transmission is set at the reverse position is input. When switch 908 is off, its input signal is set at "H" level by a voltage supplied from power supply circuit 222 via a resistance in input circuit 224. When switch 908 becomes on, its input signal becomes "L" level. By the way, a variable name of the input signal on its control program which will be described later is given by "iPNP_Rvs".

Now, output signals from output terminals of communication IC 220 and respective electrical loads to be controlled in response to these output signals will be described in the following.

As indicated in FIG. 9, bit 20 in communication IC 220 is connected to a gate terminal of FET switch circuit (FET SW) 920 comprising MOSFET with protection function provided in output circuit 226. A source terminal of FET switch circuit 920 is applied with a predetermined voltage supplied from power supply circuit 222. Further, a drain terminal of FET switch circuit 920 is connected to electrical loads of left-turn signal lamps 124L, 144L shown in FIG. 1. Thereby, when an output signal of "H" level is output from bit 20 of communication IC 220, FET switch circuit 920 becomes conductive, thereby causing a voltage from power supply circuit 222 to be applied to left-turn signal lamps 124L, 144L so as to turn on the same. By repeating "H" level and "L" level of its output signal, left-turn signal lamps 124L and 144L are caused to turn on and off, or flash. By the way, a variable name of the output signal on its control program which will be described later is given by "oPTurnLHF".

Here, as a switching element which constitutes output circuit 226 of the invention, MOSFET with protection function is used. Further, the FET switch circuit may be comprised by combining a normal MOSFET and a self-recovery type interrupter element, instead of using the MOSFET with protection function.

Bit 19 of communication IC 220 is connected to a gate terminal of FET switch circuit (FET SW) 921 in output circuit 226. FET switch circuit 921 is connected to power supply circuit 222 and to electrical loads of right-turn signal lamps 124R and 144R. Therefore, when an output signal of "H" level is output from bit 19 of communication IC 220, FET switch circuit 921 becomes conductive thereby causing a voltage from power supply circuit 222 to be applied to right-turn signal lamps 124R and 144R consequently illuminating the same. By repeating "H" level and "L" level for the output signal, right-turn signal lamps 124R and 144R are caused to turn on and off, or flash. By the way, a variable name of the output signal on its control program which will be described later is given by "oPTurnRHF".

Bit 18 of communication IC 220 is connected to a gate terminal of FET switch circuit (FET SW) 922 in output circuit 226. FET switch circuit 922 is connected to power supply circuit 922 and to four electrical loads of body-side lamps 123R, 123L and tail lights 144R and 144L shown in FIG. 1. Therefore, when an output signal of "H" level is output from bit 18 of communication IC 220, FET switch circuit 922 becomes conductive thereby causing a voltage from power supply circuit 222 to be applied to body-side lamps 123R and 123L as well as tail lights 144R and 144L consequently illuminating these lamps. By the way, a variable name of the output signal on its control program which will be described later is given by "oPosFIM".

Bit 17 of communication IC 220 is connected to a gate terminal of FET switch circuit (FET SW) 923 in output circuit 226. FET switch 923 is connected to power supply circuit 222 and to electrical loads of low-beam lamps 122R-L and 122L-L in head lamps 122R and 122L shown in FIG. 1. Therefore, when an output signal of "H" level is output from bit 17 of communication IC 220, FET switch circuit 923 becomes conductive thereby causing a voltage from power supply circuit 222 to be applied to low-beam lamps 122R-L and 122L-L so as to illuminate the same. By the way, a variable name of the output signal on its control program which will be described later is given by "oLo-Beam".

Bit 16 of communication IC 220 is connected to a gate terminal of FET switch circuit (FET SW) 924 in output circuit 226. FET switch circuit 924 is connected to power supply circuit 222 and to an electrical load of motor-126-M in rear washer pump 126 shown in FIG. 1. Therefore, when an output signal of "H" level is output from bit 16 of communication IC 220, FET switch circuit 924 becomes conductive thereby causing a voltage from power supply circuit 222 to be applied to motor-126-M so as to actuate the pump. By the way, a variable name of the output signal on its control program which will be described later is given by "oRrWash".

Bit 14 of communication IC 220 is arranged to output a VBAT output signal for indicating that power is on. By the way, a variable name of the output signal on its control program which will be described later is given by "oVBout-FIM".

Bit 13, bit 11 and bit 10 in communication IC 220 are arranged to output ignition output signals (IGN#3 output signal, IGN#2 output signal and IGN#1 output signal), respectively. By the way, variable names of these output signals on their control programs which will be described later are given by "oIgn3outFIM", "oIgn2outFIM" and "oIgn1out FIM", respectively.

Bit 9 of communication IC 220 is connected to a gate terminal of FET switch circuit (FET SW) 925 in output circuit 226. FET switch circuit 925 is connected to power supply circuit 222 and to electrical loads of high-beam lamps 122R-H and 122L-H in head lamps 122R, 122L shown in FIG. 1. Therefore, when an output signal of "H" level is output from bit 9 of communication IC 220, FET switch circuit 925 becomes conductive thereby causing a voltage from power supply circuit 222 to be applied to high-beam lamps 122R-H and 122L-H so as to illuminate the same. By the way, a variable name of the output signal on its control program which will be described later is given by "oHiBeam".

Now, with reference to FIGS. 11 and 12, an internal configuration of DDM 130 as well as input means, output means connected to communication IC of DDM 130, and their input and output signals will be described in the following.

Figure 11:
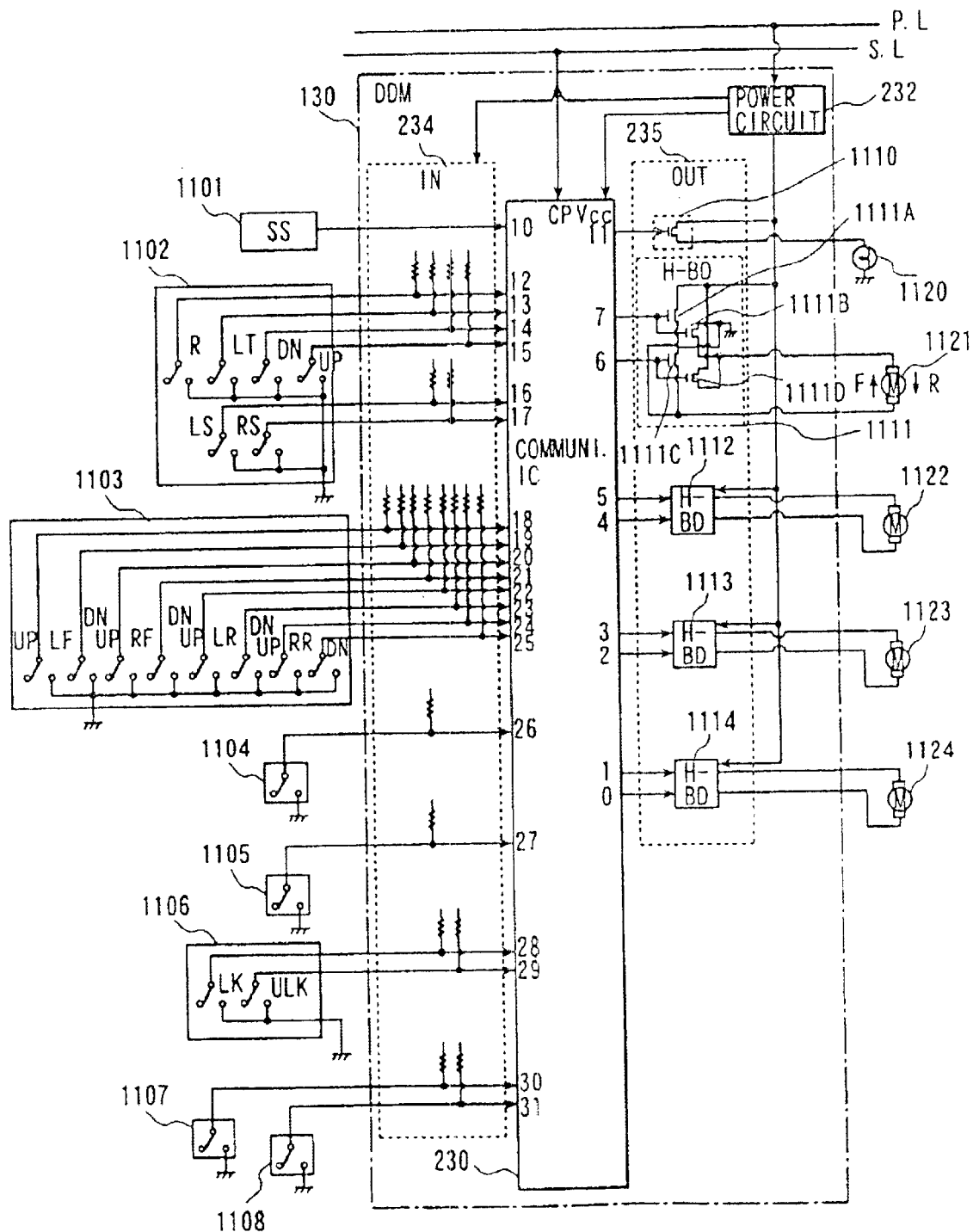
FIG. 11 is a schematic block diagram of DDM in the electric power supply apparatus for automobile according to one embodiment of the invention.

FIG. 11 is a schematic block diagram of DDM in the electrical power supply system for automobile according to one embodiment of the invention. FIG. 12 is an I/O bit map diagram at "#4" of module address of DDM according to the embodiment of the invention.

In FIG. 11, DDM 130 is comprised of communication IC 230, power supply circuit 232, input circuit 234, and output circuit 236. Communication IC 230 transmits data received from input means to BCM 100 via signal line SL. Further, communication IC 230 outputs data transmitted via signal line SL to its output circuit.

Power supply circuit 232, which is connected to power line PL, converts power supplied from the battery into a predetermined voltage for supplying voltage to drive communication IC 230, as well as for supplying voltage to input circuit 234 for entry of input signals, and also for supplying drive voltages to drive electrical loads connected to output circuit 236.

Input circuit 234 that is an input interface for respective switches and the like which is input means enters status of each switch and the like into communication IC 230 via each input terminal. Further, in response to an output signal output from each output terminal of communication IC 230, output circuit 236 causes a MOSFET with protection function that is a switching device to operate so as to supply electric power from power supply circuit 232 to each electrical load associated therewith.

Now, with reference to FIGS. 11 and 12, a relation between an input signal to each input terminal of communication IC 230 and input means associated therewith, as well as a relation between an output signal from each output terminal and its output circuit or its electrical load will be described in the following. By way of example, as to a control method in response to the input signal from the input means will be described later with reference to FIG. 21 and its subsequent drawings which indicate functional block diagrams and program flowcharts of control specifications for respective controls.

As shown in FIG. 12, I/O terminals of DDM specified at "#4" address are comprised of a 32 bit structure, wherein bit 8 and bit 9 are not used.

As shown in FIG. 11, at bit 10 of communication IC 230, short-circuit detection sensor (SS) 1101 is connected. DDM 130 is assigned to detect a short-circuit condition of power line PL located in an area between DDM 130 and PDM 160. By the way, a variable name of the input signal on its control program which will be described later is given by "xDdmSsNG".

From bit 12 to bit 17 in communication IC 230, there are connected door mirror switch (Door Mirror) 1102 provided in switch 132 on the driver's side shown in FIG. 1. Door mirror switch (Door Mirror) 1102 is comprised of right turn switch (Door mirror right sw) RT for rotating the door mirror in the right direction, left turn switch (Door mirror left sw) LT for rotating the door mirror in the left direction, down switch (Door mirror down sw) DN for rotating the door mirror in the downward direction, up-switch (Door mirror up sw) UP for rotating the door mirror in the upward direction, left select switch (Door select LH sw) LS for selecting the left-side door mirror out of the left and right side door mirrors, and right side select switch (Door select RH sw) RS for selecting the right-side door mirror.

When right-turn switch RT connected to bit 12 in communication IC 230 is off, its input signal is at "H" level by a voltage supplied from power supply circuit 232 via resistance in input circuit 234. When right-turn switch RT is on, its input signal becomes "L" level. In the same way, when left-turn switch LT connected to bit 13 is off, its input signal is at "H" level, and when it is on, its input signal becomes "L" level. When down switch DN which is connected to bit 14 is off, its input signal is at "H" level, and when it is on, its input signal becomes "L" level. When up switch UP connected to bit 15 is off, its input signal is at "H" level, and when it is on, the same becomes "L" level. When left select switch LS is off, its input signal is at "H" level, and when it is on, the same becomes "L" level. When righ select switch RS connected to bit 17 is off, its input signal is "H" level, and when it is on, the input signal becomes "L" level. By the way, variable names of input signals on their control programs which will be described later are given by "iDmRH", "iDmLH", "iDmDN", "iDmUP", "iDmLHSel" and "iDmRHSel", respectively.

From bit 18 to bit 25 in communication IC 230, there are connected power window switch (P/W sw) 1103 provided in door switch 132 on the driver's side shown in FIG. 1. Power window switch (P/W sw) 1103 is comprised of up switch LP-UP for lifting a driver's side window (LF), down switch LF-DN for descending the driver's side window (LF), up switch RF-UP for lifting window (RF) opposite to the driver, down switch RF-DN for descending the window (RF) opposite to the driver, up switch LR-UP for lifting window (LR) at the rear left side, down switch LR-DN for descending the window (LR) at the rear left side, up switch RR-UP for lifting window (RR) at the rear right side, and down switch RR-DN for descending the window (RR) at the rear right side.

When up switch LP-UP connected to bit 18 of communication IC 230 is off, its input signal is at "H" level by a voltage supplied from power supply circuit 232 via a resistance in input circuit 234. When up switch LF-UP is switched on, its input signal becomes "L" level. Down switch LF-DN connected to bit 19, up switch RF-UP connected to bit 20, down switch RF-DN connected to bit 21, up switch LR-UP connected to bit 22, down switch LR-DN connected to bit 23, up switch RR-UP connected to bit 24, and down switch RR-DN connected to bit 25 do operate in the same way. By the way, variable names of input signals on their control programs which will be described later are given by "iDrPwFLUp", "iDrPwFLDn", "iDrPwFRUp" "iDrPwFRDn", "iDrPwRLUp", "iDrPwRLDn", "iDrPwRRUp", and "iDrPwRRDn", respectively.

To bit 26 of communication IC 230, there is connected power window auto-lock detect switch 1104 for automatically locking the power window provided in switch 132 at the driver's side door shown in FIG. 1. When auto-lock detect switch 1104 is detecting a lock condition, its input signal is at "H" level by a voltage supplied from power supply circuit 232 via resistance in input circuit 234. When it is in unlock condition, its input signal becomes "L" level. By the way, a variable name of the input signal on its control program which will be described later is given by "iPwMtLk".

Bit 27 of communication IC 230 is connected with power window lock switch 1105 in switch 132 at the driver's side door shown in FIG. 1 for manually locking the power window. When lock switch 1105 is in a locked state, its input signal is at "H" level by a voltage supplied from power supply circuit 232 via a resistance in input circuit 234. When the same is in an unlock state, its input signal becomes "L" level. By the way, a variable name of the input signal on its control program which will be described later is given by "iPwLkSw".

Bit 28 and bit 29 of communication IC 230 are connected with door lock/unlock switch 1106 in switch 132 at the driver's side door shown in FIG. 1 for locking/unlocking all the doors concentrically. When the door lock switch is in off-state, its input signal is at "H" level by a voltage supplied from power supply circuit 232 via a resistance in input circuit 234. When the same is on-state, its input signal becomes "L" level. By the way, a variable name of the input signal on its control program which will be described later is given by "iDrDRCLk". Further, with the door unlock switch being in off-state, its input signal is at "H" level by a voltage supplied from power supply circuit 232 via a resistance in input circuit 234. When in on-state, its input signal becomes "L" level. A variable name of the input signal on its control program which will be described later is given by "iDrDRCUlk".

Bit 30 of communication IC 230 is connected with door handle switch 1107 in switch 132 at the driver's side door shown in FIG. 1 for indicating a state of operation of the door handle. With door handle switch 1107 in a pulled state, its input signal is at "H" level by a voltage supplied from power supply circuit 232 via a resistance in input circuit 234. When the door handle is returned to its initial state, its input signal becomes "L" level. A variable name of the input signal on its control program which will be described later is given by "iDrDRHdl".

Bit 31 of communication IC 230 is connected with door lock detection switch 1108 in switch 132 at the driver's side door shown in FIG. 1 for detecting a door's lock state. With door lock detection switch 1108 in a locked state, its input signal is set at "H" level by a voltage supplied from power supply circuit 232 via a resistance in input circuit 234. With the same in unlocked state, its input signal becomes "L" level. A variable name of the input signal on its control program which will be described later is given by "iDrDRDlk".

In the next, output signals to be output from output terminals of communication IC 230 and electrical loads to be controlled in response to these output signals will be described in the following.

With reference to FIG. 11, bit 11 of communication IC 230 is connected to a gate terminal of FET switch circuit (FET SW) 1110 which is comprised of MOSFET with protection function provided in output circuit 236. A source terminal of FET switch circuit 1110 is applied with a predetermined voltage from power supply circuit 232. Further, a drain terminal of FET switch circuit 1110 is connected to switch illumination lamp 1120 in lamp 136 shown in FIG. 1 at the driver's side door. Therefore, when an output signal of "H" level is output from bit 11 of communication IC 230, FET switch circuit 1110 becomes conductive, thereby applying a voltage from power supply circuit 222 to switch illumination lamp 1120 so as to illuminate the same. By the way, a variable name of the output signal on its control program which will be described later is given by "oDRSwILm".

Here, as switching devices that constitute output circuit 236, MOSFETs with protection function are used. However, it is not limited thereto, and the FET switch circuit of the invention can be also constructed by combining conventional MOSFETs and self-recovery type interrupting devices, instead of using the MOSFETs with protection function.

Bit 7 and bit 6 of communication IC 230 are connected to H-Bridge circuit (H-BD) 1111 in output circuit 236. H-Bridge circuit 1111 is comprised of four FET switch circuits (FET SW) 1111A, 1111B, 1111C and 1111D, each of which is comprised of MOSFET with protection function.

Bit 7 of communication IC 230 is connected to gate terminals of FET switch circuit 1111A and 1111B. Bit 6 of communication IC 230 is connected to gate terminals of FET switch circuits 1111C and 1111D. Source terminals of FET switch circuits 1111A and 1111D are connected to power supply circuit 232. A drain terminal of FET switch circuit 1111A and a source terminal of FET switch circuit 1111C are connected to X-terminal of motor 1121. Drain terminals of FET switch circuit 1111B and 1111C are grounded. A source terminal of FET switch circuit 1111B and a drain terminal of FET switch circuit 1111D are connected to Y-terminal of motor 1121.

When an output signal from bit 7 of communication IC 230 becomes "H" level, FET switch circuits 1111A and 1111B become conductive thereby conducting a current in forward direction in motor 1121 so as to rotate the motor in a normal direction. Further, when an output from bit 6 of communication IC 230 becomes "H" level, FET switch circuits 1111C and 1111D become conductive thereby conducting a current in reverse direction in motor 1121 so as to rotate the motor in a reverse direction.

Here, motor 1121 which is an electrical load refers to a door lock motor in motor 134 shown in FIG. 1. Namely, when the output from bit 7 of communication IC 230 becomes "H" level, H-Bridge circuit 1111 causes door lock motor 1121 to rotate in the normal direction so as to unlock the doors. Further, when the output from bit 6 of communication IC 230 becomes "H" level, H-Bridge circuit 1111 causes door lock motor 1121 to rotate in the normal direction so as to lock the doors. By the way, variable names of output signals on their control programs which will be described later are given by "oDRRLk_1" and "oDRRLk_2", respectively.

By way of example, H-Bridge circuit to be described in the following is comprised of four FET switch circuits each comprised of MOSFET with protection function as the H-Bridge circuit 1111 described above, and has the same function therewith to rotate the motor in the normal and reverse directions in response to the two input signals described above.

Bit 5 and bit 4 of communication IC 230 are connected to H-Bridge circuit (H-BD) 1112 in output circuit 236. H-Bridge circuit 1112 is connected to power supply circuit 232 and to an electric load of power window motor 1122 in motor 134 shown in FIG. 1. Therefore, when an output from bit 5 of communication IC 230 becomes "H" level, power window motor 1122 is caused to rotate in the normal direction so as to lift the window at the driver's side. Further, when an output from bit 4 of communication IC 230 becomes "H" level, the power window motor 1122 is caused to rotate in the reverse direction so as to descend the window at the driver's side. By the way, variable names of output signals on control programs which will be described later are given by "oPwDR-1" and "oPwDR-2", respectively.

Bit 3 and bit 2 of communication IC 230 are connected to H-Bridge circuit (H-BD) 1113 in output circuit 236. H-Bridge circuit 1113 is connected to power supply circuit 232 and to an electrical load of door mirror L/R rotation motor 1123 in motor 134 at the driver's side shown in FIG. 1. Therefore, when an output from bit 3 of communication IC 230 becomes "H" level, door mirror L/R rotation motor 1123 is caused to rotate in the normal direction so as to rotate the door mirror in the right-hand direction. Further, when an output from bit 2 in communication IC 230 becomes "H" level, the door mirror L/R rotation motor 1123 is caused to rotate in the reverse direction so as to rotate the door mirror in the left-hand direction. By the way, variable names of these output signals on their control programs which will be described later are given by "oLHMirRLH-1" and "oLHMirRLH-2".

Bit 1 and bit 0 of communication IC 230 are connected to H-Bridge circuit (H-BD) 1114 in output circuit 236. The H-Bridge circuit 1114 is connected to power supply circuit 232 and to an electrical load of door mirror up/down rotation motor 1124 in motor 134 shown in FIG. 1 at the driver's side. Therefore, when an output from bit 1 of communication IC 230 becomes "H" level, the door mirror up/down rotation motor 1124 is caused to rotate in the normal direction so as to rotate the door mirror in the upper direction. Further, when an output from bit 0 of communication IC 230 becomes "H" level, the door mirror up/down rotation motor 1124 is caused to reverse so as to rotate the door mirror in the downward direction. By the way, variable names of these output signals on their control programs which will be described later are given by "oLHMirUD-1" and "oLHMirUD-2", respectively.

Now, with reference to FIGS. 13 and 14, an internal arrangement of RIM 140, input means and output means to be connected to communication IC of RIM 140, as well as their input signals and output signals will be described in the following.

Figure 13:
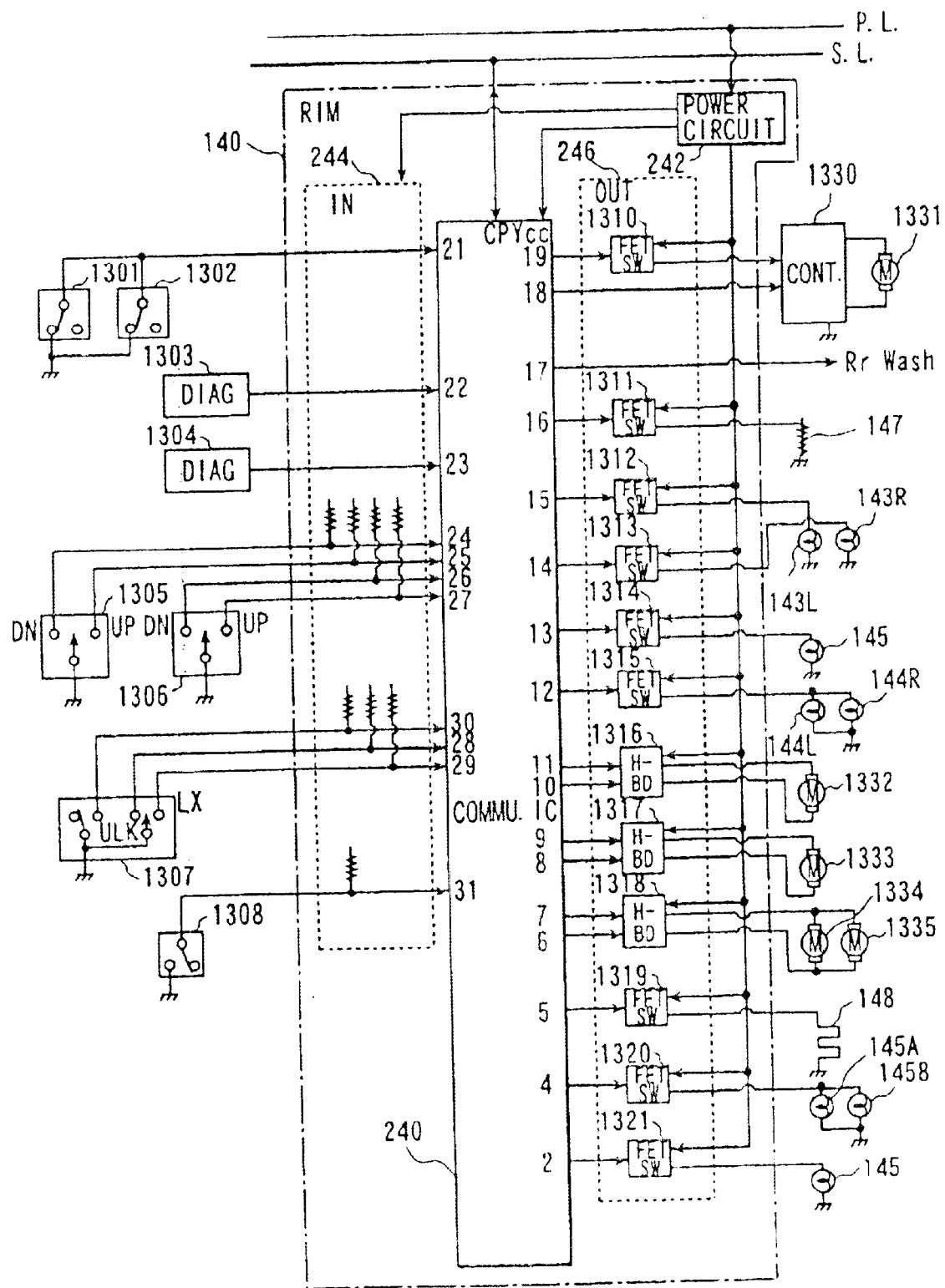
FIG. 13 is a schematic block diagram of RIM in the electric power supply apparatus in the automobile according to one embodiment of the invention.

FIG. 13 is a schematic block diagram of RIM in the power supply system for automobile according to one embodiment of the invention. FIG. 14 is an I/O bit map diagram at module address "#5" of RIM according to this embodiment of the invention.

In FIG. 13, RIM 140 of the invention is comprised of communication IC 240, power supply circuit 242, input circuit 244, and output circuit 246. Communication IC 240 transmits data received from input means to BCM 100 via signal line SL. Further, communication IC 240 outputs data transmitted thereto through signal line SL to the output circuit.

Power supply circuit 242 which is connected to power line PL converts power supplied from the battery into a predetermined voltage so as to supply a driver voltage to communication IC 240, an input signal entry voltage to input circuit 244 and a drive voltage to output circuit 246 for actuating electrical loads connected therewith.

Input circuit 244 which is an input interface provided for input means such as various switches and the like enters each state of each switch and the like into communication IC 240 via each input terminal. Further, in response to an output signal output from each output terminal of communication IC 240, output circuit 246 enables a MOSFET with protection function which is a switching device associated therewith to operate so as to supply power from power supply circuit 242 to an electrical load associated therewith.

Now, in reference to FIGS. 13 and 14, a relation between each signal to enter each input terminal of communication IC 240 and each input means therefor, as well as a relation between each output signal from each output terminal therein and each output circuit and/or each electrical load associated therewith will be described in the following. By the way, as to a control method on the basis of an input signal from each input means will be described later with reference to FIG. 21 and its subsequent figures wherein function block diagrams of respective control specifications for respective controls and their program flowcharts are shown.

As shown in FIG. 14, I/O terminals of RIM specified at address "#5" are made up of 32 bits, wherein bit 0, bit 3 and bit 20 are not used.

As shown in FIG. 13, at bit 21 of communication IC 240, there enters a signal of rear door switch 1301 and 1302 in left/right door switch 141R and 141L shown in FIG. 1 for the left and right side doors at the passenger's rear seats. When both switches 1301 and 1302 are off-state, its input signal is set at "H" level by a voltage supplied from power supply circuit 242 via a resistance in input circuit 244. When either of switches 1301 and 1302 becomes on-state, its input signal becomes "L" level. By the way, a variable name of the input signal on its control program which will be described later is given by "iRearJamb".

At bit 22 of communication IC 240, there is connected diagnosis unit (DIAG) 1303 for diagnosing lamp failure of rear right side turn/stop lamp 143R shown in FIG. 1. When there is no lamp failure, its input signal is set at "L" level, and when there occurs a lamp failure, its input signal becomes "H" level. By the way, a variable name of the input signal on its control program which will be described later is given by "iRRTurnSTPdiag".

At bit 23 of communication IC 240, there is connected diagnosis unit (DIAG) 1304 for diagnosing a lamp failure of rear left-side turn/stop lamp 143L shown in FIG. 1. When there is no lamp failure, its input signal is set at "L" level, and when there occurs a lamp failure, its signal becomes "H" level. By the way, a variable name of the input signal on its control program which will be described later is given by "iRLTurnSTPdiag".

At bit 24 and bit 25 of communication IC 240, there are entered a signal of power window's up/down switch (P/W RR DOWN SW; P/2 RR UP SW) 1305 in switch 141R shown in FIG. 1 at the right side of the rear seat. When switch 1305 is switched to the down side (DN), an input signal to bit 24 becomes "H" level by a voltage supplied from power supply circuit 242 via a resistance in input circuit 244. Further, when switch 1305 is switched to the up (UP) side, an input signal to bit 25 becomes "H" level. By the way, variable names of these input signals on their control programs which will be described later are given by "iPwRRDn" and "iPwRRUp", respectively.

At bit 26 and bit 27 of communication IC 240, there are entered a signal of power window's up and down switch (P/2 RL DOWN SW; P/2 RL UP SW) 1306 in switch 141L shown in FIG. 1 at rear seat left side. When switch 1306 is switched to the down (DN) side, an input signal to bit 26 becomes "H" level by a voltage supplied from power supply circuit 242 via a resistance in input circuit 244. Further, when switch 1306 is switched to the up (UP) direction, an input signal to bit 27 becomes "H" level. By the way, variable names of input signals on their control programs which will be described later are given by "iPwRLDn" and "iPwRLUp", respectively.

At bit 28 to bit 30 of communication IC 240, there are input a signal of end gate lock/unlock and release switch 1307 in switch 141 shown in FIG. 1 in the rear side of the body. When the lock/unlock switch in switch 1307 is switched to the unlock (ULK) side, an input signal to bit 28 becomes "H" level by a voltage supplied from power supply circuit 242 via a resistance in input circuit 244. Further, when the same is switched to the lock (LK) side, an input signal to bit 29 becomes "H" level. Still further, when the release switch in switch 1307 becomes on-state, an input signal to bit 30 becomes "H" level. By the way, variable names of these input signals on their control programs which will be described later are given by "iGateULKSw", "iGateLKSw" and "iGateReLease", respectively.

At bit 31 of communication IC 240, there is entered a signal of end gate door switch 1308 in switch 141 shown in FIG. 1 at the rear side of the body for indicating an open/close state of the end gate door. In the close state of the end gate door, switch 1308 is off-state, and an input signal to bit 31 becomes "H" level by a voltage supplied through a resistance in input circuit 244 from power supply circuit 242. Further, when the end gate is opened, an input signal to bit 31 becomes "L" level. By the way, a variable name of the input signal on its control program which will be described later is given by "iGateJaambSw".

In the next, outputs signals to be output from output terminals of communication IC 240 and electrical loads to be controlled in response to these output signals will be described in the following.

As shown in FIG. 13, bit 19 of communication IC 240 is connected to a gate terminal of FET switch circuit (FET SW) 1330 comprising a MOSFET with protection function in output circuit 246. FET switch circuit 1330 is connected between power supply circuit 242 and rear wiper controller 1330. When an output signal of "H" level is output from bit 19 of communication IC 240, FET switch circuit 1310 becomes conductive thereby causing a voltage from power supply circuit 242 to be applied to rear wiper controller 1330, thereby supplying the voltage across an electrical load of rear wiper motor 1331 in motor 142 shown in FIG. 1.

Further, an output signal from bit 18 of communication IC 240 is input to rear wiper controller 1330 so as to control the operation of rear wiper motor 1331. That is, the rear wiper is controlled to operate continuously, intermittently or the like. Variable names of the output signal on its control program which will be described later are given by "oRrWipPwr" and "oRrWipCt1", respectively.

Here, as switching devices that constitute the output circuit 246 of the invention, MOSFETs with protection function are used. Further, it is not limited thereto, and the FET switch circuit of the invention can be constructed by combining conventional MOSFETs and self-recovery type interrupting devices within the scope of the invention.

Bit 17 of communication IC 240 outputs a signal to the rear wiper washer. By the way, a variable name of the output signal on its control program which will be described later is given by "oRrWipWash".

Bit 16 of communication IC 240 is connected to a gate terminal of FET switch circuit (FET SW) 1311 in output circuit 246. FET switch circuit 1311 is connected between power supply circuit 242 and an electrical load of solenoid 147 shown in FIG. 1 for releasing the end gate. When an output signal of "H" level is output from bit 16 of communication IC 240, FET switch circuit 1311 becomes conductive, thereby supplying a voltage from power supply circuit 242 to solenoid 147, and thereby releasing the end gate. By the way, a variable name of the output signal on its control program which well be described later is given by "oGateOpen".

Bit 15 of communication IC 240 is connected to a gate terminal of FET switch circuit (FET SW) 1312 in output circuit 246. FET switch circuit 1312 is connected between power supply circuit 242 and an electrical load of left-side turn/stop lamp 143L shown in FIG. 1. When an output signal of "H" level is output from bit 15 of communication IC 240, FET switch circuit 1212 becomes conductive thereby causing a voltage from power supply circuit 242 to be supplied to turn/stop lamp 143L so as to illuminate the same. By the way, a variable name of the output signal on its control program which will be described later is given by "oTurnStpLHR".

Bit 14 of communication IC 240 is connected to a gate terminal of FET switch circuit (FET SW) 1313 provided in output circuit 246. FET switch circuit 1313 is connected between power supply circuit 242 and an electrical load of right-side turn/stop lamp 143R shown in FIG. 1. When an output signal of "H" level is output from bit 14 of communication IC 240, FET switch circuit 1313 becomes conductive thereby allowing a voltage from power supply circuit 242 to be supplied to turn/stop lamp 143R so as illuminate the same. By the way, a variable name of the output signal on its control program which will be described later is given by "oTurnStpRHR".

Bit 13 of communication IC 240 is connected to a gate terminal of FET switch circuit (FET SW) 1314 in output circuit 246. FET switch circuit 1314 is connected between power supply circuit 242 and an electrical load of center stop lamp (high-mount lamp) 145 shown in FIG. 1. When an output signal of "H" level is output from bit 13 of communication IC 240, FET switch circuit 1314 becomes conductive, thereby allowing a voltage from power supply circuit 242 to be supplied to center stop lamp 145 so as to illuminate the same. By the way, a variable name of the output signal on its control program which will be described later is given by "oHiMountSTP".

Bit 12 of communication IC 240 is connected to a gate terminal of FET switch circuit (FET SW) 1315 provided in output circuit 246. FET switch circuit 1315 is connected between power supply circuit 242 and an electrical load of tail lights 144S, 144L shown in FIG. 1. When an output signal of "H" level is output from bit 12 of communication IC 240, FET switch circuit 1315 becomes conductive, thereby allowing a voltage from power supply circuit 242 to be supplied to tail lights 144R, 144L so as to illuminate the same. A variable name of the output signal on its control program which will be described later is given by "oPos-RIM".

Bit 11 and bit 10 of communication IC 240 are connected to H-Bridge circuit (H-BD) 1316 provided in output circuit 246. H-Bridge circuit 1316 is connected to power supply circuit 242 and to an electrical load of right-side power window motor 1332 in motor 142 shown in FIG. 1 at the rear seat on the right side. Therefore, when an output from bit 11 of communication IC 240 becomes "H" level, power window motor 1332 is caused to rotate in the normal direction so as to lift the rear window on the right side. Further, when an output from bit 10 of communication IC 240 becomes "H" level, the power window motor 1332 is caused to rotate in the reverse direction so as to descend the rear window on the right-side. By the way, variable names of output signals on their control programs which will be described later are given by "oPwPR-1" and "oPwRR-2", respectively.

Bit 9 and bit 8 of communication IC 240 are connected to H-Bridge circuit (H-BD) 1317 provided in output circuit 246. H-Bridge circuit 1317 is connected to power supply circuit 242 and to an electrical load of left-side power window motor 1333 in motor 142 shown in FIG. 1 at the rear seat on the left side. Therefore, when an output signal from bit 9 of communication IC 240 becomes "H" level, power window motor 1333 is caused to rotate in the normal direction so as to lift the rear window on the left side. Further, when an output signal from bit 8 of communication IC 240 becomes "H" level, the power window motor 1333 is caused to rotate in the reverse direction so as to descend the rear window on the left side. By the way, variable names of their output signals on their control programs which will be described later are given by "oPwRL-1" and "oPwRL-2", respectively.

Bit 7 and bit 6 of communication IC 240 are connected to H-Bridge circuit (H-BD) 1318 provided in output circuit 246. H-Bridge circuit 1318 is connected to power supply circuit 242 and to an electrical load of rear door lock motors 1334, 1336 in motor 142 shown in FIG. 1 for locking left and right-side rear seat doors. Therefore, when an output from bit 7 of communication IC 240 becomes "H" level, the rear door lock motors 1334, 1335 are caused to rotate in the normal direction so as to lock the left and right-side rear doors. Further, when an output from bit 6 of communication IC 240 becomes "H" level, the rear door lock motors 1334, 1335 are caused to rotate in the reverse direction so as to unlock the left and right-side rear seat doors. By the way, variable names of these output signals on their control programs which will be described later are given by "oRrDrLkMt-1" and "oRrDrLkMt-2", respectively.

Bit 5 of communication IC 240 is connected to a gate terminal of FET switch circuit (FET SW) 1319 in output circuit 246. FET switch circuit 1319 is connected between power supply circuit 242 and an electrical load of heater 148 for use of the rear defogger shown in FIG. 1. When an output signal of "H" level is output from bit 5 in communication IC 240, FET switch circuit 1319 becomes conductive thereby causing a voltage from power supply circuit 242 to be supplied to heater 148 so as to heat the same. By the way, a variable name of the output signal on its control program which will be described later is given by "oDeffog".

Bit 4 of communication IC 240 is connected to a gate terminal of FET switch circuit (FET SW) 1320 provided in output circuit 246. FET switch circuit 1320 is connected between power supply circuit 242 and an electrical load of back-up lamp 146, namely, two sets of back-up lamps 146A and 146B installed at the rear end of the car as shown in FIG. 1. When an output signal of "H" level is output from bit 4 of communication IC 240, FET switch circuit 1320 becomes conductive, thereby causing a voltage from power supply circuit 242 to be supplied to back-up lamps 146A and 146B so as to illuminate the same two. By the way, a variable name of the output signal on its control program which will be described later is given by "oBackLamp".

Bit 2 of communication IC 240 is connected to a gate terminal of FET switch circuit (FET SW) 1321 provided in output circuit 246. FET switch circuit 1321 is connected between power supply circuit 242 and an electrical load of rear dome lamp 149 shown in FIG. 1. When an output signal of "H" level is output from bit 2 of communication IC 240, FET switch circuit 1321 becomes conductive thereby causing a voltage from power supply circuit 242 to be supplied to rear dome lamp 149 so as to illuminate the same. By the way, a variable name of the output signal on its control program which will be described later is given by "oRrDome".

Now, with reference to FIGS. 15 and 16, an internal construction of CCM 150 and input means to be connected to communication IC in CCM 150 as well as their input signals will be described in the following.

Figure 15:
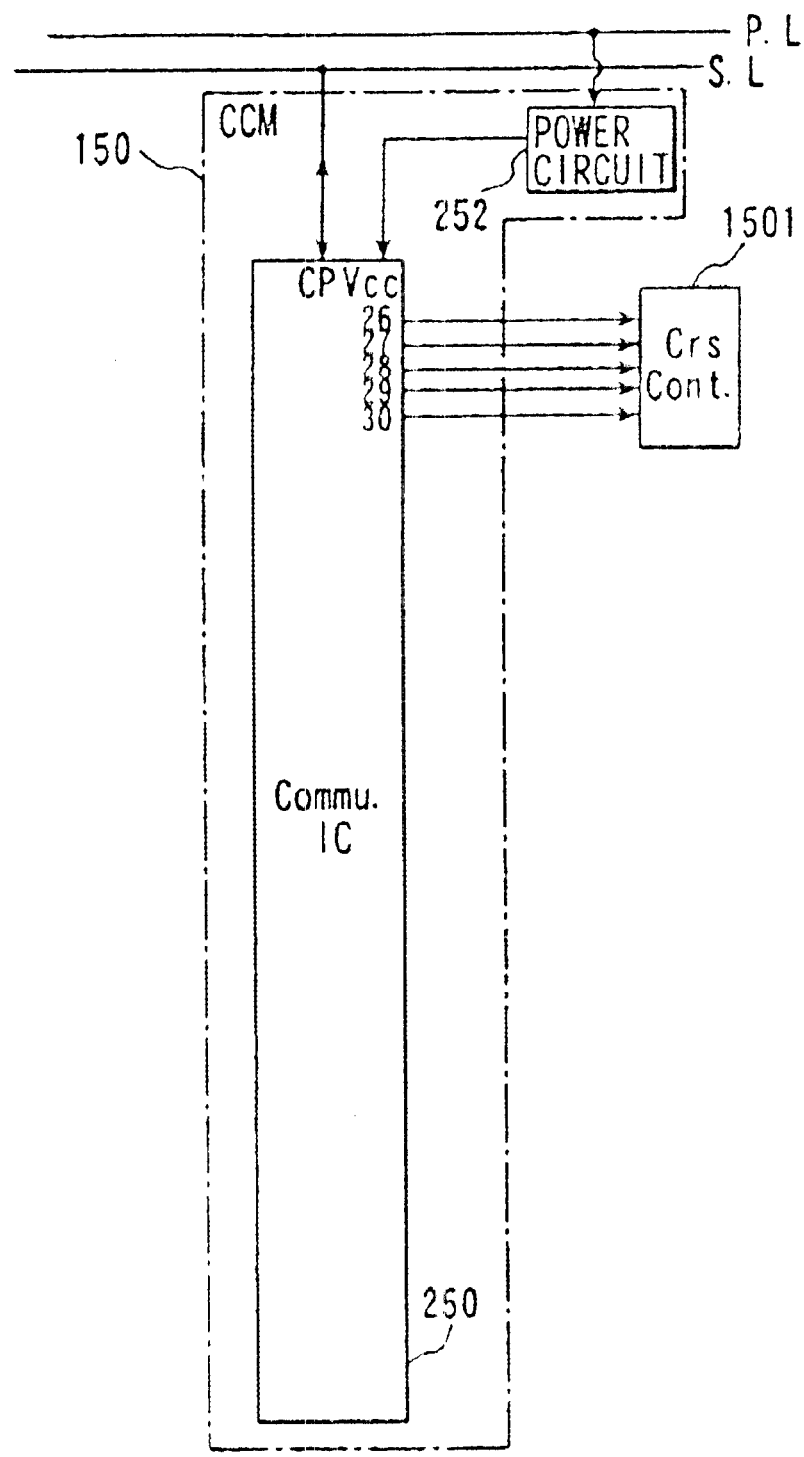
FIG. 15 is a schematic block diagram of CCM in the electric power supply apparatus according to one embodiment of the invention.

FIG. 15 is a schematic block diagram of a CCM in the power supply system for automobile according to one embodiment of the invention. FIG. 16 is an input bit map diagram at module address "#6" of CCM according to this embodiment of the invention.

In FIG. 15, CCM 150 is comprised of communication IC 250 and power supply circuit 252. Communication IC 250 is connected to signal line SL. Communication IC 250 enters data that is transmitted via signal line SL, and transmits data that is input from input means to BCM 100 via signal line SL.

Power supply circuit 252 is connected to power line PL, and converts power that is supplied from the battery into a predetermined voltage which is supplied as a driver voltage for communication IC 250.

Now, in reference to FIGS. 15 and 16, a relation between an input signal that is input to an input terminal of communication IC 250 and an input means corresponding thereto will be described in the following. By the way, as to a control method based on an input signal input from the input means will be described later with reference to FIG. 21 and its subsequent drawings wherein functional block diagrams of control specifications for respective control methods and program flowcharts are indicated.

As shown in FIG. 16, I/O terminals specified at address "#2" of CCM have 32 bit construction, and wherein a total of 5 bits from bit 26 to bit 30 are used.

As indicated in FIG. 15, a cruise brake pedal switch signal (Cruise Brake Pedal sw) is output from bit 26 of communication IC 250 to cruise controller (Crs Cont) 1501. By the way, a variable name of the output signal on its control program which will be described later is given by "iCcmBrkPd1".

From bit 27 of communication IC 250, a cruise brake lamp switch signal (Cruise Brake Lamp sw) is output to cruise controller (Crs Cont) 1501. By the way, a variable name of the output signal on its control program which will be described later is given by "iCcmCrsLmp".

From bit 28 of bits 28 to 30 of communication IC 250, there is output a cruise on/off signal (Cruise on/off signal) to cruise controller (Crs Cont) 1501, from bit 29 there is output a cruise set signal (Cruise Set/coast signal) to cruise controller (Crs Cont) 1501, and from bit 30 there is output a cruise release signal (Cruise Resume/accel signal) to cruise controller (Crs Cont) 1501. By the way, variable names of these output signals on their control programs which will be described later are given by "iCcmCrsOF", "iCcmCrsSC", and "iCcmCrsRA", respectively.

Now, with reference to FIGS. 17 and 18, an internal construction of PDM 160 and input and output means to be connected to communication IC in PDM 160 as well as their input signals and output signals will be described in the following.

Figure 17:
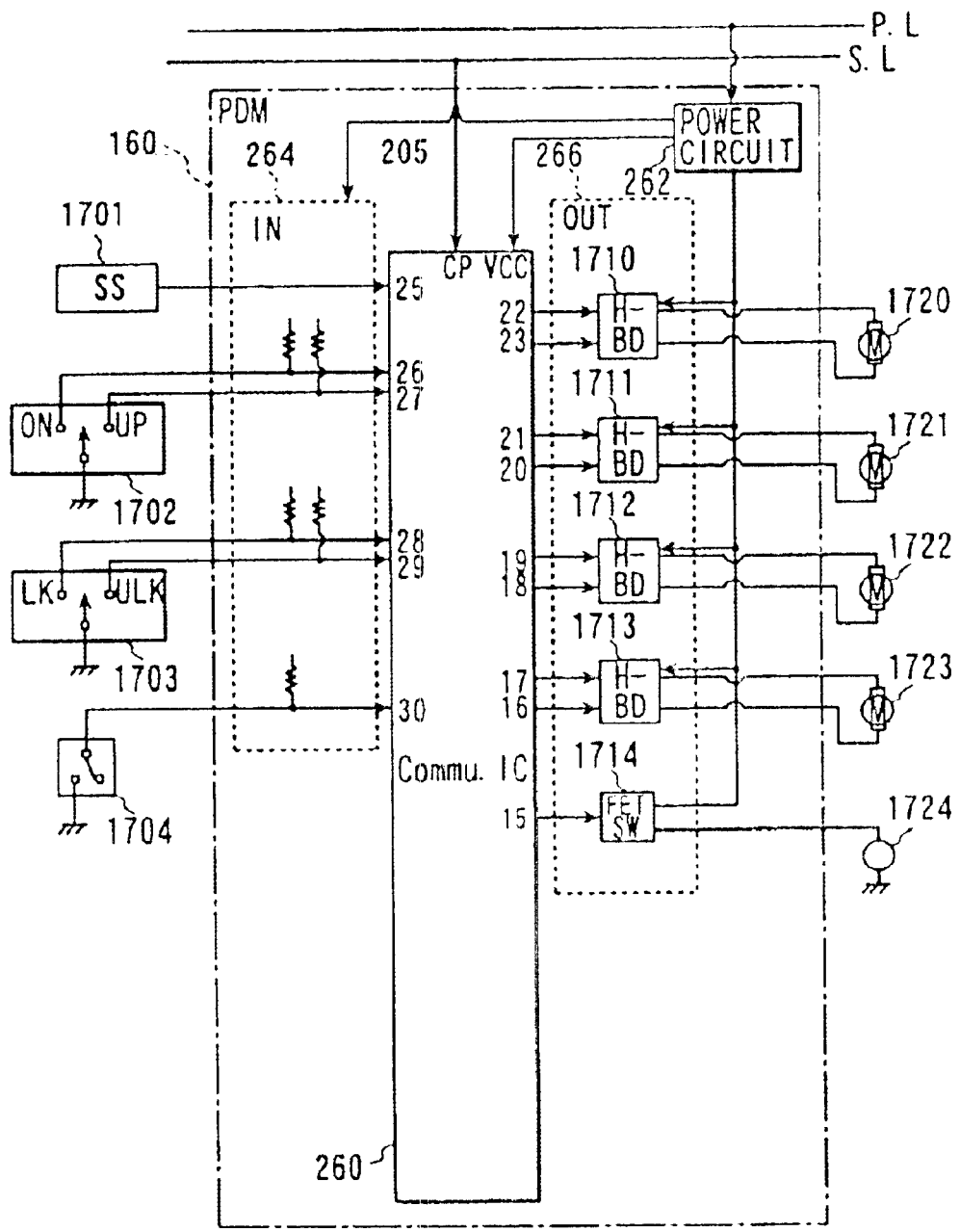
FIG. 17 is a schematic block diagram of PDM in the electric power supply apparatus for the automobile according to one embodiment of the invention.

FIG. 17 is a schematic block diagram of PDM in the power supply system for automobile according to one embodiment of the invention, and FIG. 18 is an I/O bit map diagram at module address "#7" of PDM according to the present embodiment of the invention.

In FIG. 17, PDM 160 is comprised of communication IC 260, power supply circuit 262, input circuit 264 and output circuit 266. Communication IC 260 thereof is connected to signal line SL. Communication IC 260 transmits data that has been entered from the input means to BCM 100 via signal line SL. Further, communication IC 260 outputs data that has been transmitted and entered via signal line SL to the output circuit thereof.

Power supply circuit 262 thereof is connected to power line PL, and converts power supplied from the battery into each predetermined voltage suitable for driving communication IC 260, enabling input circuit 264 to enter input data, and actuating electrical loads connected to output circuit 266.

Input circuit 264 which is an interface for each switch and the like that are input means, enters each status of each switch or the like via each input terminal into communication IC 260. Further, output circuit 266 in response to each output signal from each output terminal of communication IC 260 operates each MOSFET with protection function which is a switching device such that a power from power supply circuit 262 is supplied to each electrical load.

In the next, in reference to FIGS. 17 and 18, a relation between each input signal to be entered to each input terminal of communication IC 260 and each input means corresponding thereto as well as a relation between each output signal to be output from each output terminal and each output circuit and its related electrical load will be described in the following. By the way, as to a control method corresponding to an input signal input from its input means, it will be described later with reference to FIG. 21 and its subsequent drawings wherein function block diagrams of control specification of each control method and its program flowchart are indicated.

As shown in FIG. 18, I/O terminals of PDM specified at address "#7" thereof have 32 bit construction, wherein from bit 0 to bit 14, bit 24 and bit 31 are not used.

As indicated in FIG. 17, bit 25 of communication IC 260 is connected with short-circuit detection sensor (SS) 1701. Short-circuit detection sensor 1701 of PDM 160 is assigned to detect a status of short-circuit of power line PL located between PDM 160 and FIM 120. By the way, a variable name of the input signal of its control program which will be described later is given by "xPdmSsNG".

At bits 26 and 27 of communication IC 260, there are input signals of power window up/down switch (P/W FR FOWN SW; P/W FR UP SW) 1702 in switch 162 shown in FIG. 1 at the opposite side of the driver. When switch 1702 is switched to the side of UP, an input signal to bit 26 becomes "H" level by a voltage supplied from power supply circuit 262 via a resistance in input circuit 264. Further, when switch 1702 is switched to the side of down (DN), an input signal to bit 27 becomes "H" level. By the way, variable names of input signals on their control programs which will be described later are given by "iPwRRDn" and "iPwRRUp", respectively.

At bits 28 and 29 of communication IC 260, there are input signals of door lock/unlock switch 1703 in switch 162 shown in FIG. 1 at the opposite side of the driver. When switch 1703 is switched to the lock side (LK), an input signal to bit 28 becomes "H" level by a voltage from power supply circuit 262 via a resistance in input circuit 264. Further, when switch 1703 is switched to the unlock side (ULK), an input signal to bit 29 becomes "H" level. By the way, variable names of input signals on their control programs which will be described later are given by "iDrASCLK" and "iDrASCULK", respectively.

Bit 23 and bit 22 of communication IC 260 are connected to H-bridge circuit (H-BD) 1710 provided in output circuit 266. H-bridge circuit 1710 is connected to power supply circuit 262 and to an electrical load of door lock motor 1720 in motor 164 shown in FIG. 1 at the opposite side of the driver. Therefore, when an output signal from bit 23 of communication IC 260 becomes "H" level, door lock motor 1720 is caused to rotate in the normal direction so as to lock the doors, and when an output signal from bit 22 of communication IC 260 becomes "H" level, door lock motor 1720 is caused to reverse so as to unlock the doors. By the way, variable names of output signals on their control programs which will be described later are given by "oDrASLK-1" and "oDrASLK-2", respectively.

Bit 21 and bit 20 of communication IC 260 are connected to H-bridge circuit (H-BD) 1711 in output circuit 266. H-bridge circuit 1711 is connected to power supply circuit 262 and to an electrical load of power window motor 1721 in motor 164 shown in FIG. 1 at the opposite side of the driver. Therefore, when an output signal from bit 21 of communication IC 260 becomes "H" level, power window motor 1721 is caused to turn in the normal direction so as to lift the window at the opposite side of the driver, further when an output signal from bit 20 of communication IC 260 becomes "H" level, power window motor 1721 is caused to turn in the reverse direction so as to descend the window at the opposite side of the driver. By the way, variable names of output signals on their control programs which will be described later are given by "oPwAS-1" and "oPwAS-2", respectively.

Bit 19 and bit 18 of communication IC 260 are connected to H-bridge circuit (H-BD) 1712 in output circuit 266.

H-bridge circuit 1712 is connected to power supply circuit 262 and to an electrical load of door mirror right/left rotation motor 1722 in motor 164 shown in FIG. 1 installed in the door at the opposite side of the driver. Therefore, when an output from bit 19 of communication IC 260 becomes "H" level, door mirror right/left rotation motor 1722 is caused to rotate in the normal direction so as to rotate the door mirror in the right-hand direction, and further, when an output signal from bit 18 of communication IC 260 becomes "H" level, door mirror right/left rotation motor 1722 is caused to rotate in the reverse direction so as to rotate the door mirror in the left-side direction. By the way, variable names of output signals on their control programs which will be described later are given by "oRHMirRLH-1" and "oRHMirRLH-2", respectively.

Bit 17 and bit 16 of communication IC 260 are connected to H-bridge circuit (H-BD) 1713 in output circuit 266. H-bridge circuit 1713 is connected to power supply circuit 262 and to an electric load of door mirror up/down rotation motor 1723 in motor 164 shown in FIG. 1 at the opposite side of the driver. Therefore, when an output from bit 17 of communication IC 260 becomes "H" level, door mirror up/down rotation motor 1723 is caused to rotate in the normal direction so as to rotate the door mirror in the upper direction, and further when an output from bit 16 of communication IC 260 becomes "H" level, door mirror up/down rotation motor 1723 is caused to rotate in the reverse direction so as to rotate the door mirror in the downward direction. By the way, variable names of output signals on their control programs which will be described later are given by "oRHMirUD-1" and "oRHMirUD-2", respectively.

Bit 15 of communication IC 260 is connected to a gate terminal of FET switch circuit (FET SW) 1713 in output circuit 266. FET switch circuit 1713 is connected to power supply circuit 262 and to an electrical load of switch illumination lamp 1724 in lamp 166 shown in FIG. 1 at the door opposite to the driver. Therefore, when an output signal of "H" level is output from bit 15 of communication IC 260, FET switch circuit 1713 becomes conductive, thereby causing a voltage from power supply circuit 222 to be applied to switch illumination lamp 1724 so as to illuminate the same. By the way, a variable name of the output signal on its control program which will be described later is given by "oASSwILm".

As has been described heretofore, seven units of control modules described in FIG. 2, including BCM 100, VCM 110, FIM 120, DDM 130, RIM 140, CCM 150 and PDM 160 are connected to power line PL provided in a loop form so as to be supplied with power from battery 10. Further, BCM 100, VCM 110, FIM 120, DDM 130, RIM 140, CCM 150 and PDM 160 are mutually connected each other via signal line SL provided in a loop form. Further, as described with reference to FIGS. 3 to 18, each control module thereof has input means such as switches or the like, and electrical loads which are supplied power from the power supply circuit via its output circuit that is comprised of FET switch circuit.

Still further, VCM 110, FIM 120, DDM 130, RIM 140, CCM 150 and PDM 160 are not provided with a built-in CPU, but is provided with a built-in communication IC instead thereof. Any input signal entered into control modules excepting BCM 100 is controlled by each communication IC built-in each control module and is entered into the CPU within BCM 100 via signal line SL. Upon processing the entered signal as required, the CPU transmits the processed signal to each control module via signal line SL such that each electrical load connected to each control module is controlled accordingly.

Now, with reference to FIGS. 19 to 85, signal processing to be executed by CPU 200 will be described in the following. The processing is programmed in CPU 200 as a program having 31 control tasks.

In the first place, with reference to FIG. 19, control tasks programmed in CPU 200 will be described in the following.

FIG. 19 is a diagram indicating a table of control tasks to be executed in the power supply system for automobile according to one embodiment of the invention.

Each control task is defined by a control name and a control function name on its program, and is further provided with the numbers of input signals and output signals. As to the details of each of control contents, they will be described later with reference to FIG. 20 and its subsequent drawings.

At first, with reference to FIGS. 20 and 21, a front turn signal control at No. 1 in FIG. 19 will be described.

Figure 20:
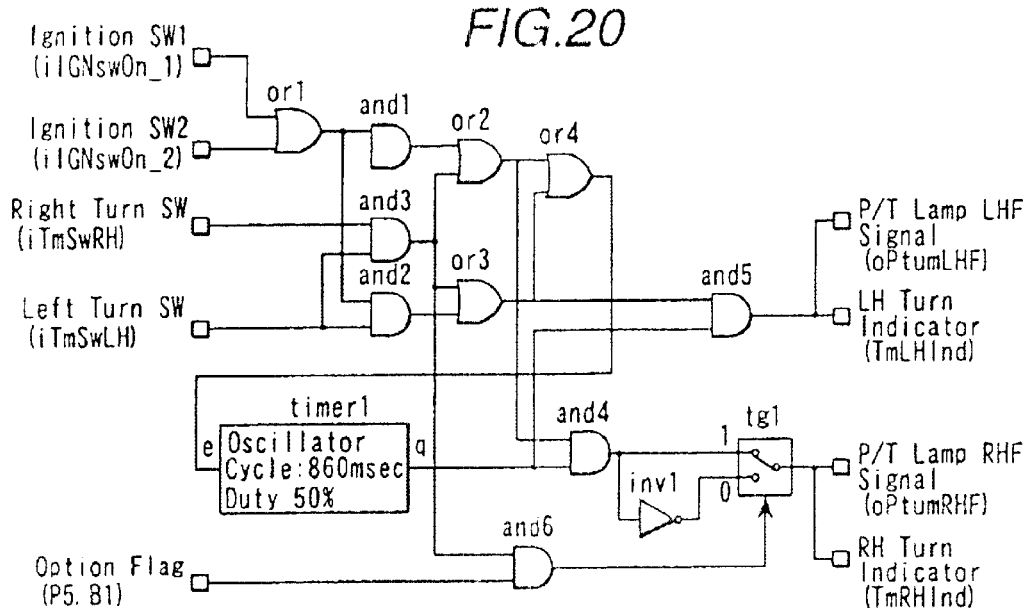
FIG. 20 is a function block diagram indicating a control specification for a front-turn-signal control in the electric power supply system for the automobile according to one embodiment of the invention.

FIG. 20 is a function block diagram indicating a control specification of the front turn signal control in the power supply system for automobile according to one embodiment of the invention. FIG. 21 is a program flowchart of its control task to be executed by CPU in the power supply system for automobile according to one embodiment of the invention. By the way, the control program is described in C language.

Here, in reference to FIG. 20, input/output signals and its control function of the control task concerned will be described in the following. There are five input signals. Ignition SW1 (iLGNswOn-1) is an input signal to bit 1-6 of CPU 200 in BCM shown in FIG. 3. Ignition SW2 (iIGNswOn-2) is an input signal to bit 1-5 of CPU 200 in BCM 100 in FIG. 3. Right turn SW (iTmSwRH) is an input signal to bit 1-1 of CPU 200 in BCM 100 in FIG. 3. Left turn SW (iTmSwLH) is an input signal to bit 1-0 of CPU 200 in BCM 100 shown in FIG. 3. Option flag (P5, B1) is used for optional purpose, for example, in such a case of hazard where, instead of flickering both the right and left turn signals at the same time, it is desired to change the method of its signaling and to turn on and off the right and left signal lamps alternatively.

As for output signals, there are four output signals. A signal of P/TLampLHF (oPturnLHF) is an output signal from bit 20 of communication IC 220 in FIM 120 shown in FIG. 11. LH turn indicator (TmLHInd) is an output signal from bit o-1-5 of CPU 200 in BCM 100 shown in FIG. 3. A signal of P/TLampRHF (oPturnRHF) is an output signal from bit 19 of communication IC 220 in FIM 120 shown in FIG. 11. RH turn indicator (TmRHInd) is an output signal from bit o-1-6 of CPU 200 in BCM 100 in FIG. 3.

Between five inputs and 4 outputs as indicated in FIG. 20, there are logically connected 6 units of AND circuits, and1-and6; 4 units of OR circuits, or1-or4; timer circuit (oscillator), time1; inverse circuit, inv1; and switch circuit, tg1.

In the next, using FIG. 21 and in reference to FIG. 20, their control contents as a whole will be described.

From lines 2100 to 2105 which are comment statements, there are described a function name, a function, presence of argument or not, presence of a return value or not.

On line 2106, it is defined that its function name "front-rh-turn-signal" has no return value.

From lines 2107 to 2110, definition statements are described defining an initial value (=1) of q1 and variables to be used in its control task (flug, before, . . . , and 5).

From line 2111 and in its subsequent lines, there are described execution statements. On the right-hand side of each execution program and between "/*" and "*/", there is described a comment statement thereof.

On line 2111, an option flag is read. On line 2112, an output signal (oPturnLHF; oPturnRHF) indicating a status prior to control is read. This is done for the sake of comparison with an output signal after control to be read and compared on line 2137.

From lines 2113 to 2120, there are defined each logic of 3 AND circuits of and1-and3, 4 OR circuits of or1-or4, and timer circuit (oscillator) time1. Here, and3 detects a state where both of right-turn SW (iTmSwRH) and left-turn SW (iTmSwLH) become "H" level simultaneously, that is, a state of hazard. Or2 indicates a condition for the right-turn signal indication, and or3 indicates a condition for the left-turn signal indication. Timer1 is a variable which sets a period of flickering of the turn signal lamps at 430 ms.

From lines 2121 to 2130, a count value of the timer is updated, its value is checked, after 430 ms, the output of the timer is reversed, and the timer is reset. By the reversal of the timer output, flickering of the lamps at 430 ms cycle is done.

On line 2131, conditions for changing the logic of and6 and switch circuit tg1 are defined. In line 2132, logic of and5 is defined.

From lines 2133 to 2136, output conditions for the 4 output signals are defined. Namely, it is specified such that the output of the right turn signal (oPturnRHF) that causes to flicker the turn signal lamp becomes on-state when and4 is "1", that the left turn signal output (oPturnLHF) becomes on-state when and5 is "1", that the right turn signal lamp's output (TmRHInd" to be output to its indicator becomes on-state when and4 is "1", and that the left turn signal lamp's output (TmLHInd" becomes on-state when and5 is "1".

From lines 2137 to 2139, an output signal after control is read, compared with the output signal prior to the control which was read at line 2112, and if they do not coincide, namely, when the signal has changed, FIM data transfer flag is set on. The FIM data transfer flag is also monitored separately by a flag monitor mechanism of CPU 200 at a predetermined cycle, and when it is detected that the FIM data transfer flag is set on, data is transferred to FIM 120.

From lines 2140 to 2143, if or2 and or3 become "0", namely when the right turn SW (iTmSwRH) and the left turn SW (iTmSw LH) become off-state simultaneously, the control task for the front turn signal control is released, and the processing thereof ends.

As has been described heretofore, in the front turn signal control, it is arranged such that when the ignition SW (iLGNswOn-1 or iIGNswOn-2) is on-state and when the turn SW (iTmSwRH or iTmSwLH) is on-state, the front side P/TlampHF signal (oPturnLHF or oPturnRHF) is cyclically turned on and off so as to flicker front turn signal lamps 123R and 123L as well as the turn indicator (TmLHInd or TmRHInd).

In the next, using FIGS. 22 and 23, the rear turn signal control indicated on No. 2 line in FIG. 19 will be described.

Figure 22:
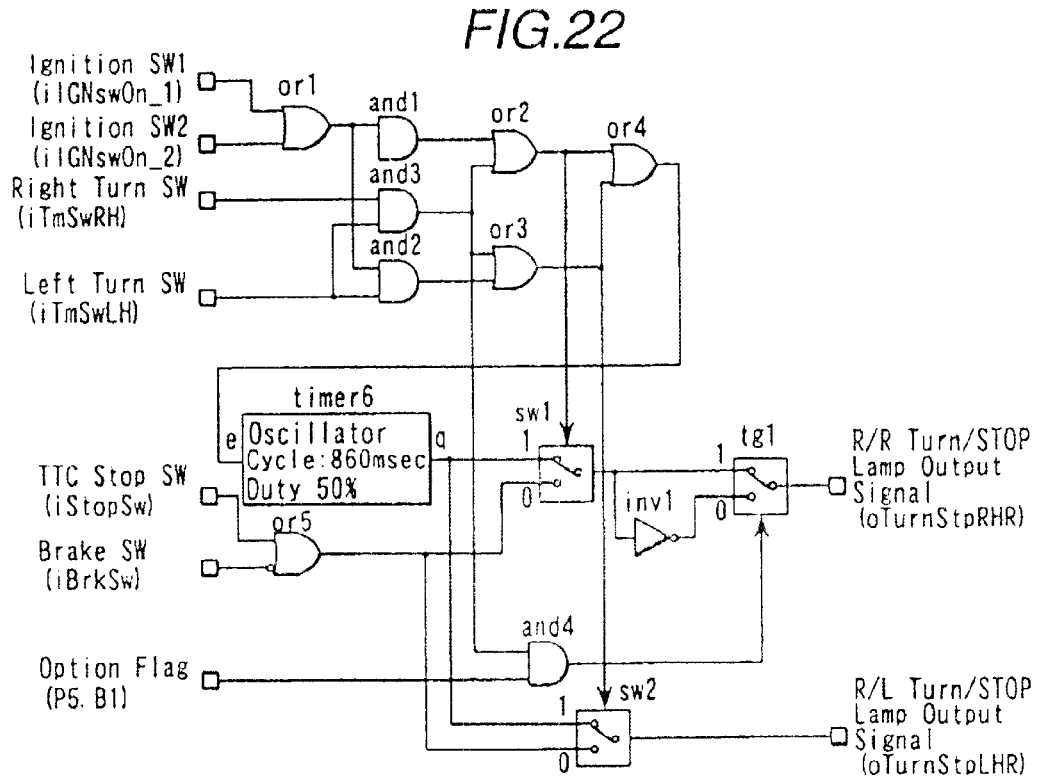
FIG. 22 is a function block diagram indicating a control specification for a rear-turn-signal control in the electric power supply system for the automobile according to one embodiment of the invention.

FIG. 22 is a function block diagram indicating a control specification for the rear turn signal control in the power supply system for automobile according to one embodiment of the invention, and FIG. 23 is a program flowchart of a control task to be executed by CPU of the power supply system for automobile according to one embodiment of the invention. By the way, the control program is described in C-language.

Here, using FIG. 22, input and output signals of the present control task as well as control functions will be described in the following. There are seven input signals. Ignition SW1 (iLGNswOn-1) is a signal to be input to bit 1-6 of CPU 200 in BCM 100 shown in FIG. 3. Ignition SW2 (iLGNswOn-2) is a signal to be input to bit 1-5 of CPU 200 in BCM 100 in FIG. 3. Right turn SW (iTmSwRH) is a signal to be input to bit 1-1 of CPU 200 in BCM 100 shown in FIG. 3. Left turn SW (iTmSwLH) is a signal to be input to bit 1-0 of CPU 200 in BCM 100 shown in FIG. 3. TCC stop SW (iStopSw) is a signal to be input to bit 1-12 of CPU 200 in BCM 100 shown in FIG. 3. Brake SW (iBrkSw) is a signal to be input to bit 1-11 of CPU 200 in BCM 100 shown in FIG. 3. Option flag (P5, B1) which is used optionally is used in a case, for example, where the illumination method of the four turn signals is desired to be changed from flickering the four turn signals simultaneously to alternatively illuminating the right and left side lamps at the time of hazard.

There are two output signals. An output signal of R/R turn/STOP lamp (oTurnStpRHR) is an output signal from bit 14 of communication IC 240 of RIM 140 shown in FIG. 13. An output signal of R/L turn/STOP lamp (oTurnStpLHR) is an output signal from bit 14 of communication IC 240 of RIM 140 shown in FIG. 13.

Between the 7 inputs and the 2 outputs, as shown in FIG. 22, there are logically connected by four units of AND circuits, and1-and4; five units of OR circuits, or1-or5; timer circuit (oscillator) timer 6; inverse circuit inv1; switch circuits sw1, sw2, and tg1.

Based on FIG. 23 and in reference to FIG. 22, the control contents as a whole will be described in the following.

From lines 2300 to 2305, there are described comment statements and wherein a function name, function, whether or not argument is present, and whether or not a return value is given are described.

In line 2306, it is defined that the function name "rear-lh-turn-signal" has no return value.

From lines 2307 to 2311, there are described definition statements for defining an initial value (=0) of q1, and a variable (flug, or1, . . . , after) to be used in this control task.

On lines 2312 and its subsequent lines, execution statements are described, wherein a comment statement is described on the right side of each execution program and between "/*" and "*/".

On line 2312, an output signal (oTurnStpRHF) indicating a status prior to control is read. On line 2313, an option program is read.

From lines 2314 to 2321, each logic for three units of AND circuits of and1-and3 as well as 5 units of OR circuits of or1-or5 is defined. Here, more specifically, and3 detects a state where both the right turn SW (iTmSwRH) and the left turn SW (iTmSwLH) become "H" level, namely, a state of hazard. Or2 indicates a condition for the left turn signal indication. Or5 detects a state of the brake pedal being pressed down. In the present embodiment of the invention, because the rear turn signal lamps are arranged to serve also as the stop lamps, in order for the same to function as the turn signal lamps in precedence to the stop lamps, the state of the brake being pressed down is allowed to be detected according to the invention.

From lines 2322 to 2333, a count value of the timer is updated, its value is checked, after elapse of 430 ms, the timer output is reversed, and the timer is reset. By the reversal of the timer output, flickering of the lamps at a cycle of 430 ms is carried out.

On line 2334, a condition for switching over of switch circuit sw1 is specified. When or2 is "1", q1 is selected, and when "0", or5 is selected. Thereby, the rear turn/stop lamp is allowed to operate as the turn signal lamp in precedence to the stop lamp.

On line 2335, logic of and4 as well as a condition for switching over switch circuit tg1 are specified. From lines 2336 to 2337, the function of the turn signal lamp is given precedence.

On lines 2338 and 2339, output conditions for the two output signals are defined. Namely, the output of the right turn signal (oTurnStpRHR) for flickering the turn signal lamps becomes on-state if right-out is "1". The output of the left turn signal (oTurnStpLHR) becomes on-state if left-out is "1".

From lines 2340 to 2342, an output signal after the control is read, and compared with the output signal prior to the control which was read at line 2312, and when they are not the same, namely, when the signal has changed, the FIM data transfer flag is set on.

In lines 2343 to 2345, if or4 is "0", namely, when both the right turn SW (iTmSwRH) and the left turn SW (iTmSwLH) become off-state, the control task of the rear turn signal control is released and its processing is terminated.

As has been described hereinabove, in the rear turn signal control of the invention, when ignition SW (iIGNswOn-1 or iIGNswOn-2) is on-state and also when turn SW (iTmSwRH or iTmSwLH) is on-state, P/TlampHF signal (oPturnLHF or oPturnRHF) is caused cyclically to turn on and off so as to flicker turn/stop lamps 143R, 143L. Further, in the state where the brake pedal is pressed down (in the on-state of the TCC stop SW or brake SW), flickering of the turn signal lamps is given precedence.

Now, with reference to FIGS. 24 and 25, a back-up lamp control at No. 3 in FIG. 19 will be described in the following.

Figure 24:
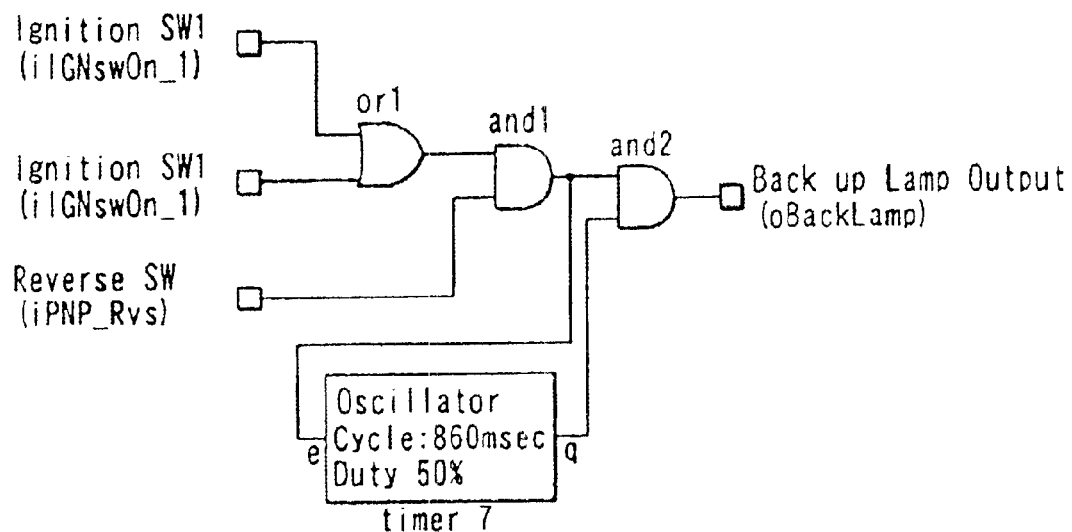
FIG. 24 is a function block diagram indicating a control specification for a backup-lamp control in the electric power supply system for the automobile according to one embodiment of the invention.

FIG. 24 is a function block diagram indicating a control specification for the back-up lamp control in the power supply system for automobile according to one embodiment of the invention, and FIG. 25 is a program flowchart of a control task to be executed by CPU in the power supply system for automobile according to one embodiment of the invention. By the way, the control program thereof is described in C-language.

Here, using FIG. 24, input and output signals as well as control functions for the present control task will be described in the following. There are three input signals. Ignition SW1 (iIGNswOn-1) is an input signal to bit 1-6 of CPU 200 in BCM 100 shown in FIG. 3. Ignition SW2 (iIGNswOn-2" is an input signal to bit 1-5 of CPU 200 in BCM 100 shown in FIG. 3. Reverse SW (iPNP-Rvs) is an input signal to bit 31 of communication IC 220 in FIM 120 of FIG. 9, and detects a state of the shift lever in the automatic transmission when the shift lever is set at the reverse position. A signal of reverse SW (iPNP-Rvs) entered into communication IC 220 of FIM 120 is transferred to CPU 200 in BCM 100 via communication line CL.

An output signal is a back-up lamp output (oBackLamp), and is output from bit 4 of communication IC 240 in RIM 140 shown in FIG. 13.

As shown in FIG. 24, between the three inputs and the one output, there are logically connected two units of AND circuits and1, and2; OR circuits or1; and timer circuit (oscillator) timer 7.

In the following, using FIG. 25 and in reference to FIG. 24, control contents as a whole will be described.

In lines 2500 to 2505, there are described comment statements, and a function name, function, whether or not argument is present, and whether or not a return value is given are described.

In line 2506, it is defined that the function name "back-up-lamp" has no return value.

In lines 2507 to 2510, there are described definition statement defining an initial value (=0) of time-out, and variables (or1, and1, . . . , after) used in this control task.

In line 2511 and thereafter, there are described execution statements, wherein on the right-hand side of each execution program and between "/*" and "*/", there is described a comment statement.

In line 2511, an output signal (oBackLamp) in a state prior to the control is read.

In lines 2512 to 2513, each logic of OR circuit or1 and AND circuit and1 is defined. Here, in a state where the reverse SW (iPNP-Rvs) is on-state and also the ignition SW (iIGNswOn-1 or iIGNswOn-2) is on-state, an output of and1 becomes "H" level.

In lines 2514 to 2516, a count-up condition for the counter is specified, a stop condition for the counter is specified, and operation of a mono-stable multi vibrator is defined. In lines 2517 to 2518, an output condition for the output signals is defined. Namely, when an output of and2 is "1", it becomes on-state.

In lines 2519 to 2521, an output signal yielded after the control is read and compared with the output signal prior to the control which was read in line 2512, and when they do not agree with each other, namely, when the signal has changed, RIM data transfer flag is set on.

In lines 2522 to 2527, if and1 becomes "0", namely, when reverse SW (iPNP-Rvs) becomes off-state, the control task for the back-up lamp control is released thereby terminating the processing thereof.

As has been described hereinabove, in the back-up lamp control, when ignition SW (iIGNswOn-1 or iIGNswOn-2) is on-state and also turn SW (iTmSwRH or iTmSwLH) is on-state, if reverse SW (iPNP-Rvs) becomes on-state, the back-up lamp output (oBackLamp) is turned on so as to illuminate back-up lamp 146.

In the next, using FIGS. 26 and 27, the front rear light control indicated at No. 4 in FIG. 19 will be described.

Figure 26:
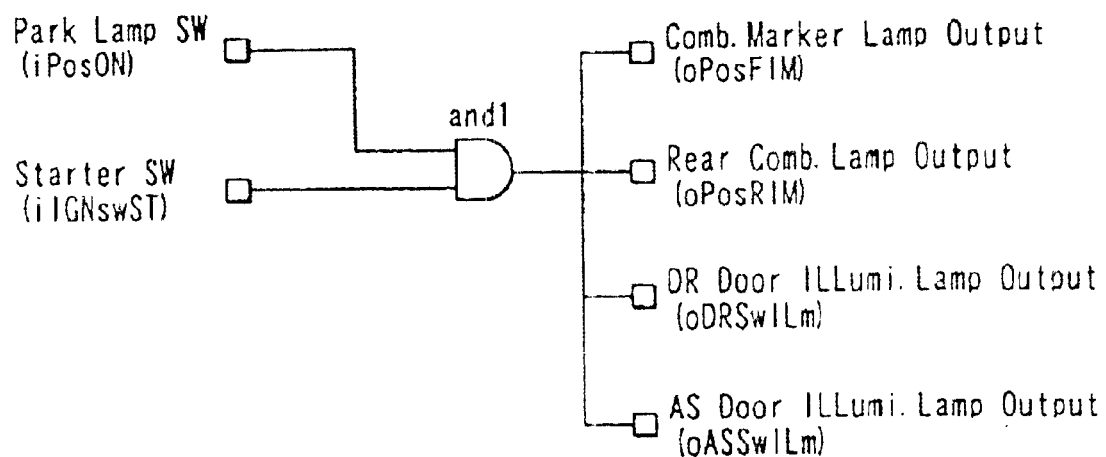
FIG. 26 is a function block diagram indicating a control specification for a front-rear-light control in the electrical power supply system for the automobile according to one embodiment of the invention.

FIG. 26 is a function block diagram indicating a control specification for the front rear light control in the power supply system for automobile according to one embodiment of the invention, and FIG. 27 is a programming flowchart of the control task to be executed by CPU of the power supply system for automobile according to the one embodiment of the invention. Its control program is written in C-language.

Here, using FIG. 26, input and output signals of this control task and control functions will be described. There are two input signals. Park lamp SW (iPosOn) is an input signal to bit 1-3 of CPU 200 in BCM 100 shown in FIG. 3. Starter SW (iIGNswST) is an input signal to bit 1-30 of CPU 200 in BCM 100 shown in FIG. 3.

There are four output signals. Combination marker lamp output (oPosFIM) is an output signal from bit 18 of communication IC 220 in FIM 120 indicated in FIG. 9. Rear combination lamp output (oPosRIM) is an output signal from bit 12 of communication IC 240 in RIM 140 shown in FIG. 13. DR door illumination lamp output (oDRSwILm) is an output signal from bit 11 of communication IC 230 in DDM 130 indicated in FIG. 11. AS door illumination lamp output (oASSwILm) is an output signal from bit 15 of communication IC 260 in PDM 160 shown in FIG. 17.

As shown in FIG. 26, AND circuit (and1) logically connects between the two inputs and four outputs.

Now, using FIG. 27 and in reference to FIG. 26, control contents thereof will be described as a whole in the following.

From lines 2700 to 2705, comment statements are given, wherein a function name, function, if there is argument or not, and if there is a return value or not are described.

In line 2706, it is defined that the function name "front-rear-light" does not have a return value.

From lines 2707 to 2709, definition statements are given defining variables (before, after, . . . , and1) to be used in this control task.

In line 2710 and thereafter, execution statements are described, wherein on the right-hand side of each execution program and between "/*" and "*/", there is described comment statement.

In line 1710, an output signal (oPosFIM) yielded in a state prior to its control is read.

Inline 2711, logic of AND circuit (and1) is defined. Here, it is noted that when park lamp SW (iPoson) is on-state and also starter SW (iIGNswST) is on-state, an output of and1 becomes "H" level.

From lines 2712 to 2723, output conditions for output signals are defined. Namely, only when an output of and1 is "1" combination marker lamp output (oPosFIM), rear combination lamp output (oPosRIM), DR door illumination lamp output (oDRSwILm) and AS door illumination lamp output (oASSwILm) become on-state, and in other cases, they become off-state.

From lines 2724 to 2729, an output signal after subjecting to the control is read, and is compared with the output signal prior to subjecting to the control. When they do not coincide with each other, namely, when the signal has changed, FIM, DDM, PDM and RIM data transfer flags are set on.

In lines 2730 to 2731, the control task for the front rear light control is released to end the processing thereof.

As described heretofore, in the front rear light control of the invention, if park lamp SW (iPoson) is on-state and also starter SW (iIGNswST) is on-state, combination marker lamp output (oPosFIM), rear combination lamp output (oPosRIM), DR door illumination lamp output (oDRSwILm) and AS door illumination lamp output (oASSwILm) are set on so as to illuminate side lamps 123R and 123L, tail lights 144R and 144L, door switch illumination lamp 1120 at the side of the driver, and door switch illumination lamp 1724 at the opposite side of the driver.

Now, using FIGS. 28 and 29, the head lamp control depicted at No. 5 in FIG. 19 will be described.

Figure 28:
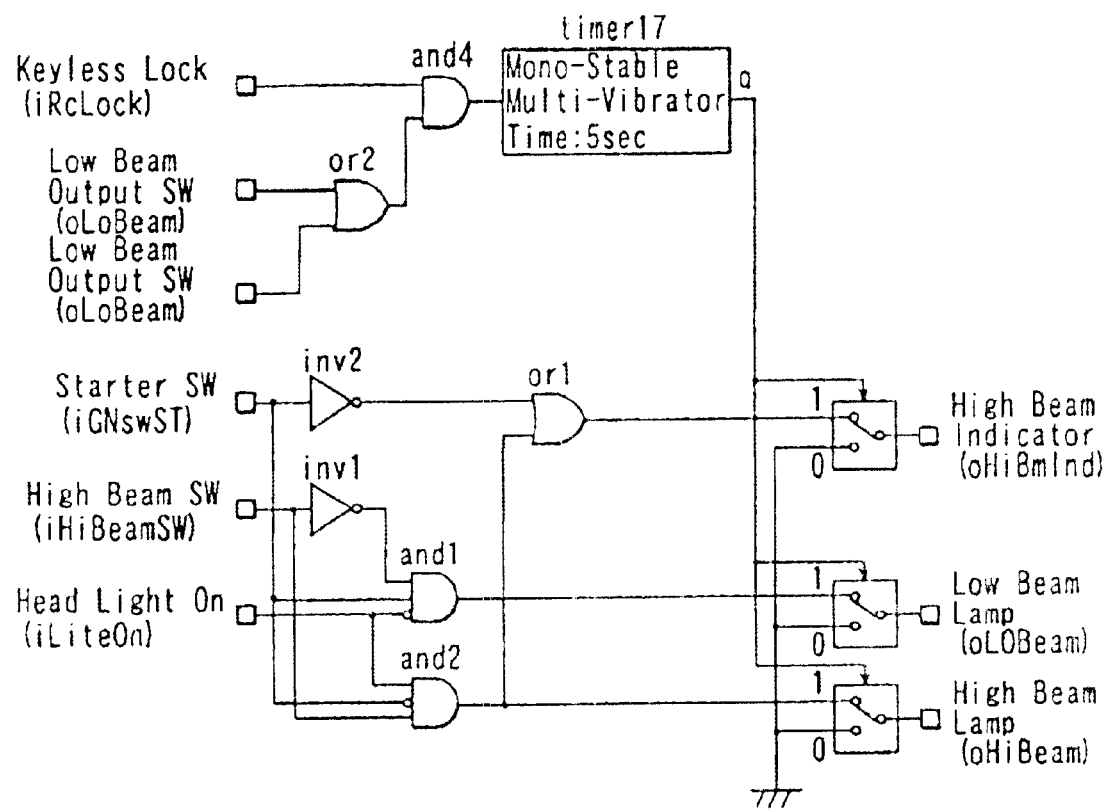
FIG. 28 is a function block diagram indicating a control specification for a head lamp control in the electric power supply system for the automobile according to one embodiment of the invention.

FIG. 28 is a function block diagram indicating a control specification for head lamp control in the power supply system for automobile according to one embodiment of the invention, and FIG. 29 is a programming flowchart for the control task to be executed by CPU in the power supply system for automobile according to the one embodiment of the invention. By the way, the control program is described in C-language.

Here, using FIG. 28, input and output signals of this control task, and control functions will be described in the following. There are six input signals. Keyless lock SW (iRcLock) is an input signal to bit 2-26 of CPU 200 in BCM 100 shown in FIG. 3. Low beam output (oLoBeam) is an input signal to bit 17 of communication IC 220 in FIM 120 shown in FIG. 9. High beam output (oHiBeam) is an input signal to bit 9 of communication IC 220 in FIM 120 shown in FIG. 9. Starter Sw (iIGNswST) is an input signal to bit 1-30 of CPU 200 in BCM 100 in FIG. 3. High beam SW (iHiBeamSw) is an input signal to bit 1-29 of CPU 200 in BCM 100 in FIG. 3. Head light-on (iLiteOn) is an input signal to bit 1-9 of CPU 200 in BCM 100 shown in FIG. 3.

There are three output signals. High beam indicator (oHiBmInd) is an output signal from bit o-1-4 of CPU 200 in BCM 100 in FIG. 9. Low beam lamp (oLOBeam) is an output signal from bit 17 of communication IC 220 in FIM 120 in FIG. 9. High beam lamp (oHiBeam) is an output signal from bit 9 of communication IC 220 in FIM 120 in FIG. 9. Note here that the low beam lamp (oLOBeam) and the high beam lamp (oHiBeam) also serve as input signals in this control.

Between the six inputs and the three outputs, as shown in FIG. 28, there are logically connected with three AND circuits of and1, and2, and4; two OR circuits of or1, or2; a mono-stable multi-vibrator timer 17; two inverter circuits of inv1, inv2; three switch circuits of sw1, . . . , sw3.

Now, using FIG. 29 and in reference to FIG. 28, control contents thereof will be described as a whole.

From lines 2900 to 2905, there are given comment statements, wherein a function name, function, if there is argument or not, and if there is a return value or not are described.

In line 2906, it is defined that the function name "head-lamp" does not have a return value.

From lines 2907 to 2910, definition statements are described defining initial values of and4- and q (=0), and variables (before, after, . . . , flug) to be used in this control task.

In lines 2911 and to follow, execution statements are described, wherein comment statements are given on the right-hand side of each execution program and between "/*" and "*/".

In line 2911, an output signal at a state prior to control (oLOBeam; oHiBeam) is read.

From lines 2912 to 2918, each logic of three AND circuits (and1, and2, and4), two OR circuits (or1, or2) and two inverter circuits (inv1, inv2) is defined. An output of and1 indicates illumination condition of the low beam lamp, and an output of and2 indicates illumination condition of the high beam lamp. The low beam lamp becomes on when starter SW (iIGNswST) is on and head light (iLiteOn) is on, and when high beam SW (iHiBeamSw) is off. The high beam lamp becomes on when starter SW (iLGNswST) is on, head light-on (iLiteOn) is on, and also high beam SW (iHiBeamSw) is on.

From lines 2919 to 2921, output conditions for the two output signals are defined. Namely, when and1, and2, or1 become "1", the low beam lamp (oLOBeam), high beam lamp (oHiBeam) and high beam indicator (oHiBmInd) become on-state, respectively.

In lines 2921 to 2929, the counter is operated for 5 seconds, then reset. The counter is operated as a mono-stable multi-vibrator.

From lines 2930 to 2932, switch-over conditions for switch circuits sw1–sw3 are indicated, wherein after operation of the counter for 5 seconds, low-beam lamp (oLOBeam), high-beam lamp (oHiBeam) and high-beam indicator (oHiBmInd) become off-state. Namely, in a condition that the head lamp is turned on such as the low beam output (oLOBeam) or high beam output (oHiBeam) is on, that keyless lock SW (iRcLock) becomes on, and that the lock is set up by the remote control, the mono stable vibrator timer 17 causes after 5 second of the lock to turn off the head lamp in order to prevent the head lamp from being forgotten as turned on.

In line 2933, "and4" is set in "and4__". Further, in lines from 2934 to 2936, an output signal after the control is read on, compared with the output signal before the control, and if they do not agree with each other, that is, if the signal has changed, FIM data transfer flag is set on.

In lines 2937 to 2939, if q is "0", the control task of the head lamp control is released and the processing thereof is terminated.

As has been described heretofore, in the head lamp control, when starter SW (iIGNswST) is on, head light-on (iLiteon) is on, and high beam SW (iHiBeamSw) is off, the low beam lamp (oLOBeam) is turned on to illuminate low beam lamps 122R-L, 122L-L. Further, when starter SW (iIGNswST) is on, head light-on (iLiteOn) is on, and high beam SW (iHiBeamSw) is on, the high beam lamp (oHiBeam) is turned on to illuminate high beam lamps 122R-H, 122L-H, and also high beam indicator (oHiBmInd) is turned on to illuminate high beam indicator 363.

Still further, if keyless lock SW (iRcLock) is set on in a condition that low beam output (oLOBeam) or high beam output (oHiBeam) is on, the head lamp is turned off after elapse of 5 seconds.

Now, with reference to FIGS. 30 and 31, intermittent control of the rear wiper indicated at No. 6 in FIG. 19 will be described.

Figure 30:
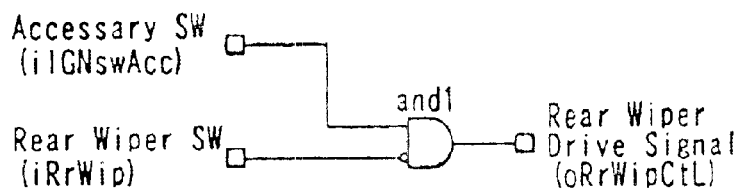
FIG. 30 is a function block diagram indicating a control specification for a rear wiper intermittent control in the electric power supply system for the automobile according to one embodiment of the invention.

FIG. 30 is a function block diagram indicating a control specification for intermittent control of the rear wiper in the power supply system for automobile according to one embodiment of the invention, and FIG. 31 is a program flowchart of a control task to be executed by CPU in the power supply system for automobile according to the one embodiment of the invention. By the way, its control program is written in C language.

Here, using FIG. 30, input/output signals in this control task and control functions will be described. There are two input signals. Accessory SW (iIGNswAcc) is an input signal to bit 1-4 in CPU 200 in BCM 100 shown in FIG. 3. Rear wiper SW (iRrWip) is an input signal to bit 1-17 in CPU 200 in BCM 100 in FIG. 3.

An output signal is a rear wiper drive signal (oRrWipCtL), which is a signal output from bit 18 of communication IC 240 in RIM 140 shown in FIG. 13.

Between the two inputs and one output, there are logically connected by AND circuit "and1" as indicated in FIG. 30.

In the next, using FIG. 31 and in reference to FIG. 30, control contents as a whole will be described in the following.

From lines 3100 to 3105, comment statements are described, wherein a function name, function, whether an argument is present or not, whether a return value is given or not are indicated.

In line 3106, it is defined that the function name "rear-wiper" does not have a return value.

In lines 3107 to 3109, definition statements are given defining variables (before, after, . . . , and1) used in this control task.

In line 3110 and thereafter, execution statements are described, and wherein on the right-hand side of each execution statement and between "/*" and "*/", a comment statement is described.

In line 3110, an output signal indicating a state before the control (oRrWipCtL)is read.

In line 3111, logic of AND circuit "and1" is defined. Here, in a condition that accessory SW (iIGNswAcc) is on-state and rear wiper SW (iRrWip) is off-state, an output of "and1" becomes "H" level.

In lines 3112 to 3117, output conditions for output signals are defined. That is, if an output of "and1" is "1", rear wiper drive signal (oRrWipCtL) becomes on, and in other cases the same becomes off.

In lines 3118 to 3120, an output signal after the control is read, compared with the output signal before the control, and if they do not agree with each other, namely, when the output signal has changed, FIM data transfer flag is set on.

In lines 3121 to 3122, the control task of the rear wiper intermittent control is released, thereby ending the processing thereof.

As described above, in the rear wiper intermittent control, in the state that the accessory SW (iIGNswAcc) is on-state and rear wiper SW (iRrWip) is off-state, if rear wiper drive signal (oRrWipCtL) becomes on-state, rear wiper motor 1331 is caused via rear wiper controller 1330 to operate intermittently.

In the next, using FIGS. 32 and 33, the rear wiper washer control indicated at No. 7 in FIG. 19 will be described in the following.

Figure 32:
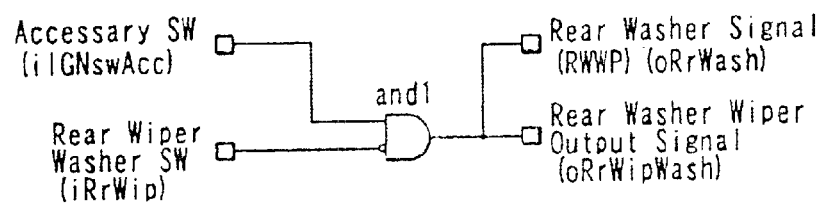
FIG. 32 is a function block diagram indicating a control specification for a rear wiper washer control in the electric power supply system for the automobile according to one embodiment of the invention.

FIG. 32 is a function block diagram indicating a control specification of the rear wiper washer control in the power supply system for automobile according to one embodiment of the invention, and FIG. 33 is a programming flowchart of a control task to be executed by CPU in the power supply system for automobile according to the one embodiment of the invention. By the way, its control program is written in C language.

Here, using FIG. 32, input/output signals in this control task and control functions will be described in the following. There are two input signals. Accessory SW (iIGNswAcc) is an input signal to bit 1-4 in CPU 200 in BCM 100 shown in FIG. 3. Rear wiper washer SW (iRrWipWash) is an input signal to bit 1-16 in CPU 200 in BCM 100 in FIG. 3.

There are two output signals. Rear washer signal (rRrWash) is a signal output from bit 16 in communication IC 220 in FIM 120 shown in FIG. 9. Rear wiper wash output signal (oRrWipWash) is a signal output from bit 17 in communication IC 240 in RIM 140 shown in FIG. 13.

Between the two input and one output, there are logically connected by AND circuit "and1" as indicated in FIG. 32.

In the next, using FIG. 33 and in reference to FIG. 32, control contents as a whole will be described in the following.

In lines 3300 to 3305, there are described comment statements, wherein a function name, function, if there is an argument or not, and if there is a return value or not are described.

In lines 3307 to 3309, definition statements are given defining variables (before, after, and1) used in this control task.

From line 3310 and thereafter, execution statements are described, wherein on the right-hand side of each execution statement and between "/*" and "*/", a comment statement is given.

In line 3310, an output signal indicating a state before the control (oRrWipWash) is read.

In line 3311, logic of AND circuit "and1" is defined. Here, in a state where accessory SW (iIGNswAcc) is on-state and rear wiper washer SW (iRrWipWash) is off-state, an output of "and1" becomes "H" level.

In lines 3312 to 3319, output conditions for output signals are defined. Namely, when the output of "and1" is "1", rear washer signal (oRrWash) and rear wiper wash output signal (oRrWipWash) become on, and in other cases they become off.

In lines 3320 to 3324, an output signal after the control is read, compared with the output signal before the control, and if they do not agree with each other, that is, if the signal has changed, RIM and FIM data transfer flags are set up.

In line 3325, the control task of the rear wiper washer control is released to end the processing thereof.

As described above, in the rear wiper washer control, in the state where accessory SW (iIGNswAcc) is on and rear wiper washer SW (iRrWipWash) is off-state, the rear washer signal (oRrWash) and rear wiper wash output signal (oRrWipWash) become on to operate the rear wiper washer.

In the next, using FIGS. 34 and 35, the rear defogger control indicated at No. 8 in FIG. 19 will be described in the following.

Figure 34:
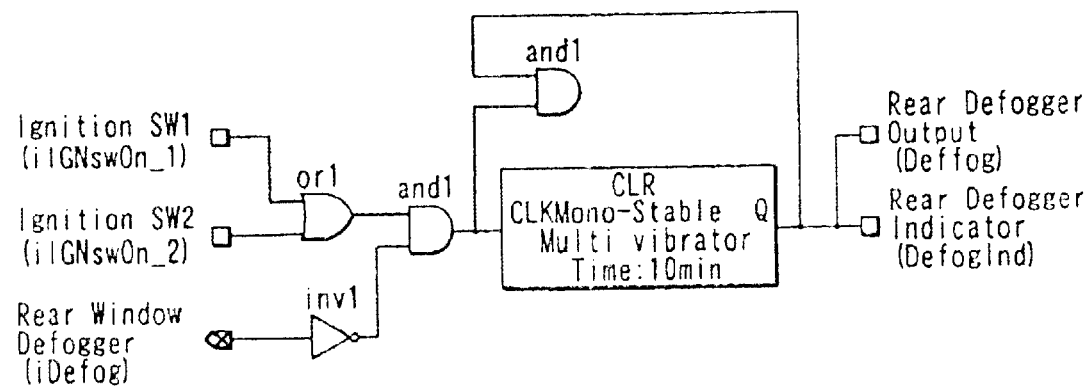
FIG. 34 is a function block diagram indicating a control specification for a rear defogger control in the electric power supply system for the automobile according to one embodiment of the invention.

FIG. 34 is a function block diagram indicating a control specification of the rear defogger control in the power supply system for automobile according to one embodiment of the invention, and FIG. 35 is a programming flowchart of a control task to be executed in CPU in the power supply system for automobile according to the one embodiment of the invention. By the way, its control program is written in C language.

Here, using FIG. 34, input/output signals in this control task and control functions will be described. There are three input signals. Ignition SW1 (iIGNswOn-1) is a signal to be input to bit 1-6 in CPU 200 in BCM 100 shown in FIG. 3. Ignition SW2 (iIGNswOn-2) is a signal to be input to bit 1-5 in CPU 200 in BCM 100 shown in FIG. 3. Rear defogger SW (iDefog) is a signal to be input to bit 1-18 in CPU 200 in BCM 100 in FIG. 3.

There are two output signals. Rear defogger output (oDeffog) is a signal output from bit 5 of communication IC 240 in RIM 140 shown in FIG. 13. Rear defogger indicator (oDefogInd) is a signal output from bit o-1-7 of CPU 200 in BCM 100 in FIG. 3.

Between the three inputs and the two outputs, there are logically interconnected by two AND circuits (and1 and and2), an OR circuit (or1), an inverting circuit (inv1), and a mono stable multi vibrator (Dtimer).

In the next, using FIG. 35 and in reference to FIG. 34, control contents as a whole will be described in the following.

In lines 3500 to 3505, comment statements are given, wherein a function name, functions, if there is an argument or not, and if there is a return value or not are indicated.

In line 3506, it is defined that the function name "rear-defog" has no return value.

In lines 3507 to 3510, definition statements are described defining an initial value of q to be 0, and variables (inv1. Or1, . . . , after) to be used in the control task.

In lines 3511 and thereafter, execution statements are described, wherein on the right-hand side of each execution statement and between "/*" and "*/", each comment statement is given.

In line 3511, an output signal representing the state prior to the control (oDeffog) is read.

In lines 3512 to 3514, each logic of inverting circuit (inv1), OR circuit (or1) and AND circuit (and1) is defined. Here, in a state that the rear defogger SW (iDefog) is off, and ignition SW (iIGNswOn-1 or iIGNswOn-2) is on-state, an output signal of and1 becomes "H" level.

In lines 3515 to 3521, a count-up condition and a stop condition for the counter are defined so as to specify the operation of the mono stable multi vibrator. The mono stable multi vibrator is allowed to operate for ten minutes normally. Further, in lines 3522 to 3525, operation of the AND circuit and2 is specified to execute a forced reset operation. Namely, if an on-signal is input in repetition from rear defogger SW (iDefog) in a very short period of time, i.e., while the Dtimer counts 5 pulses of count, the Dtimer is forcibly reset.

In lines 3522 to 3529, it is defined that in case the or1 becomes off, that is, ignition SW (iIGNswOn-1 and iIGNswOn-2) become off, Dtimer and q are reset to "0" so as to interrupt current conduction in the defogger.

In lines 3531 and 3532, an output condition for output signals is defined. Namely, when the output of q is "1", rear defogger output (oDeffog) and rear defogger indicator (oDefogInd) become on.

In lines 3533 to 3535, an output signal after the control is read, compared with the output signal before the control, and if they do not agree with each other, that is, if the signal has changed, RIM data transfer flag is set on.

In lines 3536 to 3539, if q becomes "0", the control task of the rear defogger control is released thereby ending the processing thereof.

As described above, in the rear defogger control, in the state that the ignition SW (iIGNswOn-1 or iIGNswOn-2) is on, and the rear defogger SW (iDefog) is on-state, the rear defogger output (oDeffog) and rear defogger indicator (oDefogInd) are made on-state so as to flow a current in heater 148 for the rear defogger, and to illuminate defogger indicator (Defogger Indicator) 360.

In the next, using FIGS. 36 to 38, the rear defogger control indicated at No. 9 in FIG. 19 will be described in the following.

Figure 36:
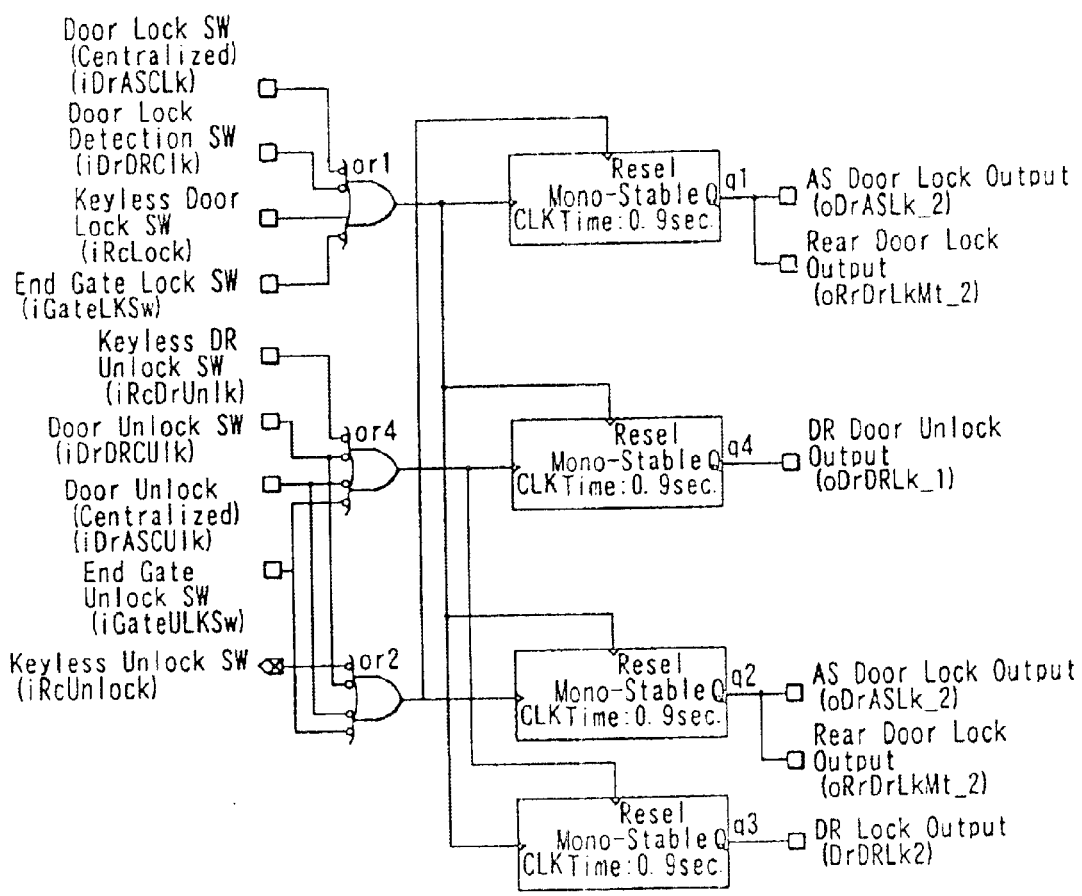
FIG. 36 is a function block diagram indicating a control specification for the rear defogger control in the electric power supply system for the automobile according to one embodiment of the invention.

FIG. 36 is a functional block diagram indicating a control specification of the rear defogger control in the power supply system for automobile according to one embodiment of the invention, and FIGS. 37 and 38 are programming flowcharts of the control task to be executed in CPU in the power supply system for automobile according to the one embodiment of the invention. By the way, its control program is written in C language.

Here, using FIG. 36, input/output signals in this control task and control functions will be described in the following. There are nine input signals. Door lock SW (iDrASClk) is a signal to be input to bit 28 in communication IC 260 in PDM 160 shown in FIG. 17. Door lock detection SW (iDrDRClk) is a signal to be input to bit 28 in communication IC 239 in DDM 130 shown in FIG. 11. Keyless door lock SW (iRcLock) is a signal to be input to bit 2-26 in CPU 200 in BCM 100 shown in FIG. 3. End gate lock SW (iGateLKSw) is a signal to be input to bit 29 in communication IC 240 in RIM 140 shown in FIG. 13. Keyless DR unlock SW (iRcDrUnlk) is a signal to be input to bit 2-27 in CPU 200 in BCM 100 in FIG. 3. Door unlock detection SW (iRrDRUlk) is a signal to be input to bit 29 in communication IC 230 in DDM 130 in FIG. 11. Door unlock SW (iDrASUlk) is a signal to be input to bit 29 in communication IC 260 in PDM 160 in FIG. 17. End gate unlock SW (iGateULKSw) is a signal to be input to bit 28 in communication IC 240 in RIM 140 in FIG. 13. Keyless unlock SW (iRcUnlock) is a signal to be input to bit 2-25 of CPU 200 in BCM 100 in FIG. 3.

There are six output signals. AS door lock output (oDrASLk-2) is a signal output from bit 22 of communication IC 260 in PDM 160 shown in FIG. 17. Rear door lock output (oRrDrLkMt-2) is a signal output from bit 6 of communication IC 240 in RIM 140 shown in FIG. 13. Door unlock output (oDrDRLk-1) is a signal output from bit 7 of communication IC 230 in DDM 130 shown in FIG. 11. AS door unlock output (oDrASLk-1) is a signal output from bit 23 of communication IC 260 in PDM 160 shown in FIG. 17. Rear door unlock output (oRrDrLkMt-1) is a signal output from bit 7 of communication IC 240 in RIM 140 shown in FIG. 13. Door lock output (oDrDRLk-2) is a signal output from bit 6 of communication IC 230 in DDM shown in FIG. 11.

Between these 9 inputs and 6 outputs, there are logically interconnected as indicated in FIG. 36 by three OR circuits (or1, or2, or4), and four mono stable multi vibrators (timer 8-timer 11).

In the next, using FIGS. 37 and 38, and in reference to FIG. 36, control contents thereof will be described as a whole in the following.

From lines 3700 to 3705, there are described comment statements, wherein a function name, functions, if there is an argument or not, and if there is a return value or not are described.

In line 3706, it is defined that the function name "as-dorrlock" has not return value.

In lines 3707 to 3711, definition statements are described defining initial values (=0) of or1__–or4 and q1–q4, as well as variables (or1, or2, . . . , q4) to be used in this control task.

In lines 3712 and thereafter, execution statements are described wherein on the right-hand side of each execution statement and between "/*" and "*/", a comment statement is given.

In line 3712, four output signals indicating status prior to the control are read.

In lines 3713 to 3715, logics of OR circuits or1, or2 and or4 are defined.

In lines 3716 to 3725, an output condition for AS lock output is defined. When or1 becomes "1", output q1 of the mono stable multi vibrator is set at "1", and the timer (timer8) starts its counting, then after 900 ms or upon input of or2, the same is reset.

In lines 3726 to 3735, an output condition for AS unlock output are defined. When or2 becomes "1", the output q1 of the mono stable vibrator is set at "1", and the timer (timer8) starts its counting, then after elapse of 900 ms or upon input of or1, the same is reset.

In lines 3736 to 3745, an output condition for DR lock is defined. When or1 becomes "1", output q1 of the mono stable multi vibrator is set at "1", and the timer (timer 8) starts its counting, then after elapse of 900 ms or upon input of or4, the same is reset.

In lines 3746 to 3755, an output condition for DR unlock output is defined. When or4 becomes "1", output q1 of the mono stable multi vibrator is set at "1", and the timer (timer 8) starts counting, then after 900 ms or upon input of or1, the same is reset.

In lines 3755 to 3762, output conditions for output signals are defined. Namely, when an output of q1 is "1", AS door lock output (oDrASLk-2) and rear door lock output (oRrDrLkMt-2) become on-state. When an output of q2 is "1", AS door lock output (oDrASLk-1) and rear door unlock output (oRrDrLkMt-1) become on-state. Further, when an output of q3 is "1", door lock output (oDrDRLk-2) becomes on-state. When output of q4 is "1", door unlock output (oDrDRLk-1) becomes on-state.

In lines 3763 to 3768, an output signal after the control is read, compared with the output signal before the control, and if they do not agree with each other, namely, when the signal has changed, PDM, RIM, DDM data transfer flags are set on.

In lines 3769 to 3772, when q1, q2, q3 and q4 become "0", the control task of the AS door lock control is opened thereby ending the processing thereof.

As described above, in the AS door lock control, in response to a signal from the lock SW (iDrASClk, iDrDRClk, iRcLock, GateLKSw), the door lock motor is driven to lock the doors, then, in response to a signal from unlock SW (iRcDrUnlk, iDrDRUlk, iDrASUlk, iGateULKSw, iRcUnlock), the door lock motor is driven to unlock the doors.

Now, with reference to FIGS. 39 to 41, the seat belt alarm control indicated at No. 10 in FIG. 19 will be described in the following.

Figure 39A:
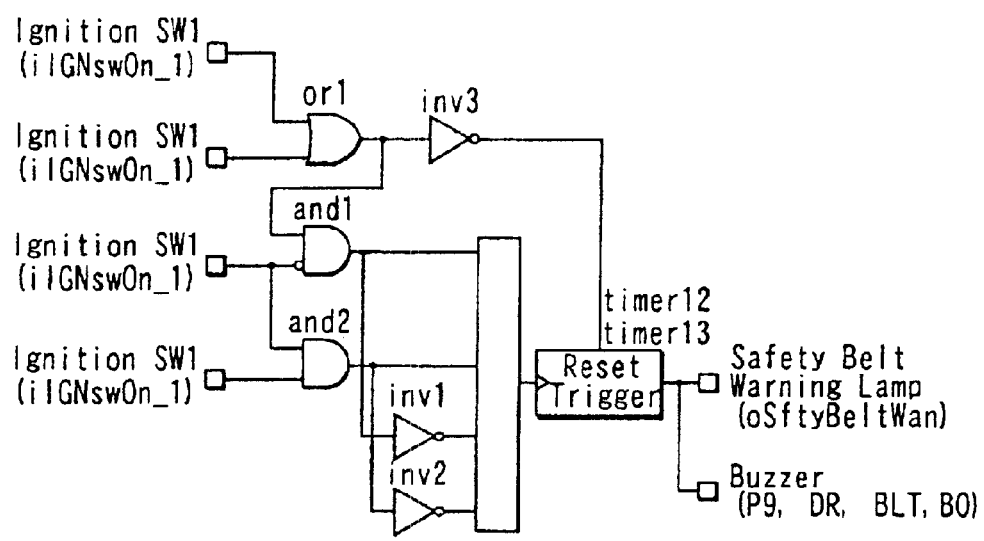
FIGS. 39(A)–(C) are function block diagrams indicating control specifications for sheet belt alarm control in the electric power supply system for the automobile according to one embodiment of the invention.
Figure 39B:
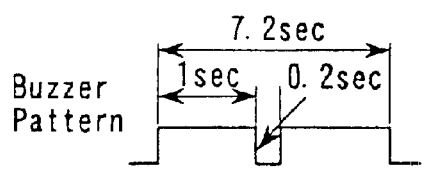
Figure 39C:
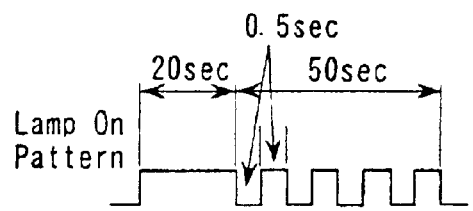

FIGS. 39 (A)–(C) are functional block diagrams indicating a control specification of the seat belt alarm control in the power supply system for automobile according to one embodiment of the invention, and FIGS. 40 and 41 are programming flowcharts of the control task to be executed in CPU in the power supply system for automobile according to the one embodiment of the invention. By the way, its control program is written in C language.

Here, using FIG. 39, input/output signals in this control task and control functions will be described in the following. As for input signals, there are four. Ignition SW1 (iIGNswOn-1) is a signal to be input to bit 1-6 in CPU 200 in BCM 100 shown in FIG. 3. Ignition SW2 (iIGNswOn-2) is a signal to be input to bit 1-5 in CPU 200 in BCM 100 in FIG. 3. Seat belt SW (iSftyBelt) is a signal to be input to bit 1-15 in CPU 200 in BCM 100 in FIG. 3. Starter SW (iIGNswST) is a signal to be input to bit 1-30 in CPU 200 in BCM 100 in FIG. 3.

As for output signals, there are two. Seat belt warning lamp (oSfthBeltWan) is a signal output from bit o-1-3 in CPU 200 in BCM 100 indicated in FIG. 3. A buzzer is directly controlled by CPU 200 in BCM 100 shown in FIG. 3.

Between the four inputs and the two outputs, there are logically interconnected as indicated in FIG. 39 by OR circuit (or14), two AND circuits (and1, and2), two inverting circuits (inv1, inv2), a logic OR, and oscillation circuits (timer 12, timer 13).

Now, using FIGS. 40 and 41 and in reference to FIG. 39, control contents as a whole will be described in the following.

From lines 4000 to 4005, comment statements are described, wherein a function name, functions, if there is an argument or not, and if there is a return value or not are described.

In line 4000, it is defined that the function name "saftybelt-alarm" does not have a return value.

In lines 4007 to 4011, definition statements are given defining initial values (=0) of q and the like, as well as variables (and1, . . . , or1) to be used in this control task.

From lines 4012 and thereafter, execution statements are described, wherein on the right-hand side of each execution statement and between "/*" and "*/", a comment statement is given.

From lines 4012 to 4017, each logic of OR circuit (or1), AND circuits (and1, and2), and inverting circuits (inv1, inv2) is defined.

From line 4018 to 4022, trigger conditions for logic OR are defined. From lines 4023 to 4927, a buzzer task for operating the buzzer is defined as indicated in FIG. 39 (B). Further, from lines 4028 to 4045, a lamp illumination pattern for illuminating the lamp is defined as indicated in FIG. 39 (C).

From lines 4046 to 4952, output conditions for the indicator are defined. From lines 4053 to 4057, the buzzer is turned off, and the control task is released thereby terminating the processing thereof.

As described above, in the seat belt warning control, while ignition SW (iIGNswOn-1 or iIGNswOn-2) is on and starter SW (iIGNswST) is also on, if seat belt SW becomes off, the seat belt warning lamp (oSfthBeltWan) is turned on and off so as to illuminate or flicker seat belt warning lamp (Safty belt warning )364 at a predetermined timing, and the buzzer is operated.

In the next, using FIGS. 42 and 43, the key-left alarm control indicated at No. 11 in FIG. 19 will be described in the following.

FIG. 42 is a functional block diagram indicating a control specification of the key-left alarm control in the power supply system for automobile according to one embodiment of the invention, and FIG. 43 is a programming flowchart of a control task to be executed in CPU in the power supply system for automobile according to the one embodiment of the invention. By the way, its control program is described in C language.

Now, using FIG. 42, input/output signals in this control task and control functions will be described. As for input signals, there are two. LH door jamb sw (iDorJambLH) is a signal to be input to bit 1-13 in CPU 200 in BCM 100 indicated in FIG. 3. Key insert sw (iIGNswKey) is a signal to be input to bit 1-32 in CPU 200 in BCM 100 in FIG. 3.

An output signal which is a warning buzzer is directly controlled by CPU 200 in BCM 100.

Between the two inputs and the one output, there are logically interconnected as indicated in FIG. 42 by inverting circuits of inv1, inv2, and an AND circuit of and1.

In the next, using FIG. 43 and in reference to FIG. 42, control contents thereof will be described as a whole in the following.

From lines 4300 to 4305, comment statements are described, wherein a function name, functions, if there is an argument or not, and if there is a return value are described.

In line 4306, it is defined that the function name "key-alarm" does not have a return value.

In lines 4307 and 4308, definition statements are described defining a task No. (=0) of the buzzer, and variables (inv1, . . . , and1) to be used in this task.

From lines 4309 and thereafter, execution statements are described, wherein on the right-hand side of each execution statement and between "/*" and "*/", a comment statement is given.

From line 4309 to 4311, each logic of inverting circuits of inv1, inv2, and of AND circuit of and1 are defined.

From lines 4312 to 4318, output conditions for output signals are defined. That is, when an output of and1 is "1", buzzer task 1 is activated, and in other cases, the task is opened.

In lines 4319 to 4320, the control task for the key-left alarm control is released thereby terminating the processing thereof.

As described above, in the key-left warning control, the warning buzzer is sounded when the door beside the driver is opened and LH door jamb sw (iDorJambLH) becomes off while in a state that the key is inserted and Key insert sw (iIGNswKey) is off-state.

Now, using FIGS. 44 and 45, the light-on warning control indicated at No. 12 in FIG. 19 will be described in the following.

FIG. 44 is a functional block diagram indicating a control specification of the light-on warning control in the power supply system for automobile according to one embodiment of the invention, and FIG. 45 is a programming flowchart of a control task to be executed in CPU in the power supply system for automobile according to the one embodiment of the invention. By the way, its control program is described in C language.

Here, using FIG. 44, input/output signals in this control task, and control functions will be described in the following. As for input signals, there are four. ACGL signal (iACG-L) is a signal to be input to bit 21 of communication IC 220 in FCM 120 indicated in FIG. 9. DR door Jambsw (iDORJamLH) is a signal to be input to bit 1-13 in CPU 200 in BCM 100 in FIG. 3. Park lamp sw (iPOSOn) is a signal to be input to bit 1-3 in CPU 200 in BCM 100 in FIG. 3. Head light Onsw (iLiteOn) is a signal to be input to bit 1-9 in CPU 200 in BCM 100 in FIG. 3.

An output signal which is for the alarm buzzer is directly controlled by CPU 200 in BCM 100.

Between the four inputs and the one output, there are logically interconnected as indicated in FIG. 44 by inverting circuits (inv1, inv2) an AND circuit (and1), and an OR circuit (or1).

In the next, using FIG. 45 and in reference to FIG. 44, control contents thereof will be described as a whole.

From lines 4500 to 4505, comment statements are described wherein a function name, functions, if there is an argument or not, and if there is a return value are described.

In line 4506, it is defined that the function name "light-alarm" does not have a return value.

From lines 4507 to 4508, definition statements are given setting a task number (=2) of the buzzer and defining variables (inv1, . . . , and1) to be used in this control task.

From lines 4509 and thereafter, execution statements are described, wherein on the right-hand side of each execution program and between "/*" and "*/", a comment statement is given.

From lines 4509 to 4519, each logic of inverting circuits (inv1, inv2), AND circuit (and1) and OR circuit (or1) is defined.

From lines 4514 to 4519, output conditions for output signals are defined. That is, when an output of and1 is at "1", buzzer task 2 is activated, and in any other cases, the task is released.

In lines 4520 and 4521, the control task for the light-on warning control is opened and the processing thereof is terminated.

As described hereinabove, in the light-on alarm control of the invention, the alarm buzzer is sounded when park lamp sw (iPOSOn) or head light Onsw (iLiteOn) is at "H" level, and the lamp is on while the engine is running, ACGL signal (iACG-L) is at "L" level, the door beside the driver is open, and DR door jambsw (iDORJamLH) is at "L" level.

Now, using FIGS. 46 to 48, the room lamp illumination control indicated at No. 13 in FIG. 19 will be described in the following.

Figure 46:
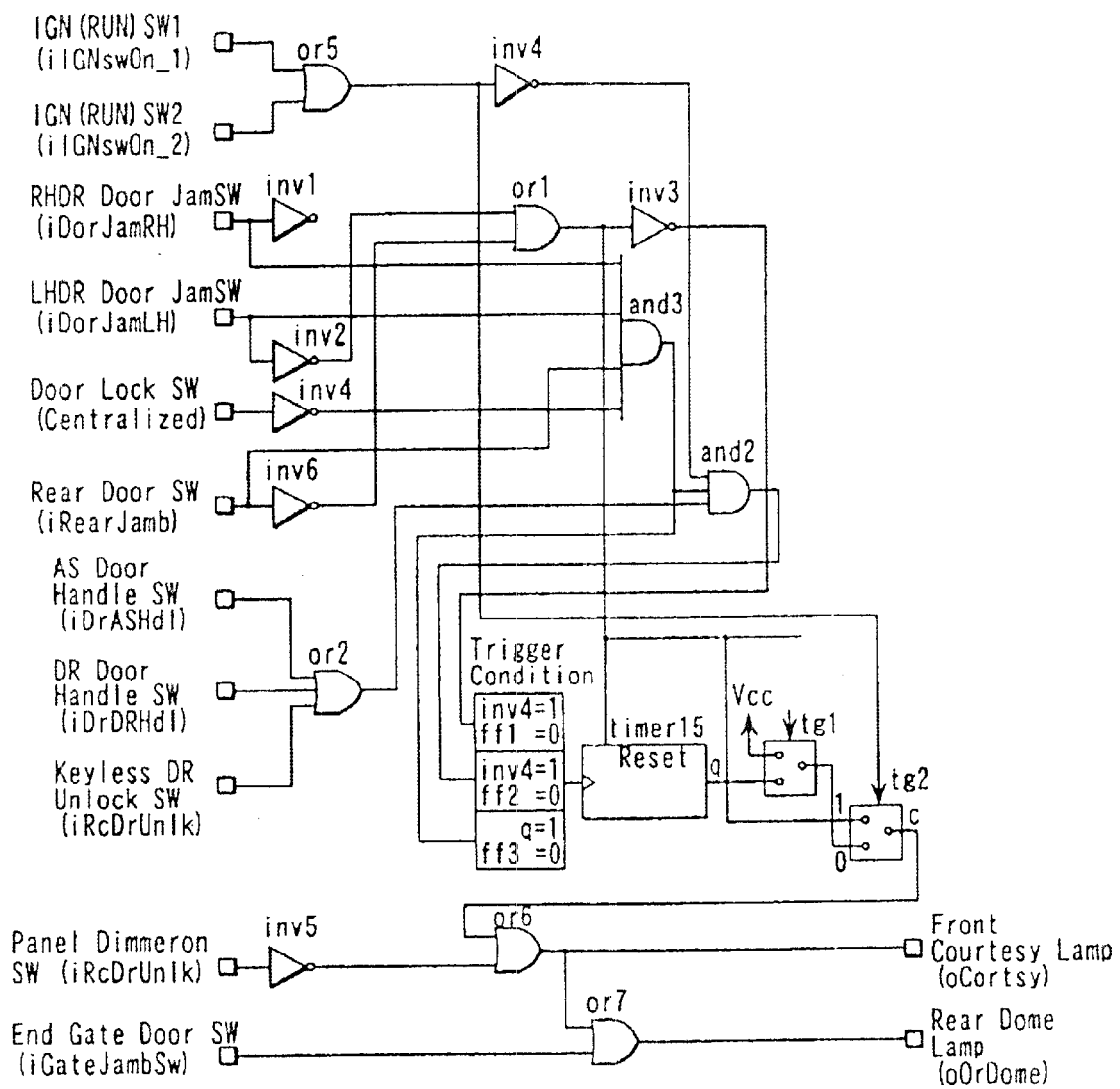
FIG. 46 is a function block diagram indicating a control specification for a room lamp turn-on control in the electric power supply system for the automobile according to one embodiment of the invention.

FIG. 46 is a functional block diagram indicating a control specification for the room lamp-on control in the power supply system for automobile according to one embodiment of the invention, and FIGS. 47 and 48 are programming flowcharts of a control task to be executed by CPU in the power supply system for automobile according to the one embodiment of the invention. By the way, its control program is written in C language.

Here, using FIG. 46, input/output signals in this control task, and control functions will be described hereinafter. As for input signals, there are eleven. IGN (RUN) SW1 (iIGNswOn-1) is a signal to be input to bit 1-6 in CPU 200 in BCM 100 indicated in FIG. 3. IGN (RUN) SW2 (iIGNswOn-2) is a signal to be input to bit 1-5 in CPU 200 in BCM 100 in FIG. 3. RHDR door JamSW (iDorJamRH) is a signal to be input to bit 1-14 in CPU 200 in BCM 100 in FIG. 3. LHDR door JamSW (iDorJamLH) is a signal to be input to bit 1-13 in CPU 200 in BCM 100 in FIG. 3. Door lock SW (iDrDRClk) is a signal to be input to bit 28 of communication IC 230 in DDM 130 indicated in FIG. 11. Rear door SW (iRearClk) is a signal to be input to bit 21 of communication IC 240 in RIM 140 in FIG. 13. AS door handle SW (iDrASHd1) is a signal to be input to bit 30 of communication IC 260 in PDM 160 shown in FIG. 17. DR door handle SW (iDrDRHd1) is a signal to be input to bit 30 of communication IC 230 in DDM 130 in FIG. 11. Keyless DR unlock (iRcDrUnlk) is a signal to be input to bit 1-27 in CPU 200 in BCM 100 in FIG. 3. Panel Dimmer SW (iPDimOn) is a signal to be input to bit 1-20 in CPU 200 in BCM 100 in FIG. 3. End gate door SW (iGateJambSW) is a signal to be input to bit 31 of communication IC 240 in RIM 140 in FIG. 13.

As for output signals, there are two. Front courtesy lamp (oCortsy) is a signal output from bit o-2-2 in CPU 200 in BCM 100 in FIG. 3. Rear dome lamp (oOrDome) is a signal output from bit 2 of communication IC 240 in FIM 140 in FIG. 13.

Between the eleven inputs and the two outputs, there are logically interconnected as indicated in FIG. 46 by two AND circuits (and1, and2), five OR circuits (or1, or2, or5–or7), a timer circuit (oscillator) (timer 15), six inverting circuits (inv1–inv6), three trigger circuits (ff1–ff3), and two trigger switch circuits (tg1, tg2).

In the next, using FIGS. 47 and 48 as well as in reference to FIG. 46, control contents thereof will be described in the following as a whole.

From lines 4700 to 4705, comment statements are described, wherein a function name, functions, if there is an argument or not, and if there is a return value or not are described.

In line 4706, it is defined that the function name "room-lamp" has no return value.

From lines 4707 to 4711, definition statements are described defining variables (ff1, . . . , after) to be used in this control task.

From lines 4712 and thereafter, execution statements are described, wherein on the right-hand side of each execution program and between "/*" and "*/", a comment statement is given.

In line 4712, an output signal (oRrDome) indicating a status prior to the control is read.

From lines 4713 to 4723, logic of two AND circuits (and2, and3), three OR circuits (or1, or2, or5) and six inverting circuits (inv1–inv6) is defined.

In lines 4724 to 4732, a forty-second timer (timer 15) for illuminating the room lamp for 40 seconds when the door is opened is activated.

In lines 4733 to 4741, the forty-second timer 15 is activated for illuminating the room lamp for forty seconds when the door handle and the keyless entry are operated.

In lines 4742 to 4750, the forty-second timer (timer 15) is activated for illuminating the room lamp for 2 seconds when detecting the door lock.

In lines 4751 to 4761, trigger conditions ff1–ff3 are released, then the timer (timer 15) is reset.

In lines 4762 to 4764, and 4765, each logic of the two inverting circuits (tg1, tg2) and two OR circuits (or6, or') is defined.

From lines 4765 to 4767, output conditions for the two outputs are defined. That is, the front courtesy lamp (oCortsy) which turns on the courtesy lamp becomes on-state when or6 is "1", and rear dome lamp (oOrDome) which turns on the rear dome lamp becomes on-state when or7 is "1".

From lines 4768 to 4771, an output signal after the control is read, compared with the output signal before the control, and when they do not agree with each other, namely, when the signal has changed, RIM data transfer flag is set on.

In lines 4772 to 4774, when q1 becomes "0", the control task for the room lamp turn-on control is released, and the processing thereof is terminated.

As described hereinabove, in the room lamp turn-on control of the invention, at such times when the door is opened, the door handle is operated, the keyless entry is operated and the door lock is sensed, the front courtesy lamp (oCortsy) is set at "1" so as to illuminate courtesy lamp 369 for a predetermined period of time, and further when the end gate door is operated at the times described above, the rear dome lamp (oOrDome) is set "1", to illuminate rear dome lamp 149.

Now, using FIGS. 49 to 51, the door mirror control indicated at No. 13 in FIG. 19 will be described.

FIG. 49 is a flowchart indicating a control specification of the door mirror control in the power supply system for automobile according to one embodiment of the invention, and FIGS. 50 and 51 are programming flowcharts of a control task to be executed by CPU in the power supply system for automobile according to the one embodiment of the invention. By the way, its control program is described in C language.

Here, using FIG. 49, input/output signals used in this control task, and control functions will be described in the following. As for input signals, there are six. Door mirror select RHsw (iDmRHSel) is a signal to be input to bit 17 in communication IC 230 in DDM 130 indicated in FIG. 11. Door mirror select LHsw (iDmLHSel) is a signal to be input to bit 16 in communication IC 230 in DDM 130 in FIG. 11. Door mirror-up sw (iDmUP) is a signal to be input to bit 15 of communication IC 230 in DDM 130 in FIG. 11. Door mirror-down sw (iDmDN) is a signal to be input to bit 14 of communication IC 230 in DDM 130 in FIG. 11. Door mirror left sw (iDmLH) is a signal to be input to bit 13 of communication IC 230 in DDM 130 in FIG. 11. Door mirror right sw (iDmRH) is a signal to be input to bit 12 of communication IC 230 in DDM 130 in FIG. 11.

As for output signals, there are eight. DR mirror right/left motor output 1 (oLHMirRLH-1) is a signal output from bit 3 of communication IC 230 in DDM 130 in FIG. 11. DR mirror right/left motor output 2 (oLHMirRLH-2) is a signal output from bit 2 of communication IC 230 in DDM 130 in FIG. 11. DR mirror up/down motor output 1 (oLHMirUD-1) is a signal output from bit 1 of communication IC 230 in DDM 130 in FIG. 11. DRmirror up/down motor output 2 (oLHMirUD-2) is a signal output from bit 0 of communication IC 230 in DDM 130 in FIG. 11. AS mirror right/left motor output 1 (oRHMirRLH-1) is a signal output from bit 19 of communication IC 260 in PDM 160 in FIG. 17. AS mirror right/left motor output 2 (oRHMirRLH-2) is a signal output from bit 18 of communication IC 260 in PDM 160 in FIG. 17. AS mirror up/down motor output 1 (oRHMirUD-1) is a signal output from bit 17 of communication IC 260 in PDM 160 in FIG. 17. AS mirror up/down output 2 (oRHMirUD-2) is a signal output from bit 16 of communication IC 260 in PDM 160 in FIG. 17.

Between the six inputs and the eight outputs, they are logically determined according to the flow chart and truth table TVT as indicated in FIG. 49.

In the next, using FIGS. 50 and 51 and further in reference to FIG. 49, control contents thereof will be described as a whole in the following.

From lines 5000 to 5005, comment statements are described wherein a function name, functions, if there is an argument or not and if there is a return value or not are described.

In line 5006, it is defined that the function name "door-mirror" has no return value.

From lines 5007 to 5008, a definition statement is described defining variables (drive-up-down, drive-left-right) to be used in this control task.

From lines 5009 and thereafter, execution statements are described, wherein on the right-hand side of each execution program and between "/*" and "*/", a comment statement is described.

In lines 5009 to 5010, a value of variables (drive-up-down, drive-left-right) is defined.

In line 5011, it is determined if the left mirror is selected or not in step 4901 in FIG. 49, and if the left mirror is selected, lines 5012 to 5026 are executed.

In lines 5012 to 5018, up/down motion of the mirror is executed according to the truth table TVT1 indicated in FIG. 49. When door mirror up sw (iDmUP) is at "1", DR mirror up/down motor output 1 (oLHMirUD-1) is set on, and when door mirror down sw (iDmDN) is "1", DR mirror up/down motor output 2 (oLHMirUD-2) is set on.

In lines 5019 to 5026, right/left motion of the mirror is executed according to truth table TVT2 indicated in FIG. 49. When door mirror right sw (iDmRH) is "1", DR mirror right/left motor output 1 (oLHMirRLH-1) is set on, and when door mirror left sw (iDmLH) is "1", DR mirror right/left motor output 2 (oLHMirRLH-2) is set on.

Further, in lines 5027 to 5030, if it is not the right mirror, either of the outputs are set off according to truth table TVT5.

In line 5031, it is judged if the right mirror is selected or not in step 4902 in FIG. 49, and if the right mirror is selected, lines 5032 to 5046 are executed.

In lines 5032 to 5038, the control of up/down motion the mirror is executed in the same way as in lines 012 to 5018. Further, in lines 5039 to 5046, the control of right/left motion of the mirror is executed in the same way as in lines 5019 to 5026. Still further, in lines 5047 to 5050, if it is not the left mirror, any output is set off according to truth table TVT5.

In lines 5051–5052, DDM and PDM data transfer flags are set on.

In lines 5053–5054, the control task of the door mirror control is released and the processing thereof is terminated.

As described above, in the door mirror control of the invention, in response to an input signal selecting either of the right/left door mirrors, and up/down or right/left motion, an output signal is turned on and off so as to actuate the right/left door mirrors.

In the next, using FIGS. 52 and 53, the accessory power supply control indicated at No. 15 in FIG. 19 will be described.

Figure 52:
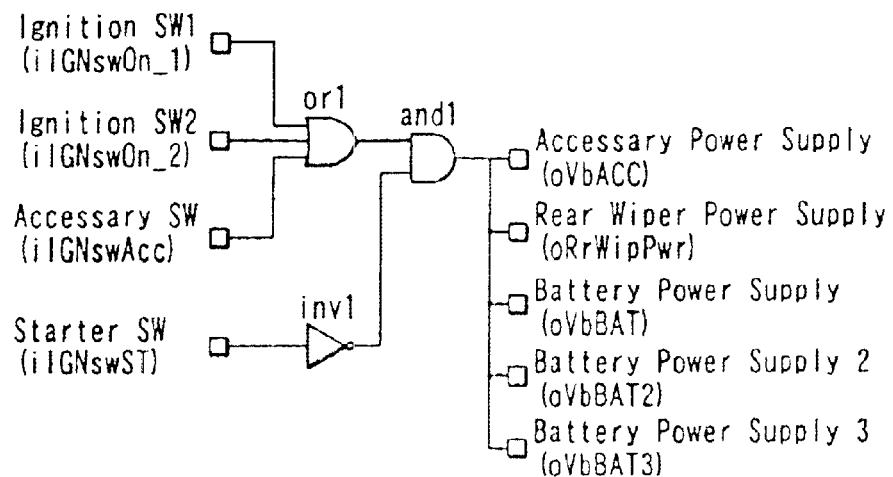
FIG. 52 is a function block diagram indicating a control specification for an accessory power supply control in the electric power supply system for automobile according to one embodiment of the invention.

FIG. 52 is a functional block diagram indicating a control specification of the accessory power supply control in the power supply system for automobile according to one embodiment of the invention, and FIG. 53 is a program flowchart of a control task to be executed by CPU in the power supply system for automobile according to the one embodiment of the invention. By the way, its control program is described in C language.

Here, using FIG. 52, input/output signals in this control task, and functions will be described hereinafter. There are four input signals. Ignition SW1 (iIGNswOn-1) is a signal to be input to bit 1-6 of CPU 200 in BCM 100 in FIG. 3. Ignition SW2 (iIGNswOn-2) is a signal to be input to bit 1-5 of CPU 200 in BCM 100 in FIG. 3. Accessory SW (iIGNswAcc) is a signal to be input to bit 1-4 in CPU 200 in BCM 100 in FIG. 3. Starter SW (iIGNswST) is a signal to be input to bit 1-30 in CPU 200 in BCM 100 in FIG. 3.

As for output signals, there are five. Accessory power supply output (oVbACC) is a signal output from bit o-4-5 in CPU 200 in BCM 100 of FIG. 3. Rear wiper power supply (oRrWipPwr) is a signal output from bit 19 of communication IC 240 in RIM 140 in FIG. 13. Battery power supply (oVbBAT) is a signal output from bit o-4-4 in CPU 200 in BCM 100 in FIG. 3. Battery power supply 2 (oVbBAT2) is a signal output from bit o-4-6 in CPU 200 in BCM 100 in FIG. 3. Battery power supply 3 (oVbBAT3) is a signal output from bit o-4-7 in CPU 200 in BCM 100 in FIG. 3.

Between the four inputs and the five outputs, there are logically interconnected as indicated in FIG. 52 by AND circuit (and1), OR circuit (or1), and inverting circuit (inv1).

In the next, using FIG. 53 and further in reference to FIG. 52, control contents thereof will be described as a whole in the following.

From lines 5300 to 5305, comment statements are described, wherein a function name, functions, if there is an argument or not, and if there is a return value or not are described.

In line 5306, it is defined that the function name "accessory-volt" does not have a return value.

From line 5307 to 5309, definition statements are described defining variables (or1, and1, . . . , after) to be used in this control task.

From lines 5310 and thereafter, execution statements are described, wherein on the right-hand side of each execution program and between "/*" and "*/", a comment statement is given.

In line 5310, an output signal indicative of the status prior to the control (oRrWipPwr) is read.

In lines 5311 to 5313, each logic of OR circuit or1, inverting circuit inv1, and AND circuit and1 is defined. Here, when starter SW (iIGNswST)becomes off while in a condition where accessory SW (iIGNswAcc) or ignition SW (iIGNswOn-1 or iIGNswOn-2) is on-state, the output of and1 becomes "H" level.

In lines 5314 to 5324, output conditions are defined. When and1 becomes "1", all of the accessory power supply output (oVbACC), rear wiper power (oRrWipPwr), battery power supply (oVbBAT), battery power supply 2 (oVbBAT2) and battery power supply 3 (oVbBAT3) are caused to be on.

In lines 5325 to 5328, an output signal after the control is read, compared with the output signal before the control, and if they do not agree with each other, namely, when the signal has changed, RIM data transfer flag is set on.

In lines 5329 to 5330, the control task of the accessory power supply control is released and the processing thereof is terminated.

As described hereinabove, in the accessory power supply control, when the starter SW (iIGNswST) is off-state while in the condition where accessory SW (iIGNswAcc) or ignition SW (iIGNswOn-1 or IIGNswOn-2) is on-state, all of the accessory power supply output (oVbACC), rear wiper power (oRrWipPwr), battery power supply (oVbBAT), battery power supply 2 (oVbBAT2) and battery power supply 3 (oVbBAT3) are caused to become on-state so as to supply power to the accessories.

In the next, using FIGS. 54 and 55, IGN power supply control indicated at No. 16 in FIG. 19 will be described.

Figure 54:
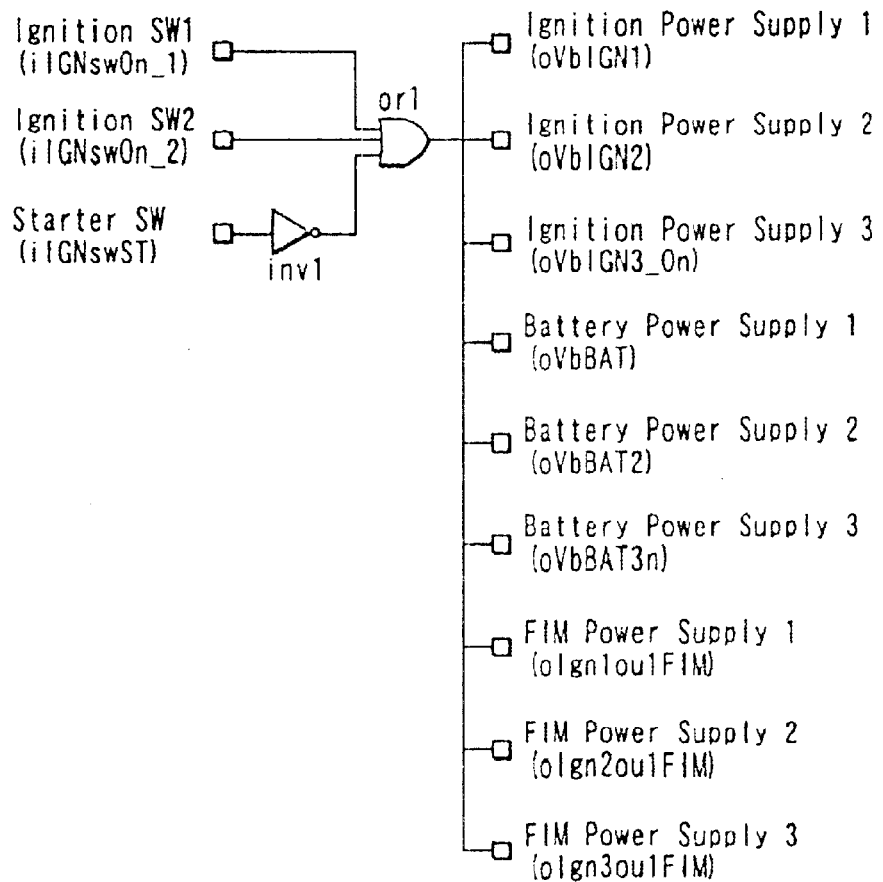
FIG. 54 is a function block diagram indicating a control specification for an IGN power supply control in the electric power supply system for automobile according to one embodiment of the invention.

FIG. 54 is a functional block diagram indicating a control specification of the IGN power supply control in the power supply system for automobile according to one embodiment of the invention, and FIG. 55 is a programming flowchart of a control task to be executed by CPU in the power supply system for automobile according to the one embodiment of the invention. By the way, its control program is described in C language.

Here, using FIG. 54, input/output signals in this control task, and control functions will be described in the following. There are three input signals. Ignition SW1 (iIGNswOn-1) is a signal to be input to bit 1-6 of CPU 200 in BCM 100 in FIG. 3. Ignition SW2 (iIGNswOn-2) is a signal to be input to bit 1-5 of CPU 200 in BCM 100 in FIG. 3. Starter SW (iIGNswST) is a signal to be input to bit 1-30 of CPU 200 in BCM 100 in FIG. 3.

As for output signals, there are nine. Ignition power supply (oVbIGN1) is a signal output from bit o-4-2 of CPU 200 in BCM 100 in FIG. 3. Ignition power supply 2 (oVbIGN2) is a signal output from bit o-4-3 of CPU 200 in BCM 100 in FIG. 3. Ignition power supply 3 (oVbIGN3) is a signal output from bit o-4-1 of CPU 200 in BCM 100 in FIG. 3. Battery power supply (oVbBAT) is a signal output from bit o-4-4 of CPU 200 in BCM 100 in FIG. 3. Battery power supply 2 (oVbBAT2) is a signal output from bit o-4-6 of CPU 200 in BCM 100 in FIG. 3. Battery power supply 3 (oVbBAT3) is a signal output from bit o-4-7 of CPU 200 in BCM 100 in FIG. 3. FIM power supply 1 (oIgnIoutFIM) is a signal output from bit 13 of communication IC 220 in FIM 120 shown in FIG. 9. FIM power supply 2 (oIgn2outFIM) is a signal output from bit 10 of communication IC 220 in FIM 120 in FIG. 9. FIM power supply 3 (oIgn3outFIM) is a signal output from bit 11 of communication IC 220 in FIM 120 in FIG. 9.

Between the three inputs and the nine outputs, there are logically interconnected as indicated in FIG. 54 by OR circuit or1 and inverting circuit inv1.

Then, using FIG. 55 and further with reference to FIG. 54, overall control contents will be described in the following.

From lines 5500 to 5505, comment statements are described, wherein a function name, functions, if there is an argument or not, and if there is a return value or not are described.

In line 5506, it is defined that the function name "ignition-volt" has no return value.

From lines 5507 to 5509, definition statements are described defining variables (inv1, . . . , or1) to be used in this control task.

From lines 5510 and thereafter, execution statements are described, wherein on the right-hand side of each execution program and between "/*" and "*/", a comment statement is described.

In line 5510, an output signal indicating the status prior to the control (oIgn1outFIM) is read.

In lines 5511 to 5512, each logic of OR circuit or1 and inverting circuit inv1 is defined. Here, when ignition SW (iIGNswOn-1 or iIGNswOn-2) is on-state or when starter SW (iIGNswST) is off-state, the output of or1 becomes "H" level.

In lines 5513 to 5531, output conditions are defined. Thereby, when or1 becomes "1", ignition power supply (oVbIGN1; oVbIGN2; oVbIGN3), battery power supply (oVbBAT; oVbBAT2; oVbBAT3) and FIM power supply (oIgn1outFIM; oIgn2outFIM; oIgn3outFIM) are caused to become on-state.

In lines 5532 to 5535, an output signal after the control is read, compared with the output signal before the control, and if they do not agree with each other, namely, when the signal has changed, FIM data transfer flag is set on.

In lines 5536–5537, the control task of the IGN power supply control is released and the processing thereof is terminated.

As described heretofore, in the IGN power supply control of the invention, in the state where ignition SW (iIGNswOn-1 or iIGNswOn-2) is on-state or starter SW (iIGNswST) is off-state, ignition power supply (oVbIGN1; oVbIGN2; oVbIGN3), battery power supply (oVbBAT; oVbBAT2; oVbBAT3) and FIM power supply (oIgn1outFIM; oIgn2outFIM; oIgn3outFIM) are caused to become on-state so as to supply power to the IGNs.

In the next, using FIGS. 56 and 57, the rear gate release control indicated at No. 18 in FIG. 19 will be described in the following.

Figure 56:
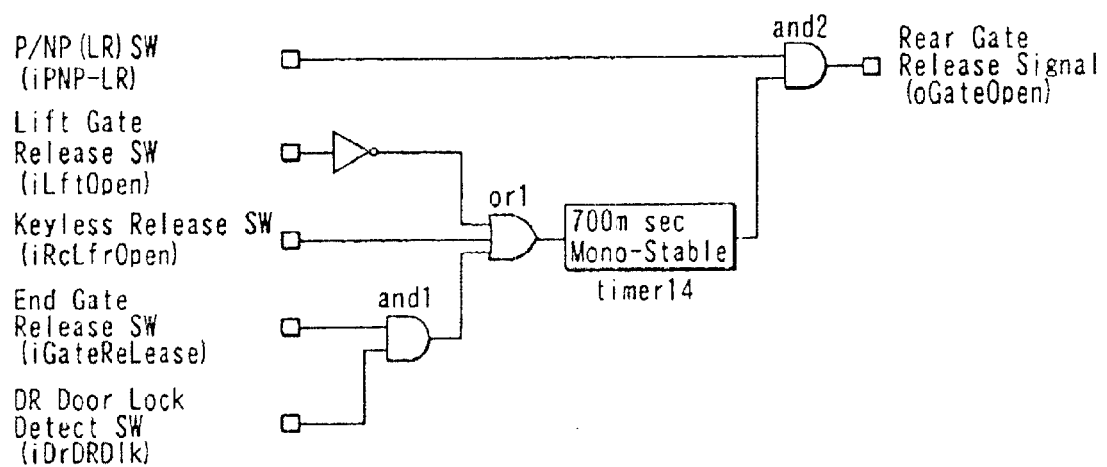
FIG. 56 is a function block diagram indicating a control specification for a rear gate release control in the electric power supply system for automobile according to one embodiment of the invention.

FIG. 56 is a functional block diagram indicating a control specification of the rear gate release control in the power supply system for automobile according to one embodiment of the invention, and FIG. 57 is a program chart of a control task to be executed by CPU in the power supply system for automobile according to the one embodiment of the invention. By the way, its control program is described in C language.

Here, using FIG. 56, input/output signals in this control task, and control functions will be described. There are five input signals. P/NP(LR)SW (iPNP-LR) is a signal to be input to bit 29 of communication IC 220 in FCM 120 in FIG. 9. Front side lift gate release SW (iLftOpen) is a signal to be input to bit 1-19 of CPU 200 in BCM 100 in FIG. 3. Keyless release SW (iRcLftOpn) is a signal to be input to bit 2-24 of CPU 200 in BCM 100 in FIG. 3. End gate release SW (iGateReLease) is a signal to be input to bit 30 of communication IC 240 in RIM 140 in FIG. 13. DR door lock detection SW (iDrDRDlk) is a signal to be input to bit 31 of communication IC 230 in DDM 130 in FIG. 11.

An output signal which is a rear gate release signal (oGateOpen) is a signal output from bit 16 of communication IC 240 in RIM 140 indicated in FIG. 13.

Between the five inputs and the one output, there are logically interconnected as indicated in FIG. 56 by two AND circuits (and1, and2), OR circuit (or1) and a mono stable multi vibrator timer 14.

In the next, using FIG. 57 and further with reference to FIG. 56, overall control contents thereof will be described in the following.

From lines 5700 to 5705, comment statements are described, wherein a function name, functions, if there is an argument or not, and if there is a return value or not are described.

In line 5706, it is defined that the function name "rear-gate-open" does not have a return value.

From lines 5707 to 5710, definition statements are described defining initial values (=0) of or1_ and q1, and variables (or1, and1, . . . , after) to be used in this control task.

From lines 5711 and thereafter, execution statements are described, wherein on the right-hand side of each execution program and between "/*" and "*/", a comment statement is given.

In line 5711, the output signal indicating the status before the control (oGateOpen) is read.

In lines 5712–5713, logic of OR circuit or1 and AND circuit and1 is defined. By way of example, or1 executes logic OR between an inverted signal of lift gate release SW (iLftOpen), keyless release SW (iRcLftOpn), and end gate release SW (iGateReLease).

In lines 5714 to 5721, a count-up condition for the counter is defined, a stop condition for the counter is defined, and the operation of a mono-stable multi-vibrator timer 14 is defined. A period of time for operating the mono-stable multi-vibrator timer 14 is defined to be 700 ms, and for this period of time, solenoid 147 to which rear gate release signal (oGateOpen) is input is operated.

In line 5722, logic of AND circuit and2 is defined.

In line 5723, output condition for an output signal is defined. Namely, when an output of and2 is "1", its output signal becomes on.

In lines 5724 to 5727, an output signal after the control is read, compared with the output signal before the control, and if they do not agree with each other, namely, when the signal has changed, RIM data transfer flag is set on.

In lines 5728 to 5731, when q1 becomes "0", the control task of the rear gate release control is opened, and the processing thereof ends.

As described above, in the rear gate release control of the invention, when the shift lever is at a position which allows release, that is, when P/NP(LR)SW (iPNP-LR) is on and release SW (iLftOpen; iRcLftOpn; iGateRelease) is on, the rear gate release signal (oGateOpen) is caused to be on for a predetermined period of time to operate solenoid 147.

In the next, using FIGS. 58 and 59, the shift interlock control indicated at No. 18 in FIG. 19 will be described.

Figures 58, 59:
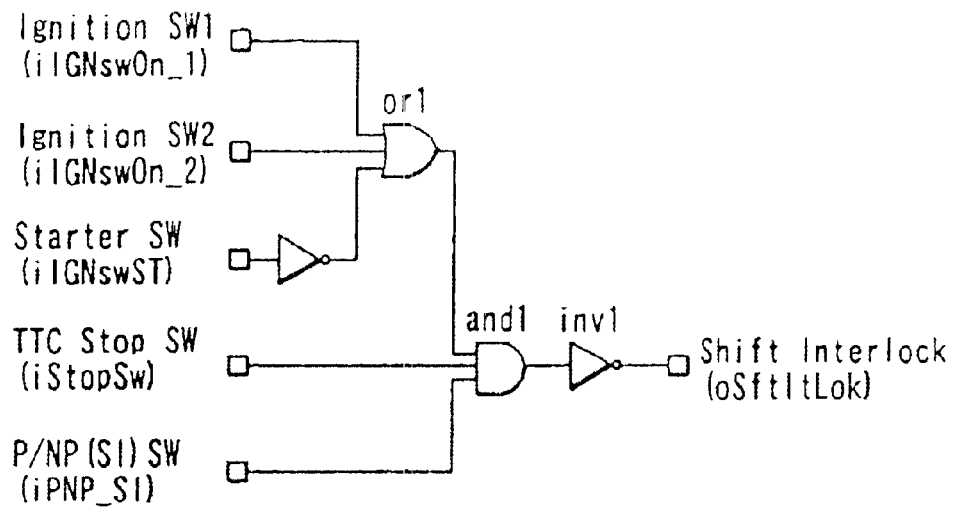
FIG. 58 is a function block diagram indicating a control specification for a shift interlock control in the electric power supply system for automobile according to one embodiment of the invention.
FIG. 59 is a program flowchart of an shift interlock control task to be executed by CPU in the electric power supply system for automobile according to one embodiment of the invention.

FIG. 58 is a functional block diagram indicating a control specification of the shift interlock control in the power supply system for automobile according to one embodiment of the invention, and FIG. 59 is a program flowchart of a control task to be executed by CPU in the power supply system for automobile according to the one embodiment of the invention. By the way, its control program is written in C language.

Here, with reference to FIG. 58, input/output signals in this control task and control functions will be described in the following. There are five input signals. Ignition SW1 (iIGNswOn-1) is a signal to be input to bit 1-6 of CPU 200 in BCM 100 shown in FIG. 3. Ignition SW2 (iIGNswOn-2) is a signal to be input to bit 1-5 of CPU 200 in BCM 100 in FIG. 3. Starter SW (iIGNswST) is a signal to be input to bit 1-30 of CPU 200 in BCM 100 in FIG. 3. TTC stop SW (iStopSw) is a signal to be input to bit 1-12 of CPU 200 in BCM 100 in FIG. 3. P/NP (SI) SW (iPNP-SI) is a signal to be input to bit 28 of communication IC 220 in FIM 120 in FIG. 9.

An output signal which is for shift interlock (oSftItLok) is a signal output from bit o-4-0 of CPU 200 in BCM 100 in FIG. 3.

Between the five inputs and the one output, there are logically interconnected as indicated in FIG. 58 by OR circuit or1, AND circuit and1, and inverting circuit inv1.

In the next, with reference to FIG. 59, overall control contents thereof will be described in the following.

From lines 5900 to 5905, comment statements are described, wherein a function name, functions, if there is an argument or not, and if there is a return value or not are described.

In line 5906, it is defined that the function name "shift-interlock" doest not have a return value.

In lines 5907–5908, a definition statement is described defining variables (inv1, . . . , and1) to be used in this control task.

In lines 5909 and thereafter, execution statements are described wherein on the right-hand side of each execution program and between "/*" and "*/", a comment statement is written.

In lines 5909 to 5911, each logic of OR circuit or1, AND circuit and1, and inverting circuit inv1 is defined. Here, when ignition SW (iIGNswOn-1 or iIGNswOn-2) is on or when starter SW (iIGNswST) is off, the output of or1 becomes "H" level.

In line 5912, an output condition is defined such that when inv1 becomes "1", shift interlock (oSftItLok) becomes on.

In lines 5913–5914, the control task of the shift interlock control is opened and the processing thereof ends.

As described above, in the shift interlock control of the invention, when ignition SW (iIGNswOn-1 or iIGNswOn-2) is on-state, or when starter SW (iIGNswST) is off-state and both TTC stop SW (iStopSw) and P/NP (SI) SW (iPNP-SI) are on-state, the shift interlock (oSftItLok) is caused to become off-state thereby stopping current conduction to solenoid 377, and releasing the interlock.

Now, the vehicle speed measurement control indicated at No. 19 in FIG. 19 will be described in the following. In the vehicle speed measurement control of the invention, on the basis of vehicle speed data (VCM16 to VCM23) input from bits 16 to 23 of communication IC 210 in VCM 110 shown in FIG. 7, BCM 100 obtains a vehicle speed VSP by calculation according to the following equation;

$$VSP = 4394.5313 \times 32.0 \times (\text{vehicle speed data}).$$

In the next, with reference to FIGS. 60 and 61, the high-mount stop lamp control indicated at No. 20 in FIG. 19 will be described.

FIG. 60 is a functional block diagram indicating a control specification of the high-mount stop lamp control in the power supply system for automobile according to one embodiment of the invention, and FIG. 61 is a program flowchart of a control task to be executed by CPU in the power supply system for automobile according to the one embodiment of the invention. By the way, its control program is written in C language.

Here, using FIG. 60, input/output signals in this control task and control functions will be described in the following.

An input signal which is stop lamp SW (iStopSw) is a signal to be input to bit 1-12 of CPU 200 in BCM 100 in FIG. 3. An output signal which is center stop lamp output (oHiMountSTP) is a signal output from bit 13 of communication IC 240 in RIM 140 in FIG. 13. Between the one input and the one output, they are logically interconnected in a direct coupling as indicated in FIG. 60.

In the next, using FIG. 61 and further in reference to FIG. 60, overall control contents there of will be described.

In lines 6100 to 6105, comment statements are described, wherein a function name, functions, if there is an argument or not, and if there is a return value or not are described.

In line 6106, it is defined that the function name "high-mount-stoplamp" does not have a return value.

In lines 6107–6108, a definition statement is described defining variables (before, after) to be used in this control task.

In line 6109 and thereafter, execution statements are described, wherein on the right-hand side of each execution program and between "/*" and "*/", a comment statement is described.

In line 6109, the output signal indicative of the status prior to the control is read.

In lines 6110 to 6113, output conditions of output signals are defined. Namely, when stop lamp SW (iStopSw) is "1", center stop lamp output (oHiMountSTP) becomes on-state, and in any other events, the same becomes off-state.

In lines 6114 to 6117, an output signal after the control is read, compared with the output signal before the control, and if they do not agree with each other, that is, when the signal has changed, RIM data transfer flag is set on.

In lines 6118 to 6119, the control task of the high-mount stop lamp control is released, and the processing thereof is terminated.

As described above, in the high-mount stop lamp control of the invention, when stop lamp SW (iStopSw) is on, center stop lamp output (oHiMountSTP) becomes on thereby illuminating center stop lamp (high-mound lamp) 145.

In the next, with reference to FIGS. 62 and 63, the horn control indicated at No. 21 in FIG. 19 will be described.

Figures 62, 63:
FIG. 62 is a function block diagram indicating a control specification for a horn sounding control in the electric power supply system for automobile according to one embodiment of the invention.
FIG. 63 is a program flowchart of a horn sounding control task to be executed by CPU in the electric power supply system for automobile according to one embodiment of the invention.

FIG. 62 is a functional block diagram indicating a control specification in the power supply system for automobile according to one embodiment of the invention, and FIG. 63 is a program flowchart of a control task to be executed by CPU in the power supply system for automobile according to the one embodiment of the invention. By the way, its control program is written in C language.

Here, using FIG. 62, input/output signals in this control task and control functions will be described. Its input signal which is a horn SW (iHorn) is a signal to be input to bit 1-27 of CPU 200 in BCM 100 in FIG. 3. Its output signal which is a horn drive signal (oHorn) is a signal output from bit 12 of communication IC 220 in FIM 120 in FIG. 9. Between the one input and the one output, there are logically interconnected as shown in FIG. 62 by inverting circuit inv.

Now, using FIG. 63 and further in reference to FIG. 62, overall control contents thereof will be described in the following.

From lines 6300 to 6305, comment statements are described wherein a function name, functions, if there is an argument or not, and if there is a return value or not are described.

In line 6306, it is defined that the function name "horn" does not take a return value.

In lines 6307–6308, a definition statement is described defining variables (before, after) to be used in this control task.

In lines 6309 and thereafter, execution statements are described, wherein on the right-hand side of each execution program and between "/*" and "*/", a comment statement is written.

In line 6309, the output signal indicative of the status before the control (oHorn) is read.

In lines 6310 to 6313, output conditions for output signals are defined. That is, when an inversion of horn SW (iHorn) is "1", horn drive signal (oHorn) becomes on, and else, the same becomes off.

In lines 6314 to 6317, an output signal after the control is read, compared with the output signal before the control, and if they do not agree with each other, namely, when the signal has changed, FIM data transfer flag is set on.

In lines 6318–6319, the control task of the horn control is opened, and the processing thereof is terminated.

As described above, in the horn control of the invention, when the inversion of horn SW (iHorn) is on, horn drive signal (oHorn) becomes on so as to sound horn 125.

Now, with reference to FIGS. 64 and 65, the rear dome lamp control indicated at No. 22 in FIG. 19 will be described in the following.

FIG. 64 is a functional block diagram indicating a control specification of the rear dome lamp control in the power supply system for automobile according to one embodiment of the invention, and FIG. 65 is a program flowchart of a control task to be executed by CPU in the power supply system for automobile according to the one embodiment of the invention. By the way, its control program is written in C language.

Here, using FIG. 64, input/output signals in this control task and control functions will be described in the following. There are five input signals. RH door JamSw (iDorJamRH) is a signal to be input to bit 1-14 of CPU 200 in BCM 100 in FIG. 3. LH door JamSw (iDorJamLH) is a signal to be input to bit 1-13 of CPU 200 in BCM 100 in FIG. 3. End gate JamSW (iGateJamSw) is a signal to be input to bit 31 of communication IC 240 in RIM 140 in FIG. 13. Rear door JamSW (iRearjamb) is a signal to be input to bit 21 of communication IC 240 in RIM 140 in FIG. 13. Illumination all turn-on Sw (iPDimOn) is a signal to be input to bit 1-20 of CPU 200 in BCM 100 in FIG. 3.

Its output signal which is a rear dome lamp output (oRrDome) is a signal output from bit 2 of communication IC 240 in RIM 140 in FIG. 13.

Between the five inputs and the one output, there are logically interconnected as shown in FIG. 64 by two OR circuits or1, or2, and four inverting circuits inv1.

In the next, using FIG. 65 and further with reference to FIG. 64, overall control contents there of will be described in the following.

From line 6500 to 6505, comment statements are described, wherein a function name, functions, if there is an argument or 133 not, and if there is a return value or not are described.

In line 6506, it is defined that the function name "rear-doom-lamp" has no return value.

In lines 6507–6509, a definition statement is described defining variables (before, . . . , or1) to be used in this control task.

In lines 6510 and thereafter, execution statements are described, wherein on the right-hand side of each execution program and between "/*" and "*/", a comment statement is written.

In line 6510, the output signal indicative of the status prior to the control (oRrDome) is read.

In lines 6511 to 6513, each logic of inverting circuit inv1 and OR circuits or1, or2 is defined.

In line 6514, an output condition for output signals is defined. That is, when door gate Sw (iDorJamRH; iDorJamLH; iGateJamSw; iRearjamb) becomes on, or when illumination all-on Sw (iPDimOn) becomes on, the rear dome lamp output (oRrDome) is caused to become on.

In lines 6515 to 6517, an output signal after the control is read, compared with the output signal before the control, and if they do not agree with each other, namely, when the signal has changed, RIM data transfer flag is set on.

In lines 6518–6519, the control task of the rear dome lamp control is opened, and the processing thereof is terminated.

As described above, in the rear dome lamp control of the invention, when either of door gate Sw (iDorJamRH; iDorJamLH; iGateJamSw; iRearJamb) and illumination all-on Sw (iPDimOn) becomes on, the rear dome lamp output (oRrDome) is caused to become on so as to illuminate rear dome lamp 145.

Now, with reference to FIGS. 66 and 67, the battery indicator control depicted at No. 23 in FIG. 19 will be described in the following.

FIG. 66 is a functional block diagram indicating a control specification of the battery indicator control in the power supply system for automobile according to one embodiment of the invention, and FIG. 67 is a program flowchart of a control task bo te executed by CPU in the power supply system for automobile according to the one embodiment of the invention. By the way, its control program is written in C language.

Here, using FIG. 66, input/output signals in this control task and control functions will be described. There are four input signals. Starter SW (iIGNswST) is a signal to be input to bit 1-30 of CPU 200 in BCM 100 in FIG. 3. Ignition SW1 (iIGNswOn-1) is a signal to be input to bit 1-6 of CPU 200 in BCM 100 in FIG. 3. Ignition SW2 (iIGNswOn-2) is a signal to be input to bit 1-5 of CPU 200 in BCM 100 in FIG. 3. ACG L signal (iACG-L) is a signal to be input to bit 21 of communication IC 220 in FIM 120 in FIG. 9.

An output signal which is a battery indicator output (oCHGInd) is a signal output from bit o-3-0 of CPU 200 in BCM 100 in FIG. 3.

Between the four inputs and the one output, there are logically interconnected as indicated in FIG. 66 by AND circuit and1, two OR circuits or1, or2, and two inverting circuits inv1, inv2.

Now, using FIG. 67 and further with reference to FIG. 66, overall control contents there of will be described in the following.

In lines 6700 to 6705, comment statements are described wherein a function name, functions, if there is an argument or not, and if there is a return value or not are described.

In line 6706, it is defined that the function name "battery-lamp" has no return value.

In lines 6707 to 6709, definition statements are described defining variables (before, . . . , or2) to be used in this control task.

In lines 6710 and thereafter, execution statements are described, wherein on the right-hand side of each execution program and between "/*" and "*/", a comment statement is written.

In line 6710, the output signal indicative of the status before the control (oCHGInd) is read.

In lines 6711 to 6715, each logic of inverting circuits inv1, inv2, OR circuits or1, or2, and AND circuit and1 is defined.

In line 6716, an output condition is defined such that when or2 becomes "1", battery indicator output (oCHGInd) is set on.

In line 6717, an output signal after the control is read, in lines 6718–6719, the control task of the battery indicator control is released, and the processing thereof is terminated.

As described above, in the battery indicator control of the invention, when starter SW (iIGNswST) is off, or when ignition SW (iIGNswOn-1 or iIGNswOn-2) is on-state and at the same time ACG L signal (iACG-L) is off-state, the battery indicator output (oCHGInd) is caused to become on such that charge indicator (Charge Indicator) 376 is illuminated.

Now, with reference to FIGS. 68 and 69, the brake warning lamp control indicated at No. 24 in FIG. 19 will be described in the following.

Figures 68, 69:
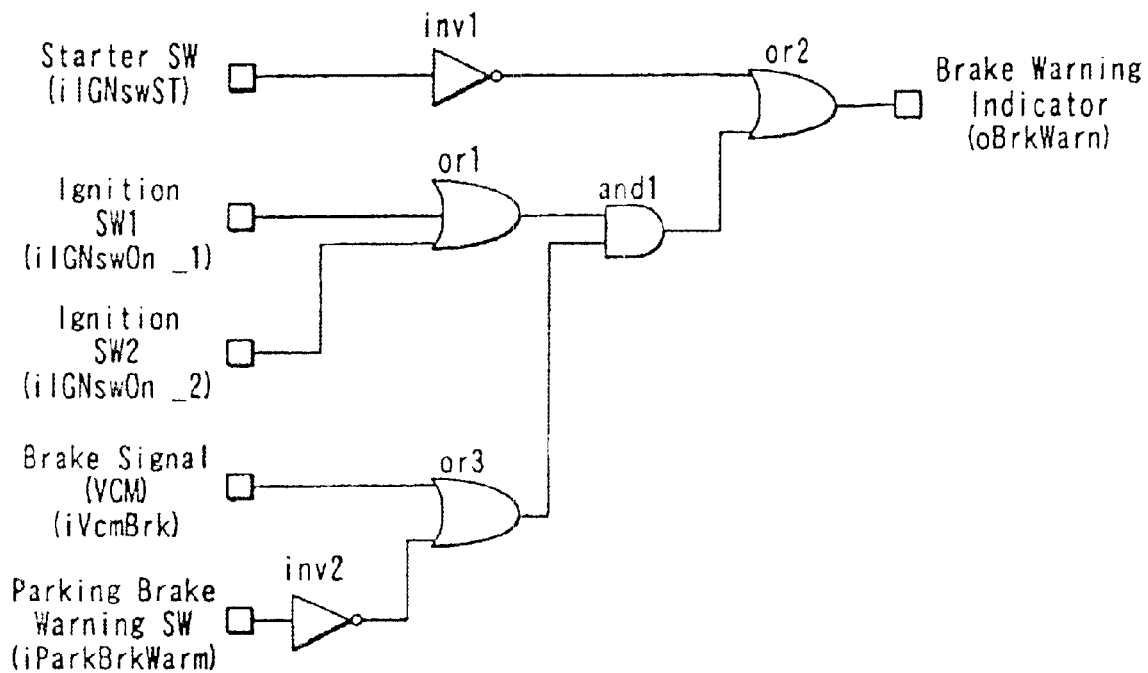
FIG. 68 is a function block diagram indicating a control specification for a brake warning lamp control in the electric power supply system for automobile according to one embodiment of the invention.
FIG. 69 is a program flowchart of a brake warning lamp control task to be executed by CPU in the electric power supply system for automobile according to one embodiment of the invention.

FIG. 68 is a functional block diagram indicating a control specification of the brake warning lamp control in the power supply system for automobile according to one embodiment of the invention, and FIG. 69 is a programming flowchart of a control task to be executed by CPU in the power supply system for automobile according to the one embodiment of the invention. By the way, its control program is written in C language.

Here, using FIG. 68, input/output signals in this control task and control functions will be described in the following. There are five input signals. Starter SW (iIGNswST) is a signal to be input to bit 1-30 of CPU 200 in BCM 100 in FIG. 3. Ignition SW1 (iIGNswOn-1) is a signal to be input to bit 1-6 of CPU 200 in BCM 100 in FIG. 3. Ignition SW2 ((iIGNswOn-2) is a signal to be input to bit 1-5 of CPU 200 in BCM 100 in FIG. 3. Brake signal (iVcmBrk) is a signal to be input to bit 26 of communication IC 210 in VCM 110 in FIG. 7. Parking brake warning SW (iPrkBrkWarn) is a signal to be input to bit 1-8 of CPU 200 in BCM 100 in FIG. 3.

An output signal which is a brake warning indicator output (oBrkWarn) is a signal output from bit o-3-1 of CPU 200 in BCM 100 in FIG. 3.

Between the five inputs and the one output, there are logically interconnected as indicated in FIG. 68 by AND circuit and1, three OR circuits or1–or3, and two inverting circuits inv1, inv2.

Now, using FIG. 69 and further with reference to FIG. 68, overall control contents thereof will be described in the following.

In lines 6900 to 6905, comment statements are described, wherein a function name, functions, if there is an argument or not and if there is a return value or not are described.

In line 6906, it is defined that the function name "brake-lamp" takes no return value.

In lines 6907–6908, a definition statement is described defining variables (inv1, . . . , or3) to be used in this control task.

In lines 6909 and thereafter, execution statements are written, wherein on the right-hand side of each execution program and between "/*" and "*/", a comment statement is described.

In lines 6909 to 6914, each logic of inverting circuits inv1, inv2, OR circuits or1–or3, and AND circuit and1 is defined.

In line 6915, an output condition is defined such that when or2 becomes "1", brake warning indicator output (oBrkWarn) is caused to become on.

In lines 6916–6917, the control task of the brake waring lamp control is released, and the processing thereof is terminated.

As described above, in the brake warning lamp control of the invention, when starter SW (iIGNswST) is off, or when ignition SW (iIGNswOn-1 or iIGNswOn-2) is on-state and at the same time brake signal (iVcmBrk) is on, or parking brake warning SW (iPrkBrkWarn) is off-state, the brake warning indicator output (oBrkWarn) is turned on so as to illuminate brake warning indicator (Brake warning Indicator) 675.

Now, with reference to FIGS. 70 and 71, DRL indicator control referred to at No. 25 in FIG. 19 will be described.

FIG. 70 is a functional block diagram indicating a control specification of the DRL indicator control in the power supply system for automobile according to one embodiment of the invention, and FIG. 71 is a programming flowchart of a control task to be executed by CPU in the power supply system for automobile according to the one embodiment of the invention. By the way, its control program is written in C language.

Here, using FIG. 71, input/output signals in this control task and control functions will be described in the following. There are four input signals. Starter SW (iIGNswST) is a signal to be input to bit 1-30 of CPU 200 in BCM 100 in FIG. 3. Ignition SW1 (iIGNswOn-1) is a signal to be input to bit 1-6 of CPU 200 in BCM 100 in FIG. 3. Ignition SW2 (iIGNswOn-2) is a signal to be input to bit 1-5 of CPU 200 in BCM 100 in FIG. 3. Head light SW (iiLiteOn) is a signal to be input to bit 1-9 of CPU 200 in BCM 100 in FIG. 3.

An output signal which is a DRL indicator output (oDRLInd) is a signal output from bit o-3-3 of CPU 200 in BCM 100 in FIG. 3.

Between the four inputs and one output, there are logically interconnected as indicated in FIG. 70 by AND circuit and1, to OR circuits or1, or2, and an inverting circuit inv1.

Using FIG. 71 and further in reference to FIG. 70, overall control contents thereof will be described in the following.

From lines 7100 to 7105, comment statements are described, wherein a function name, functions, if there is an argument or not, and if there is a return value or not are described.

In line 7106, it is defined that the function name "drl-indicator" takes no return value.

In lines 71-7 to 7109, definition statements are written defining variables (before, . . . , or2) to be used in this control task.

In lines 7110 and thereafter, execution statements are described, wherein on the right-hand side of each execution program and between "/*" and "*/", a comment statement is written.

In line 7110, the output signal indicative of the status prior to the control is read.

In lines 7111 to 7114, each logic of inverting circuit inv1, OR circuits or1, or2, and AND circuit and1 is defined.

In line 7115, an output condition is defined such that when or2 becomes "1", DRL indicator output (oDRLInd) becomes on.

In lines 7116 to 7118, an output signal after the control is read, the control task of the DRL indicator control is released, and the processing thereof ends.

As described above, in the DRL indicator control of the invention, if starter SW (iIGNswST) is off, or if ignition SW (iIGNswOn-1 or iIGNswOn-2) is on and head light SW (iiLiteOn) becomes on, DRL indicator output (oDRLInd) is caused to become on thereby illuminating day-time light indicator 373.

In the next, using FIGS. 72 and 73, the ABS warning control indicated at No. 26 in FIG. 19 will be described.

FIG. 72 is a functional block diagram indicating a control specification of the ABS warning control in the power supply system for automobile according to one embodiment of the invention, and FIG. 73 is a program flowchart of a control task to be executed by CPU in the power supply system for automobile according to the one embodiment of the invention. By the way, its control program is written in C language.

Here, using FIG. 72, input/output signals in this control task and control functions will be described in the following.

There are four input signals. Starter SW (iIGNswST) is a signal to be input to bit 1-30 of CPU 200 in BCM 100 in FIG. 3. Ignition SW1 (iIGNswOn-1) is a signal to be input to bit 106 of CPU 200 in BCM 100 in FIG. 3. Ignition SW2 (IIGNswOn-2) is a signal to be input to bit 1-5 of CPU 200 in BCM 100 in FIG. 3. ABS signal (iVcmABS) is a signal to be input to bit 27 of communication IC 210 in VCM 110 in FIG. 7.

An output signal which is ABS indicator output (oABSInd) is a signal output from bit o-3-2 of CPU 200 in BCM 100 in FIG. 3.

Between the four inputs and the one output, there are logically interconnected as indicated in FIG. 73 by AND circuit and1, two OR circuits or1, or2, and an inverting circuit inv1.

Now, based on FIG. 73 and further in reference to FIG. 72, overall control contents thereof will be described in the following.

In lines 7300 to 7305, comment statements are described, wherein a function name, functions, if there is an argument or not, and if there is a return value or not are described.

In line 7306, it is defined that the function name "abs_indicator" has no return value.

In lines 7307–7309, definition statements are given defining variables (before, . . . , or2) to be used in this control task.

From line 3710 and thereafter, execution statements are described, wherein on the right-hand side of each execution program and between "/*" and "*/", a comment statement is described.

In line 7310, an output signal (oABSInd) in the status prior to the control is read.

In lines 7311 to 7314, each logic of inverting circuit inv1, OR circuits or1/or2, and AND circuit and1 is defined.

In line 7315, an output condition is defined such that when or2 becomes "1", ABS warning output (oABSInd) becomes on.

In lines 7316–7318, an output signal after the control is read, the control task of the ABS warning control is released, and the processing thereof ends.

As described above, in the ABS warning control of the invention, if starter SW (iIGNswST) is off, or if ignition SW (iIGNswOn-1 or iIGNswOn-2) is on-state and when ABS signal (iVcmABS) becomes on, ABS waring output (oABSInd) is caused to become on, thereby illuminating ABS indicator 374.

In the next, using FIGS. 74–76, the MIL illumination control indicated at No. 27 in FIG. 19 will be described in the following.

Figure 74:
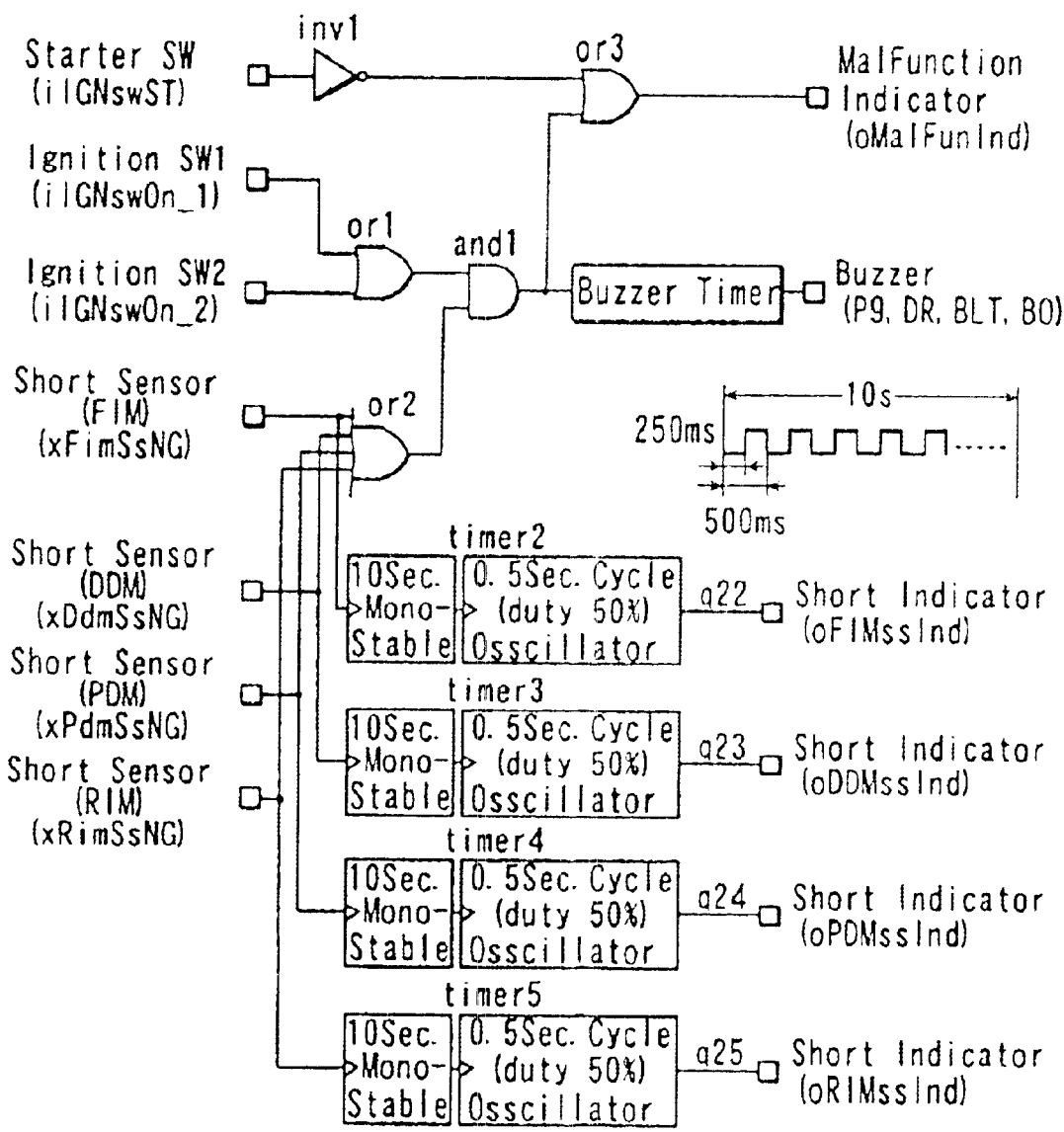
FIG. 74 is a function block diagram indicating a control specification for an MIL turn-on control in the electric power supply system for automobile according to one embodiment of the invention.

FIG. 74 is a functional block diagram indicating a control specification of the MIL illumination control in the power supply system for automobile according to one embodiment of the invention, and FIGS. 75—75 are program flowcharts of a control task to be executed by CPU in the power supply system for automobile according to the one embodiment of the invention. By the way, its control program is written in C language.

Here, using FIG. 74, input/output signals and control functions in this control task will be described in the following. There are seven input signals. Starter SW (iIGNST) is a signal to be input to bit 1-30 of CPU 200 in BCM 100 in FIG. 3. Ignition SW1 (IIGNswOn-1) is a signal to be input to bit 1-6 of CPU 200 in BCM 100 in FIG. 3. Ignition SW2 (iIGNswOn-2) is a signal to be input to bit 1-5 of CPU 200 in BCM 100 in FIG. 3. Short sensor (FIM) (xFimSsNG) is a signal to be input to bit 8 of communication IC 220 in FIM 120 in FIG. 9. Short sensor (DDM) (xDdmSsNG) is a signal to be input to bit 10 of communication IC 230 in DDM 130 in FIG. 11. Short sensor (PDM)(xPdmSsNG) is a signal to be input to bit 25 of communication IC 260 in PDM 160 in FIG. 11. Short sensor (RIM) (xRimSsNG) is a signal to be input to bit 1 of communication IC 240 in RIM 140 in FIG. 13.

As for output signals, there are six. MalFunction indicator (oMalFunInd) is a signal output from bit o-3-4 of CPU 200 in BCM 100 in FIG. 3. Buzzer (P9DRBLTB0) is directly controlled by CPU 200 of BCM 100. Short indicator (oFIMssInd) is a signal output from bit o-1-2 of CPU 200 in BCM 100 in FIG. 3. Short indicator (oDDMssInd) is a signal output from bit o-1-1 of CPU 200 in BCM 100 in FIG. 3. Short indicator )oPDMssInd) is a signal output from bit o-1-0 of CPU 200 in BCM 100 in FIG. 3. Short indicator (oRIMssInd) is a signal output from bit o-2-1 of CPU 200 in BCM 100 in FIG. 3.

Between the seven inputs and the six outputs, there are logically interconnected as indicated in FIG. 74 by AND circuit and1, three OR circuits or1–or3, four timer circuits of timer2–timer5 each of which including a mono-stable multi vibrator and an oscillator, and an inverting circuit inv1.

Now, using FIGS. 75–76, and further in reference to FIG. 74, overall control contents thereof will be described in the following.

In lines 7500–7505, comment statements are given, wherein a function name, functions, if there is an argument or not, and if there is a return value or not are described.

In line 7506, it is defined the the function name "mil-indicatioor" has no return value.

In lines 7507–7513, definition statements are described defining initial values (=0) of timer2, ..., or2, and variables (buff2, ..., and5) to be used in this control task.

From lines 7514 and thereafter, execution statements are described, wherein on the right-hand side of each execution program and between "/*" and "*/", a comment statement is written.

In lines 7514–7523, each logic of inverting circuit inv1, AND circuit and1, and three OR circuits or1–or3 is defined. Further, in each of buff2 to buff5, it is respectively set up short sensor (FIM) (xFimSsNG), short sensor (DDM) (xDemSsNG), short sensor (PDM) (xPdmSsNG) and short sensor (RIM) (xRimSsNG).

In lines 7524–7538, if buff2 is "1", namely, if short sensor (FIM) (xFimSsNG) is "1", timer2 is enabled for ten seconds to repeat on and off-states at a cycle of 250 ms, and wherein in the on-state (q22=1), the short indicator (oFIMssInd) is caused to be on.

In lines 7539–7553, if buff3 is "1", namely, when short sensor (DDM) (xDdmSsNG) is "1", timer is enabled for ten seconds to repeat on and off-states at a cycle of 250 ms, wherein in the on-state (q33=1), the short indicator (oDDMssInd) is caused to be on.

In lines 7554–7568, if buff4 is "1", namely, when short sensor (PDM) (xPdmSsNG) is "1", timer4 is enabled for ten minutes to repeat on/off states at a cycle of 250 ms, and wherein in the on-state (q44=1), short indicator (oPDMssInd) is caused to be on.

In lines 7569–7583, if buff5 is "1", that is, when short sensor (RIM)(xRimSsNG) is "1", timer5 is enabled for ten seconds to repeat on and off-states at a cycle of 250 ms, and wherein in the on-state (q55=1), short indicator (oRImssInd) is caused to be on.

In line 7584, if or3 is "1", depending whether starter SW (iIGNST) is off, or ignition SW (iIGNswOn-1; iIGNswOn-2) is on and any of short sensor (xFimSsNG; xDdmSsNG; xPdmSsNG; xRimSsNG) is on, the MalFunction indicator (oMalFuncInd) is caused to be on.

In lines 7585–7586, if or2 is "1", that is, when any of short sensor (xFimSsNG; xDdmSsNG; xPdmSsNG; xRimSsNG) is on, the buzzer task is activated.

In lines 7592–7599, if q2, q3, q4, q5 become "0", short indicator (oFIMssInd; oDDMssInd; oPDMssInd; oRIMssInd) is caused to be off, the control task of the MIL illumination control is released, and the processing there of ends.

As described above, in the MIL illumination control of the invention, when the short sensor (xFimSsNG; xDdmSsNG; xPdmSsNG; xRimSsNG) becomes on, the short indicator (oFIMssInd; oDDMssInd; oPDMssInd; oRIMssInd) is caused to become on thereby flickering FIM short-circuit detection indicator 365, DDM short-circuit detection indicator 366, PDM short-circuit detection indicator 367 and RIM short-circuit detection indicator 370. Further, if starter SW (iIGNST) is off or ignition SW (iIGNswOn-1; iIGNswOn-2) is on and any of the short sensor (xFimSsNG;xDdmSsNG; xPdmSsNG; xRimSsNG) is on, MalFunction indicator (oMalFunInd) is caused to be on, thereby illuminating disorder function indicator 372. Still further, if any of the short sensor (xFimSsNG; xDdmSsNG; xPdmSsNG; xRimSsNG) is on, the buzzer is sounded.

Now, using FIGS. 77 and 78, the CCM data transfer control indicated at No. 28 in FIG. 19 will be described in the following.

Figure 77:
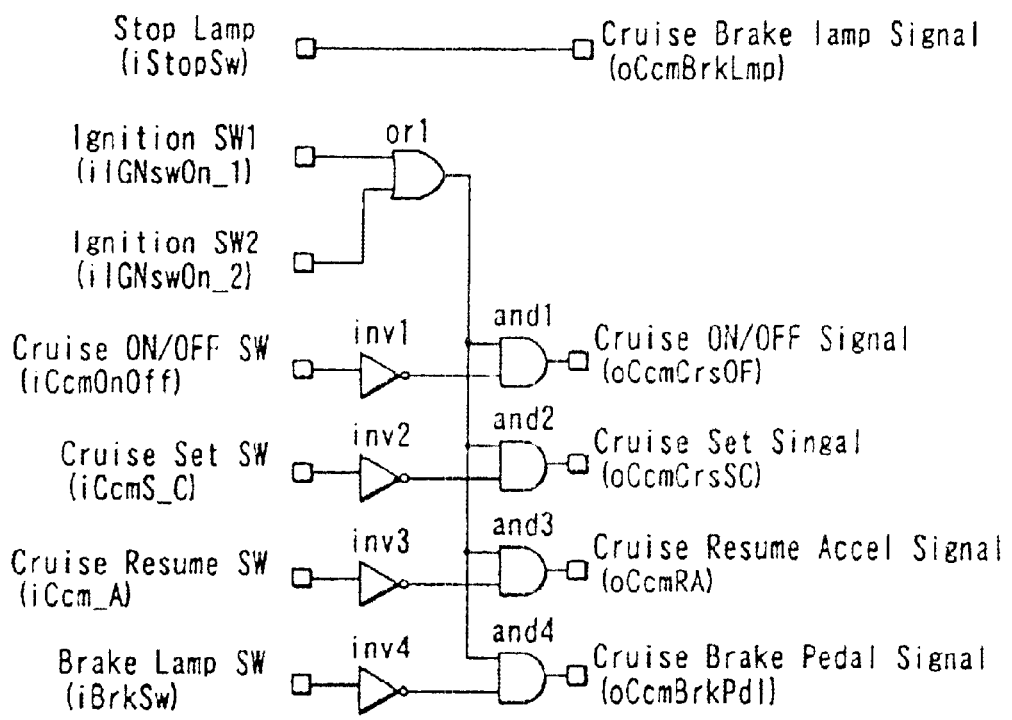
FIG. 77 is a function block diagram indicating a control specification for a CCM data transfer control in the electric power supply system for automobile according to one embodiment of the invention.

FIG. 77 is a functional block diagram indicating a control function of the CCM data transfer control in the power supply system for automobile according to one embodiment of the invention, and FIG. 78 is a program flowchart of a control task to be executed by CPU in the power supply system for automobile according to the one embodiment of the invention. By the way, its control program is written in C language.

Now, using FIG. 77, input/output signals and control functions in this control task will be described in the following. There are seven input signals. Stop lamp SW (iStopSw) is a signal to be input to bit 1-12 of CPU 200 in BCM 100 in FIG. 3. Ignition SW1 (iIGNswOn-1) is a signal to be input to bit 1-6 of CPU 200 in BCM 100 in FIG. 3. Igntion SW2 (IIGNswOn-2) is a signal to be input to bit 1-5 of CPU 200 in BCM 100 in FIG. 3. Cruise on/off SW (iCcmonoff) is a signal to be input to bit 1-26 of CPU 200 in BCM 100 in FIG. 3. Cruise set SW (iCcmS-C) is a signal to be input to bit 1-25 of CPU 200 in BCM 100 in FIG. 3. Cruise resume SW (iCcm-A) is a signal to be input to bit 1-24 of CPU 200 in BCM 100 in FIG. 3. Brake lamp SW (iBrkSw) is a signal to be input to bit 1-11 of CPU 200 in BCM 100 in FIG. 3.

As for output signals, there are five. Cruise brake lamp signal (oCcmBrkLmp) is a signal output from bit 27 of communication IC 250 in CCM 150 in FIG. 15. Cruise on/off signal (oCcmCsOF) is a signal output from bit 28 of communication IC 250 in CCM 150 in FIG. 15. Cruise set signal (oCcmCrsSC) is a signal output from bit 29 of communication IC 250 in CCM 150 in FIG. 15. Cruise resume accel signal (oCcmRA) is a signal output from bit 30 of communication IC 250 in CCM 150 in FIG. 15. Cruise brake pedal signal (oCcmBrkPd) is a signal output from bit 26 of communication IC 250 in CCM 150 in FIG. 15.

Between the seven inputs and the five outputs, there are logically interconnected as shown in FIG. 77 by four AND circuits and1–and4, OR circuit or1, and four inverting circuits inv1–inv4.

In the next, using FIG. 78 and further in reference to FIG. 77, overall control contents thereof will be described.

In lines 7800–7805, comment statements are described, wherein a function name, functions, if there is an argument or not, and if there is a return value or not are described.

In line 7806, it is defined that the function name "ccm-data-trans" takes no return value.

In lines 7807–7809, definition statement is written defining variables (before, . . . , or1) to be used in this control task.

In lines 7810 and thereafter, execution statements are described, wherein on the right-hand side of each execution program and between "/*" and "*/", a comment statement is given.

In line 7810, the output signal indicating the status prior to the control (oCcmBrkLmp) is read.

In lines 7811–7819, each logic of OR circuit or1, four inverting circuits inv1–inv4, and four AND circuits and1–and4 is defined.

In lines 7820–7824, if stop lamp SW (iStopSw) is "1", the cruise brake lamp signal (oCcmBrkLmp) becomes on. If and1 is "1", namely, when ignition SW (iIGNswOn-1; iIGNswOn-2) is on and cruise on/off SW (iccmOnOff) is off, the cruise on/off signal (oCcmCrsOF) is caused to be on. Further, if and2 is "1", namely, when ignition SW (iIGNswOn-1; iIGnswOn-2) is on and cruise set SW (iCcmS-C) is off, the cruise set signal (oCcmCrsSC) is caused to be on. Further, if and3 is "1", namely, when ignition SW (iIGNswOn-1; iIGNswOn-2) is on and cruise resume SW (iCcm-A) is off, the cruise resume acceleration signal (oCcmRA) is cause to be on. Further, if and4 is "1", namely, when ignition SW (iIGNswOn-1; iIGNswOn-2) is on and brake lamp SW (iBrkSw) is off, the cruise brake pedal signal (oCcmBrkPd1) is set on.

In lines 7825–7826, an output signal after the control is read, and CCM data transfer flag is set on.

In lines 7827–7829, the control task of the CCM data transfer control is released and the processing thereof is terminated.

As described above, in the CCM data transfer control of the invention, if stop lamp SW (iStopSw) becomes on, cruise brake lamp signal (oCcmBrkLmp) is set on, and is output to cruise controller (CrsCont) 1501. Further, if ignition SW (iLGNswOn-1; iIGNswOn-2) is on and cruise on/off SW (iCcmOnOff) is off, cruise on/off signal (oCcmCrsOF) is set on, and is output to cruise controller (Crs Cont) 1501. Still further, if and2 is "1", namely, when ignition SW (iIGNswOn-1; iIGNswOn-2) is on and cruise set SW (iCcmS-C) is off, cruise set signal (oCcmCrsSC) is set on, and output to cruise controller (Crs Cont) 1501. Still more, if and3 is "1", namely, when ignition SW (iIGNswOn-1; iIGNswOn-2) is on and cruise resume SW (iCcm-A) is off, cruise resume acceleration signal (oCcmRA) is set on, and output to cruise controller (Crs Cont) 1501. If and4 is "1", namely, when ignition SW (iIGNswOn-1 or iIGNswOn-2) is on and brake lamp SW (iBrkSw) is off, cruise brake pedal signal (oCcmBrkPd1) is set on, and output to cruise controller (Crs Cont) 1501.

In lines 5012–5018, the up and down motion of the mirror is executed in accordance with the truth value table TVT1 of FIG. 49, wherein if door mirror up sw (iDmUP) is "1", DR mirror up/down motor output 1 (oLHMirUD-1) is set on, and if door mirror down sw (iDmDN) is "1", DR mirror up/down motor output 2 (oHLMirUD-2) is set on.

Now, with reference to FIGS. 79 and 80, PRNDL decoder control as indicated at No. 29 of FIG. 19 will be described.

FIG. 79 is a functional block diagram indicating a control specification of the PRNDL decoder control in the power supply system for automobile according to one embodiment of the invention, and FIG. 80 is a program flowchart of a control task to be executed by CPU in the power supply system for automobile according to the one embodiment of the invention. By the way, its control program is written in C language.

Here, using FIG. 79, input/output signals and control functions in this control task will be described in the following. There are four input signals. P/NP(1) signal (iPNP-1) is a signal to be input to bit 27 of communication IC 220 in FIM 120 in FIG. 9. P/NP(2) signal (iPNP-2) is a signal to be input to bit 26 of communication IC 220 in FIM 120 in FIG. 9. P/NP(3) signal (iPNP-3) is a signal to be input to bit 25 of communication IC 220 in FIM 120 in FIG. 9. P/NP(4) signal (iPNP-4) is a signal to be input to bit 24 of communication IC 220 in FIM 120 in FIG. 9.

As for output signals, there are four. PRNDL signal 1 (oPRNDL1) is a signal output from bit o-2-7 of CPU 200 in BCM 100 in FIG. 3. PRNDL signal 2 (oPRNDL2) is a signal output from bit o-2-6 of CPU 200 in BCM 100 in FIG. 3. PRNDL signal 3 (oPRNDL3) is a signal output from bit o-2-5 of CPU 200 in BCM 100 in FIG. 3. PRNDL signal 4 (oPRNDL4) is a signal output from bit o-2-4 of CPU 200 in BCM 100 in FIG. 9.

Between the four inputs and the four outputs, there are logically set up as indicated in FIG. 79 according to the true value table TVT 1.

Now, using FIG. 80 and further in reference to FIG. 79, overall control contents thereof will be described in the following.

In lines 8000–8005, comment statements are described, wherein a function name, functions, if there is an argument or not, and if there is a return value or not are described.

In line 8006, it is defined that the function name "prnd1-decode" takes no return value.

In lines 8007–8009, definition statement is described defining variables (before, . . . , input) to be used in this control task.

In lines 8010 and thereafter, execution statements are described, wherein on the right-hand side of each execution program and between "/*" and "*/", a comment statement is given.

In line 8010, bit allocations for variable inputs of input signals (P/NP(1) signal (iPNP-1); P/NP (2) signal (iPNP-2); P/NP (3) signal (iPNP-3); P/NP(4) signal (iPNP-4)) are executed.

In lines 8011–8020, according to the truth value table TVT1 in FIG. 79, output signals (PRNDL signal 1 (oPRNDL1; PRNDL signal 2 (oPRNDL2); PRNDL signal 3 (oPRNDL3); PRNDL signal 4 (oPRNDL4) are set on and off.

In lines 8021–8022, the control task of the PRNDL decoder control is released, and the processing there of ends.

As described above, in the PRNDL decoder control of the invention, in response to the input signal (P/NP (1) signal (iPNP-1); P/NP(2) signal (iPNP-2); P/NP(3) signal (iPNP-3); P/NP(4) signal (iPNP-4)), the output signal (PRNDL signal 1 (oPRNDL1; PRNDL signal 2 (oPRNDL2); PRNDL signal 3 (oPRDL3); PRNDL signal 4 (oPRNDL4)) is set on and off, then, output to PRNDL display circuit 368, and with use of 4 bit data having been input, each shift position of P (parking), R (reverse), N (neutral), D (drive) and L (low) is displayed on the PRNDL indicator in indicator 104 shown in FIG. 1.

Now, using FIGS. 81–83, the door power window control indicated at No. 30 in FIG. 19 will be described.

Figure 81:
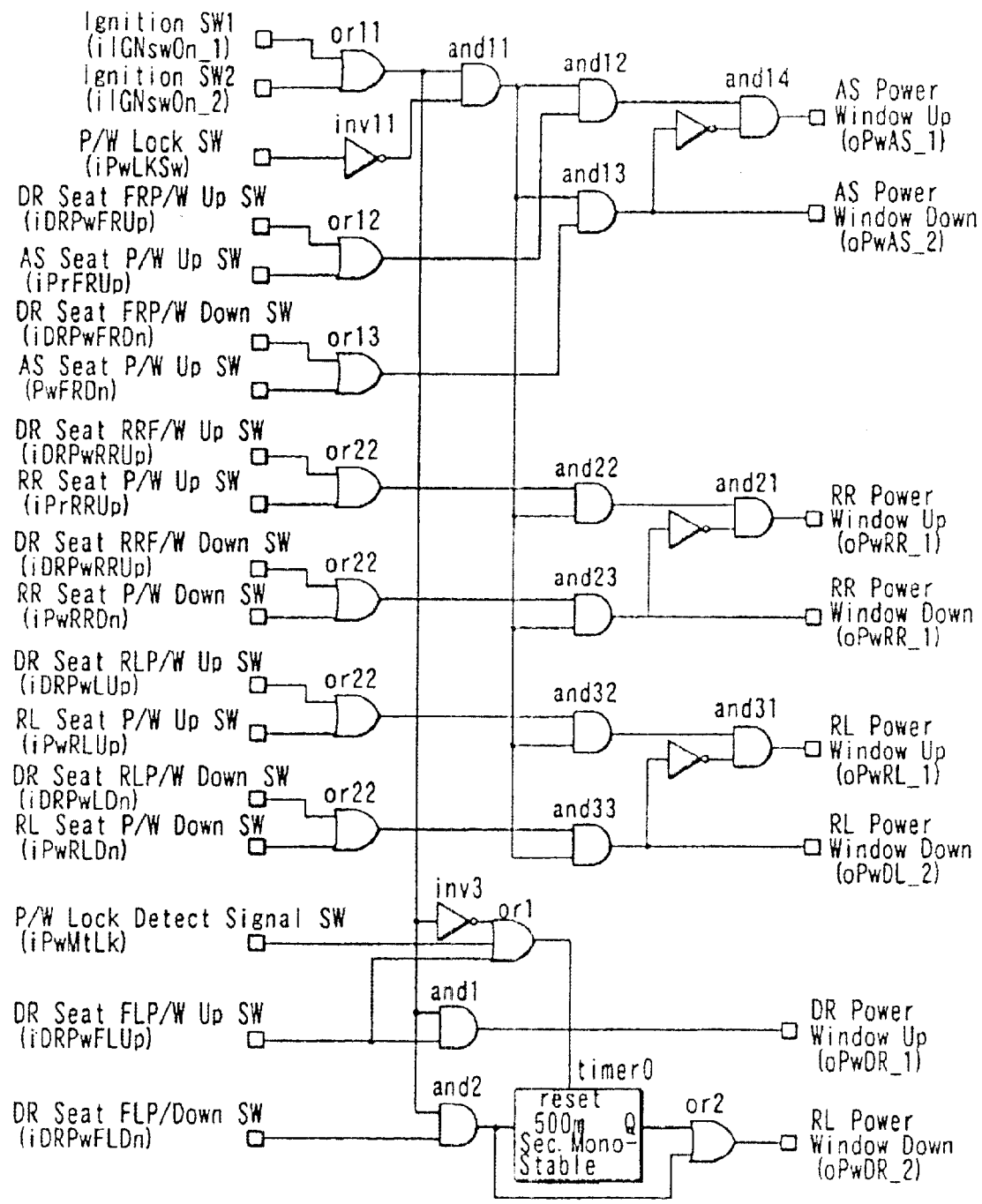
FIG. 81 is a function block diagram indicating a control specification for a door's power-driven window control in the electric power supply system for automobile according to one embodiment of the invention.

FIG. 81 is a functional block diagram indicating a control specification of the door power window control in the power supply system for automobile according to one embodiment of the invention, and FIGS. 82–83 are program flowcharts of a control task to be executed by CPU in the power supply system for automobile according to the one embodiment of the invention. By the way, its control program is written in C language.

Here, using FIG. 81, input/output signals and control functions in this control task will be described in the following. There are 18 input signals. Ignition SW1 (iIGNswOn-1) is a signal to be input to bit 1-6 of CPU 200 in BCM 100 in FIG. 3. Ignitions SW2 (iIGNswOn-2) is a signal to be input to bit 1-5 of CPU 200 in BCM 100 in FIG. 3. P/w lock SW (iPwLKSw) is a signal to be input to bit 27 of communication IC 230 in DDM 123 in FIG. 11. DR seat FRP/W-up SW (iDRPwFRUp) is a signal to be input to bit 20 of communication IC 230 in DDM 130 in FIG. 11.

AS seat P/W-up SW (iPWFRUp) is a signal to be input to bit 26 of communication IC 260 in PDM 160 in FIG. 17. DR seat FRP/W-down SW (iDRPwFRDn) is a signal to be input to bit 21 of communication IC 230 in DDM 130 in FIG. 11. AS seat P/W-down SW (iPwFRDn) is a signal to be input to bit 27 of communication IC 260 in PDM 160 in FIG. 17. DR seat RRP/W-up SW (iDRPwRRUp) is a signal to be input to bit 24 of communication IC 230 in DDM 130 in FIG. 11.

RR seat P/W-up SW (iPwRRUp) is a signal to be input to bit 25 of communication IC 240 in RIM 140 in FIG. 13. DR seat RRP/W-down SW (iDRPwRRDn) is a signal to be input to bit 25 of communication IC 230 in DDM 130 in FIG. 11. RR seat P/W-down SW (iPwRRDn) is a signal to be input to bit 24 of communication IC 240 in RIM 140 in FIG. 13. DR seat RLP/W-up SW (iDRPwRLUp) is a signal to be input to bit 22 of communication IC 230 in DDM 130 in FIG. 11.

RL seat P/W-up SW (iPwRLUp) is a signal to be input to bit 27 of communication IC 240 in RIM 140 in FIG. 13. DR seat RLP/W-down SW (iDRPwRLDn) is a signal to be input to bit 23 of communication IC 230 in DDM 130 in FIG. 11. RL seat P/W-down SW (iPwRLDn) is a signal to be input to bit 26 of communication IC 240 in RIM 140 in FIG. 13. P/W lock detection signal SW (iPwMtLk) is a signal to be input to bit 26 of communication IC 230 in DDM 130 in FIG. 11. DR seat FLP/W-up SW (iDRPwFLUp) is a signal to be input to bit 18 of communication IC 230 in DDM 130 in FIG. 11. DR seat FLP/W-down SW (iDRPwFLDn) is a signal to be input to bit 19 of communication IC 230 in DDM 130 in FIG. 11.

There are eight output signals. AS power window-up (oPwAS-1) is a signal output from bit 21 of communication IC 260 in PDM 160 in FIG. 17. AS power window-down (oPwAS-2) is a signal output from bit 20 of communication IC 260 in PDM 160 in FIG. 17. RR power window-up (oPwRR-1) is a signal output from bit 11 of communication IC 240 in RIM 140 in FIG. 13. RR power window-down (oPwRR-2) is a signal output from bit 10 of communication IC 240 in RIM 140 in FIG. 13. RL power window-up (oPwRL-1) is a signal output from bit 9 of communication IC 240 in RIM 140 in FIG. 13. RL power window-down (oPwRL-2) is a signal output from bit 8 of communication IC 240 in RIM 140 in FIG. 13. DR power window-up (oPwDR-1) is a signal output from bit 5 of communication IC 230 in FIG. 11. DR power window-down (oPwDR-2) is a signal output from bit 4 of communication IC 230 in DDM 130 in FIG. 11.

Between the 18 inputs and the 8 outputs, there are logically interconnected as indicated in FIG. 81 by twelve AND circuits and1, and2, and12–and14, and22–and24, and32–and34, nine OR circuits or1, or2, or1–or13, or22–or23, or32–or33, inverting circuits inv1, inv2, and mono-stable multi-vibrator timer 0.

Nextly, according to FIGS. 82 and 83, and further with reference to FIG. 81, overall control contents thereof will be described.

In lines 8200–8205, comment statements are described, wherein a function name, functions, if there is an argument or not, and if there is a return value or not are described.

In line 8206, it is defined that the function name "door-power-wind" takes no return value.

In lines 8207–8213, definition statement is described defining an initial value (=0) of q1, and variables (before1, . . . , and33) to be used in this control task.

In lines 8214 and thereafter, execution statements are described, wherein on the right-hand side of each execution program and between "/*" and "*/", a comment statement is described.

In lines 8214–8217, four of the eight output signals in the status before the control are read as 2 bit data, respectively.

In lines 8218–8228, logic of the AS power window is defined, and further, output conditions for up/down of the AS side windows are defined. That is, each logic of OR circuit or11–or13, inverting circuit inv11, and AND circuits and11–and14 is defined. Further, output conditions of output signals are defined such that when the output of and14 is "1", UP is set, and when the output of and13 is "1", DOWN is set.

For example, if ignition SW (iIGNswOn-1 or iIGNswOn-2) is on, P/W lock SW (iPwLKSw) is off, AS side window-up SW (iDRPwFRUp or iPwFRUp) is on, and AND circuit 13 (down signal) is off, the AS side window is set in the UP mode. Further, if ignition SW (iIGNswOn-1 or iIGNswOn-2) is on, P/W lock SW (iPwLKSw) is off, and AS side window-down SW (iDRPwFRDn or iPwFRDn) is on, the AS side window is set in the down mode.

In lines 8229–8236, logic of the RR power window is defined in the same way as for the AS side, and also output conditions for the up/down of the AS side windows are defined.

Further, in lines 8237–8244, logic of the RRpower windows is defined in the same manner as for the AS side, and further, output conditions for the up/down of the AS side windows are defined.

Still further, in lines 8245–8249, for enabling the DR power window, each logic of inverting circuit inv3, OR circuit or1, and AND circuits and1, and2 is defined.

In lines 8250–8257, in order to cause a delay of 500 ms, mono-stable multi vibrator timer 1 is defined.

In lines 8258–8260, output conditions for the up/down of the DR side windows are defined. That is, when the output of AND circuit and1 is "1", UP mode is set, and when the output of or2 is "1", DOWN mode is set.

In lines 8261–8272, an output signal after the control is read, compared with the output signal before the control, and if they do not agree with each other, namely, when the signal has changed therebetween, PDM, RIM, DDM data transfer flags are set on.

In lines 8273–8275, if and2 becomes "0", the control task of the door power window control is released, and the processing there of ends.

As described above, in the door power window control of the invention, while ignition SW (iIGNswOn-1 or iIGNswOn-2) is on and P/W lock SW (iPwLKSw) is off, in response to any input of Up/Down, an output of up/down is produced to a corresponding window so as to activate power window motor 1721, 1332, 1333 or 1122 thereby moving the corresponding window up and down.

In the next, using FIGS. 84 and 85, the stop lamp diagnosis control indicated at No. 31 in FIG. 19 will be described in the following.

FIG. 84 is a functional block diagram indicating a control specification of the stop lamp diagnosis control in the power supply system for automobile according to one embodiment of the invention, and FIG. 85 is a program flowchart of a control task to be executed by CPU in the power supply system for automobile according to the one embodiment of the invention. By the way, its control program is written in C language.

Here, using FIG. 84, input/output signals and control functions in this control task will be described. There are four input signals. RL stop diagnosis signal (iRLTurnDTPdiag) is a signal to be input to bit 23 of communication IC 240 in RIM 140 in FIG. 13. RL/turn stop output (oTurnSTPLHR) is a signal output from bit 23 of communication IC 240 in RIM 140 in FIG. 13. RR stop diagnosis signal (iRRTurnDTPdiag) is a signal to be input to bit 22 of communication IC 240 in RIM 140 in FIG. 13. RL/turn stop output (oTurnSTPLHR) is a signal output from bit 23 of communication IC 240 in RIM 140 in FIG. 13.

An output signal which is a stop lamp open (oStopOpen) is a signal output from bit o-2-0 of CPU 200 in BCM 100 in FIG. 3.

Between the four inputs and the one output, there are logically interconnected as indicated in FIG. 84 by two exclusive OR circuits eor1, eor2, AND circuit and1, OR circuit or, and timer circuit (oscillator) timer 16.

In the next, based on FIG. 85 and further in reference to FIG. 84, overall control contents thereof will be described in the following.

In lines 8500–8505, comment statements are described, wherein a function name, functions, if there is an argument or not, and if there is a return value or not are described.

In line 8506, it is defined that the function name "stop-lamp-diag" takes no return value.

In lines 8507–8509, definition statements are described defining an initial value (=0) of q, and variables (eor1, . . . , and1) to be used in this control task.

In lines 8510 and thereafter, execution statements are given, wherein on the right-hand side of each execution program and between "/*" and "*/", a comment statement is described.

In lines 8510–8512, each logic of the two exclusive OR circuits eor1, eor2, and the OR circuit or1 is defined. Here, it should be noted that eor1 is set on when RL/turn stop output (oTurnSTPLHR) which is an output signal does not agree with RL stop diagnosis signal (iRLTurnDTPdiag) which is produced as a result of control by the output signal thereof.

In lines 8513–8519, the timer is defined to repeat on/off operation at a cycle of 1 ms.

In line 8520, an output condition for output signals is defined such that when and1 is "1", the lamp is caused to flash.

In lines 8521–8523, the control task of the stop lamp diagnosis control is released, and the processing thereof ends.

As described heretofore, in the stop lamp diagnosis control of the invention, when the RL/turn stop output (oTurnSTPLHR) which is the output signal and the RL stop diagnosis signal (iRLTurnDTPdiag) which is produced as the result of control by this output signal do not agree with each other, the STOP lamp open (oStopOpen) is caused to be on and off so as to flash stop lamp load open detection indicator 371.

According to the embodiment of the invention, in the power supply to PCM 20 that executes fundamental controls of the engine, power line 22 is independently provided therefor separate from power line PL provided in loop for the accessory systems. Therefore, even if the control module of the accessory systems fails or breaks down, PCM 20 that executes the engine control is ensured to operate normally.

Further, because power line 32 that supplies power to A/C 30 which consumes a large current is provided independently from power line PL in loop for the accessory systems, even if A/C 30 fails, the normal drive operation of the automobile is ensured to be carried out.

Still further, power line 42 for navigation 40 which is an auxiliary information unit to be able to assist driving of the automobile is provided independently from the loop power line PL for the accessory systems, even if navigation 40 fails, the normal operation of the automobile can be ensured to be carried out.

Therefore, according to the embodiments of the invention, adverse effect on the other modules due to the malfunctioning thereof in the power supply system for vehicles can be minimized.

Further, because electrical loads are supplied with power from the power line PL provided in the form of loop and via switching devices that are controlled by respective control modules, the number of power lines in the system can be minimized. Still further, because of the provision of MOSFET with protection function as the switching devices of the invention, the fusible link that requires concentrical allocation of the modules and has been used conventionally, no more needs to be used. Thereby, a total length of the power lines can be minimized due to elimination of the lengthy layout of the conventional power lines. Therefore, the power supply lines in the power supply system for vehicles can be reduced substantially.

Industrial Applicability

The power supply system, the method thereof, semiconductor circuit devices and integrated wiring devices therefor according to the invention have been described by way of example as applied to the power supply system for automobile, however, it is not limited thereto, and the fundamental features of the invention can be applied, for example, to electric trains, airplanes, ships and other passenger vehicles having many electric loads distributed therein remote from its power source within the scope of the invention.

What is claimed is:

1. A load control module for a vehicle comprising:
   a power circuit portion connected to a power line;
   a communication circuit portion connected to a communication line;
   a microcomputer connected to said communication portion and said power circuit portion;
   a driver circuit, which is connected to an output interface portion of said microcomputer, for controlling power supply to a load, said driver circuit including plural output terminals to which said load is connected, and plural semiconductor power control elements, which are provided with a self-protection function; wherein,
   a control signal is provided from an output terminal of said microcomputer to a gate terminal of said semiconductor power control elements;
   electric power is supplied from said power circuit portion to a source terminal of said semiconductor power control elements;
   a drain terminal of said semiconductor power control elements is connected to said plural output terminals to which said load is connected;
   when an over-current flows into said semiconductor power control element or when said semiconductor power control element has an abnormally high temperature, said semiconductor power control element self-shields;
   said plural output terminals to which said load is connected include plural terminals to which a lamp of an indicator is connected, an accessory power supply terminal and a power supply terminal for outputting a battery power supply.

2. A load control module for a vehicle according to claim 1, wherein
said communication circuit portion is installed into said microcomputer.

3. A load control module for a vehicle according to claim 2, wherein
an input control circuit portion is connected to an input interface portion of said microcomputer, for inputting signals from a switch or a sensor to said microcomputer;
said power circuit portion is connected to said communication circuit portion, said microcomputer, said driver circuit, and said input control circuit portion; and
said input control circuit portion passes a signal from a receiving portion of a remote controller to said microcomputer.

4. A load control module for a vehicle according to claim 1, wherein
an input control circuit portion is connected to an input interface portion of said microcomputer, for inputting signals from a switch or a sensor to said microcomputer;
said power circuit portion is connected to said communication IC, said microcomputer, said driver circuit, and said input control circuit portion; and
said input control circuit portion passes a signal from a receiving portion of a remote controller to said microcomputer.

5. A load control module for a vehicle comprising:
a power circuit portion connected to a power line;
a communication terminal connected to a communication line;
a signal processing portion for outputting control signals to an output interface portion, based on signals passed from said communication line to said signal processing portion via said communication terminal; and
a driver circuit, which is connected to said output interface portion of said signal processing portion and comprises a semiconductor power element having a self-protection function, which driver circuit constitutes a motor driving circuit for controlling a motor for driving a rear wiper, wherein
said power circuit portion is connected to said signal processing portion and to said semiconductor power element of said driver circuit.

6. A load control module for a vehicle comprising:
a power circuit portion connected to a power line;
a communication terminal connected to a communication line;
a signal processing portion for outputting control signals to an output interface portion, based on signals passed from said communication line to said signal processing portion, via said communication use terminal; and
a driver circuit portion, which is connected to said output interface portion of said signal processing portion and comprises at least one semiconductor power element having a self-protection function; wherein,
said driver circuit portion comprises an H bridge circuit for controlling a passenger side door lock motor, an H bridge circuit for controlling a passenger side power window motor, and an H circuit for controlling a passenger side door mirror motor; and said power circuit portion is connected to said signal processing portion, and to said semiconductor power element of said driver circuit.

7. A load control module for a vehicle comprising:
a power circuit portion connected to a power line;
a communication circuit portion connected to a communication line;
a microcomputer connected to said communication portion and said power circuit portion; and
a driver circuit, which is connected to an output interface portion of said microcomputer, for controlling power supply to a load; wherein,
said driver circuit comprises a plurality of semiconductor power control elements, which have a self-protection function;
said driver circuit is connected to said power circuit portion by a plurality of branch lines that extend from said driver circuit and are connected to at least a line extending from said power circuit;
said driver circuit has a plurality of power output lines that are connected to a plurality of output terminals of said load control module;
said output interface portion of said microcomputer is connected to said driver circuit by a plurality of control signal lines;
said plurality of output terminals of said load control module includes plural terminals which are connected to a lamp of an indicator;
said plurality of output terminals of said load control module includes an accessory power supply terminal; and
said plurality of output terminals of said load control module includes a power supply terminal for outputting a battery power supply.

8. A load control module for a vehicle according to claim 7, wherein
said communication circuit portion is installed into said microcomputer.

9. A load control module for a vehicle according to claim 8, wherein
an input control circuit portion is connected to an input interface portion of said microcomputer, for inputting signals from a switch or a sensor to said microcomputer;
said power circuit portion is connected to said communication circuit portion, said microcomputer, said driver circuit, and said input control circuit portion; and
said input control circuit portion passes a signal from a receiving portion of a remote controller to said microcomputer.

10. A load control module for a vehicle according to claim 7, wherein:
an input control circuit portion is connected to an input interface portion of said microcomputer, for inputting signals from a switch or a sensor to said microcomputer;
said power circuit portion is connected to said communication IC, said microcomputer, said driver circuit, and said input control circuit portion; and
said input control circuit portion passes a signal from a receiving portion of a remote controller to said microcomputer.

* * * * *